(12) United States Patent
Oh et al.

(10) Patent No.: US 12,236,646 B2
(45) Date of Patent: Feb. 25, 2025

(54) POINT CLOUD DATA TRANSMISSION APPARATUS, POINT CLOUD DATA TRANSMISSION METHOD, POINT CLOUD DATA RECEPTION APPARATUS, AND POINT CLOUD DATA RECEPTION METHOD

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 61 days.

(21) Appl. No.: 18/018,791

(22) PCT Filed: Aug. 12, 2021

(86) PCT No.: PCT/KR2021/010734
§ 371 (c)(1),
(2) Date: Jan. 30, 2023

(87) PCT Pub. No.: WO2022/035256
PCT Pub. Date: Feb. 17, 2022

(65) Prior Publication Data
US 2023/0360273 A1    Nov. 9, 2023

(30) Foreign Application Priority Data

Aug. 12, 2020 (KR) .................. 10-2020-0101412

(51) Int. Cl.
*G06T 9/00* (2006.01)
*H04N 19/96* (2014.01)

(52) U.S. Cl.
CPC .............. *G06T 9/00* (2013.01); *H04N 19/96* (2014.11)

(58) Field of Classification Search
CPC .. G06T 7/70; G06T 9/00; G06T 9/001; G06T 9/40; H04N 19/119; H04N 19/597; H04N 19/70; H04N 19/96
See application file for complete search history.

(56) References Cited

U.S. PATENT DOCUMENTS

2015/0264404 A1    9/2015  Hannuksela
2017/0006309 A1*   1/2017  Liu ...................... H04N 19/597
(Continued)

FOREIGN PATENT DOCUMENTS

KR    20150092053 A    8/2015
KR    20160024364 A    3/2016

OTHER PUBLICATIONS

Mammou, Khaled et al., "G-PCC codec description v2", ISO/IEC JTC1/SC29/WG11 N18189, Jan. 2019, Marrakech, MA.

*Primary Examiner* — Mohammed S Rahaman
(74) *Attorney, Agent, or Firm* — Bryan Cave Leighton Paisner LLP

(57) ABSTRACT

A point cloud data transmission method according to embodiments comprises the steps of: encoding geometry data of point cloud data; encoding attribute data of the point cloud data on the basis of the geometry data; and transmitting the encoded geometry data, the encoded attribute data, and signaling data. The step of encoding the geometry data may comprise the steps of: dividing the geometry data into a plurality of compression units; generating, for each compression unit, a prediction tree on the basis of the geometry data within each compression unit; and compressing the geometry data within the compression unit by performing prediction on the basis of the prediction tree.

12 Claims, 42 Drawing Sheets

(56) References Cited

U.S. PATENT DOCUMENTS

| | | |
|---|---|---|
| 2020/0153885 A1 | 5/2020 | Lee et al. |
| 2021/0248784 A1* | 8/2021 | Gao .......................... G06T 9/40 |
| 2021/0281874 A1* | 9/2021 | Lasserre ............. H03M 7/3071 |
| 2021/0337189 A1* | 10/2021 | Zhao ...................... H04N 19/61 |
| 2021/0407147 A1* | 12/2021 | Flynn .................. H04N 19/182 |

* cited by examiner

FIG. 6
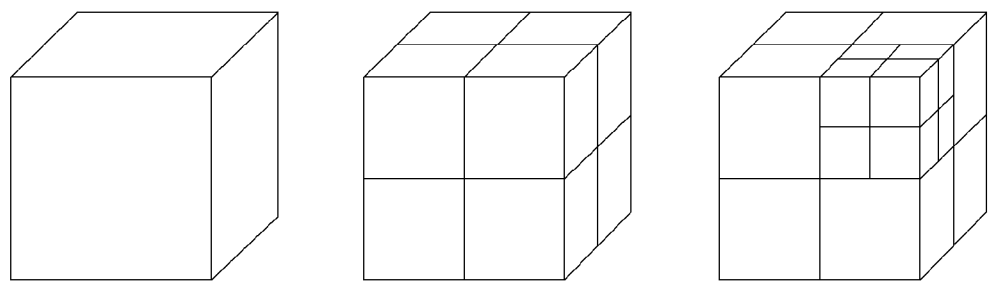
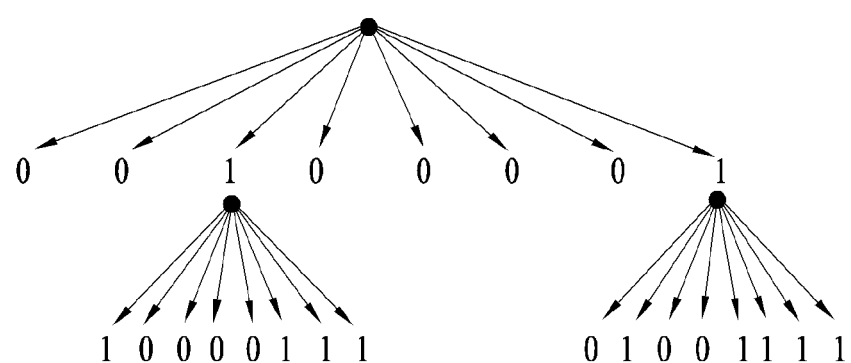

FIG. 7
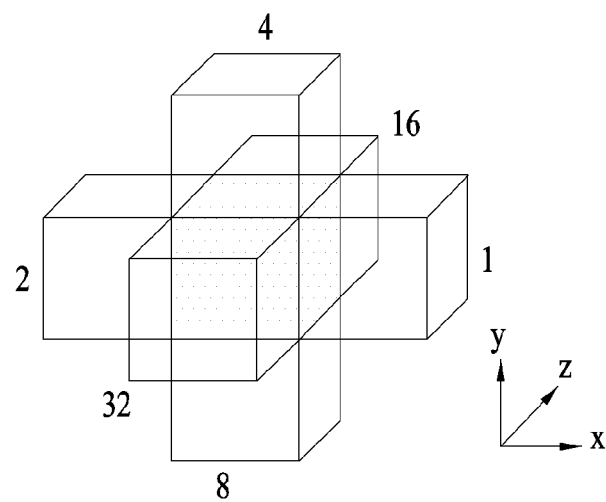
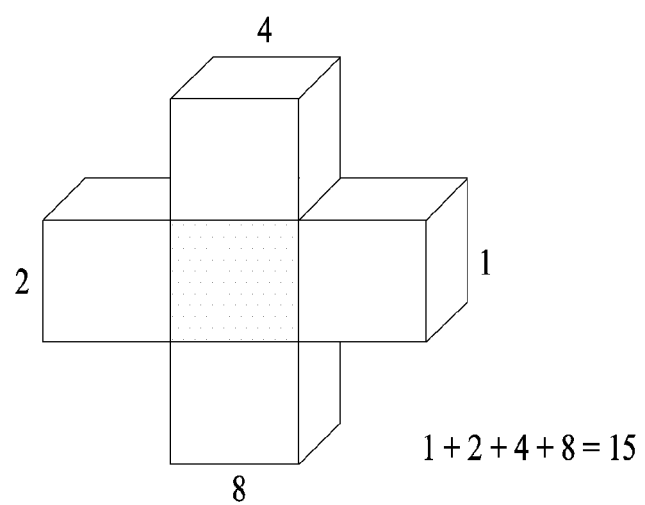
1 + 2 + 4 + 8 = 15

FIG. 20

| seq_parameter_set( ) { | Descriptor |
|---|---|
|   main_profile_compatibility_flag | u(1) |
|   unique_point_positions_constraint_flag | u(1) |
|   level_idc | u(8) |
|   sps_seq_parameter_set_id | ue(v) |
|   sps_bounding_box_present_flag | u(1) |
|   if( sps_bounding_box_present_flag ) { | |
|     sps_bounding_box_offset_x | se(v) |
|     sps_bounding_box_offset_y | se(v) |
|     sps_bounding_box_offset_z | se(v) |
|     sps_bounding_box_offset_log2_scale | ue(v) |
|     sps_bounding_box_size_width | ue(v) |
|     sps_bounding_box_size_height | ue(v) |
|     sps_bounding_box_size_depth | ue(v) |
|   } | |
|   sps_source_scale_factor_numerator_minus1 | ue(v) |
|   sps_source_scale_factor_denominator_minus1 | ue(v) |
|   sps_num_attribute_sets | ue(v) |
|   for( i = 0; i< sps_num_attribute_sets; i++ ) { | |
|     attribute_dimension_minus1[ i ] | ue(v) |
|     attribute_instance_id[ i ] | ue(v) |
|     if(attribute_dimension_minus1[ i ] > 0 ) | |
|       attribute_secondary_bitdepth_minus1[ i ] | ue(v) |
|       attribute_cicp_colour_primaries[ i ] | ue(v) |
|       attribute_cicp_transfer_characteristics[ i ] | ue(v) |
|       attribute_cicp_matrix_coeffs[ i ] | ue(v) |
|       attribute_cicp_video_full_range_flag[ i ] | u(1) |
|     known_attribute_label_flag[ i ] | u(1) |
|     if( known_attribute_label_flag[ i ] ) | |
|       known_attribute_label[ i ] | ue(v) |
|     else | |
|       attribute_label_four_bytes[ i ] | u(32) |
|   } | |
|   log2_max_frame_idx | u(5) |
|   axis_coding_order | u(3) |
|   sps_bypass_stream_enabled_flag | u(1) |
|   sps_extension_flag | u(1) |
|   if( sps_extension_flag ) | |
|     while( more_data_in_byte_stream( ) ) | |
|       sps_extension_data_flag | u(1) |
|   byte_alignment( ) | |
| } | |

FIG. 21

| geometry_parameter_set( ) { | Descriptor |
|---|---|
|   gps_geom_parameter_set_id | ue(v) |
|   gps_seq_parameter_set_id | ue(v) |
|   gps_box_present_flag | u(1) |
|   if ( gps_box_present_flag ){ | |
|     gps_gsh_box_log2_scale_present_flag | u(1) |
|     if ( gps_gsh_box_log2_scale_present_flag == 0 ) | |
|       gps_gsh_box_log2_scale | ue(v) |
|   } | |
|   unique_geometry_points_flag | u(1) |
|   geometry_planar_mode_flag | u(1) |
|   if( geometry_planar_mode_flag ){ | |
|     geom_planar_mode_th_idcm | ue(v) |
|     geom_planar_mode_th[ 1 ] | ue(v) |
|     geom_planar_mode_th[ 2 ] | ue(v) |
|   } | |
|   geometry_angular_mode_flag | u(1) |
|   if ( geometry_angular_mode_flag ){ | |
|     lidar_head_position[0] | se(v) |
|     lidar_head_position[1] | se(v) |
|     lidar_head_position[2] | se(v) |
|     number_lasers | ue(v) |
|     for( i = 0; i < number_lasers; i++ ) { | |
|       laser_angle[ i ] | se(v) |
|       laser_correction[ i ] | se(v) |
|     } | |
|     planar_buffer_disabled | u(1) |
|     implicit_qtbt_angular_max_node_min_dim_log2_to_split_z | se(v) |
|     implicit_qtbt_angular_max_diff_to_split_z | se(v) |
|   } | |
|   neighbour_context_restriction_flag | u(1) |
|   inferred_direct_coding_mode_enabled_flag | u(1) |
|   bitwise_occupancy_coding_flag | u(1) |
|   adjacent_child_contextualization_enabled_flag | u(1) |
|   log2_neighbour_avail_boundary | ue(v) |
|   log2_intra_pred_max_node_size | ue(v) |
|   log2_trisoup_node_size | ue(v) |
|   geom_scaling_enabled_flag | u(1) |
|   if ( geom_scaling_enabled_flag ) | |
|     geom_base_qp | ue(v) |
|   gps_implicit_geom_partition_flag | u(1) |
|   if ( gps_implicit_geom_partition_flag ) { | |
|     gps_max_num_implicit_qtbt_before_ot | ue(v) |
|     gps_min_size_implicit_qtbt | ue(v) |
|   } | |
|   gps_extension_flag | u(1) |
|   if ( gps_extension_flag ) | |
|     while( more_data_in_byte_stream( ) ) | |
|       gps_extension_data_flag | u(1) |
|   byte_alignment( ) | |
| } | |

FIG. 22

| geometry_parameter_set( ) { | Descriptor |
|---|---|
| …. | |
| else if( !geom_octree_flag ) { | |
|   root_slice_present_flag | u(1) |
|   dependent_slice_present_flag | u(1) |
|   dependent_tree_present_flag | u(1) |
| } | |
| …. | |

FIG. 23

| tile_parameter_set( ) { | Descriptor |
|---|---|
|    num_tiles | ue(v) |
|    for( i = 0; i < num_tiles; i++ ) { | |
|       tile_bounding_box_offset_x[ i ] | se(v) |
|       tile_bounding_box_offset_y[ i ] | se(v) |
|       tile_bounding_box_offset_z[ i ] | se(v) |
|       tile_bounding_box_size_width[ i ] | ue(v) |
|       tile_bounding_box_size_height[ i ] | ue(v) |
|       tile_bounding_box_size_depth[ i ] | ue(v) |
|    } | |
|    byte_alignment( ) | |
| } | |
| | |

FIG. 24

| tile_parameter_set( ) { | Descriptor |
|---|---|
| .... | |
| if( !geom_octree_flag ) { | |
|   root_slice_present_flag | u(1) |
|   dependent_slice_present_flag | u(1) |
|   dependent_tree_present_flag | u(1) |
| } | |
| .... | |

FIG. 25

| attribute_parameter_set ( ) { | Descriptor |
|---|---|
|   aps_attr_parameter_set_id | ue(v) |
|   aps_seq_parameter_set_id | ue(v) |
|   attr_coding_type | ue(v) |
|   aps_attr_initial_qp | ue(v) |
|   aps_attr_chroma_qp_offset | se(v) |
|   aps_slice_qp_delta_present_flag | u(1) |
|   LodParametersPresent = ( attr_coding_type == 0 \|\| attr_coding_type == 2 ) ? 1 : 0 | |
|   if ( LodParametersPresent ) { | |
|     lifting_num_pred_nearest_neighbours_minus1 | ue(v) |
|     lifting_search_range_minus1 | ue(v) |
|     for ( k = 0; k < 3; k++ ) | |
|       lifting_neighbour_bias[ k ] | ue(v) |
|     if ( attr_coding_type == 2 ) | |
|       lifting_scalability_enabled_flag | u(1) |
|     if ( ! lifting_scalability_enabled_flag ) { | |
|       lifting_num_detail_levels_minus1<br>[Ed. The V7.0 code use the variable without minus1. It should be aligned] | ue(v) |
|       if ( lifting_num_detail_levels_minus1 > 0 ) { | |
|         lifting_lod_regular_sampling_enabled_flag | u(1) |
|         for ( idx = 0; idx < num_detail_levels_minus1; idx++ ) { | |
|           if ( lifting_lod_regular_sampling_enabled_flag ) | |
|             lifting_sampling_period_minus2[ idx ] | ue(v) |
|           else | |
|             lifting_sampling_distance_squared_scale_minus1[ idx ] | ue(v) |
|           if ( idx != 0 ) | |
|             lifting_sampling_distance_squared_offset[ idx ] | ue(v) |
|         } | |
|       } | |
|     } | |
|     if ( attr_coding_type == 0 ) { | |
|       lifting_adaptive_prediction_threshold | ue(v) |
|       lifting_intra_lod_prediction_num_layers | ue(v) |
|       lifting_max_num_direct_predictors | ue(v) |
|       inter_component_prediction_enabled_flag | u(1) |
|     } | |
|   } | |
|   if ( attribute_coding_type == 1 ) { //RAHT | |
|     raht_prediction_enabled_flag | u(1) |
|     if (raht_prediction_enabled_f lag) { | |
|       raht_prediction_threshold0 | ue(v) |
|       raht_prediction_threshold1 | ue(v) |
|     } | |
|   } | |
|   aps_extension_flag | u(1) |
|   if( aps_extension_flag ) | |
|     while( more_data_in_byte_stream( ) ) | |
|       aps_extension_data_flag | u(1) |
|   byte_alignment( ) | |
| } | |

FIG. 26

| geometry_slice_bitstream( ) { | Descriptor |
|---|---|
| geometry_slice_header( ) | |
| geometry_slice_data( ) | |
| } | |

FIG. 27

| geometry_slice_header( ) { | Descriptor |
|---|---|
| gsh_geometry_parameter_set_id | ue(v) |
| gsh_tile_id | ue(v) |
| gsh_slice_id | ue(v) |
| frame_idx | u(n) |
| gsh_num_points | u(24) |
| if( gps_box_present_flag ) { | |
|     if( gps_gsh_box_log2_scale_present_flag ) | |
|         gsh_box_log2_scale | ue(v) |
|     gsh_box_origin_x | ue(v) |
|     gsh_box_origin_y | ue(v) |
|     gsh_box_origin_z | ue(v) |
| } | |
| if ( gps_implicit_geom_partition_flag ) { | |
|     gsh_log2_max_nodesize_x | ue(v) |
|     gsh_log2_max_nodesize_y_minus_x | se(v) |
|     gsh_log2_max_nodesize_z_minus_y | se(v) |
| } else { | |
|     gsh_log2_max_nodesize | ue(v) |
| } | |
| if( geom_scaling_enabled_flag ) { | |
|     geom_slice_qp_offset | se(v) |
|     geom_octree_qp_offsets_enabled_flag | u(1) |
|     if( geom_octree_qp_offsets_enabled_flag ) | |
|         geom_octree_qp_offsets_depth | ue(v) |
| } | |
| byte_alignment( ) | |
| } | |

FIG. 28

| geometry_data_unit_header ( ) { | Descriptor |
|---|---|
| …. | |
| else if( !geom_octree_flag ) { | |
| num_tree | u(8) |
| for( i=0; i<num_tree; i++ ) | |
| tree_id[i] | u(8) |
| if ( root_slice_present_flag ) { | |
| root_slice_flag | u(1) |
| if (root_slice_flag ) { | |
| root_point_ascending_order_flag | u(1) |
| } | |
| } | |
| if( dependent_slice_present_flag ) { | |
| dependent_slice_flag | u(1) |
| if( dependent_slice_flag ) { | |
| reference_gsh_slice_id | ue(v) |
| reference_tree_id | u(8) |
| reference_node_idx | u(8) |
| } | |
| } | |
| if( dependent_tree_present_flag ) { | |
| dependent_tree_flag | u(1) |
| if( dependent_slice_flag ) { | |
| reference_tree_id | u(8) |
| reference_node_idx | u(8) |
| } | |
| } | |
| } | |
| …. | |

FIG. 29

| geometry_predtree_data( ) { | Descriptor |
|---|---|
| if( root_slice_flag ) { | |
|   geometry_predtree_node_root_slice ( root_slice_flag ) | |
| PtnNodeIdx = 0 | |
| do { | |
|   geometry_predtree_node( PtnNodeIdx ) | |
| } while( NodeIdx <= geom_num_points_minus1 ) | |
| } | |

FIG. 30

| geometry_predtree_node_root_slice ( root_slice_flag ) { | Descriptor |
|---|---|
|   if( !root_point_ascending_order_flag ) { | |
|     num_root_points | u(8) |
|     for( i = 0; i < num_root_points; i++ ) { | |
|       original_gsh_slice_id | ue(v) |
|       original_tree_id | |
|       original_node_idx | u(8) |
|     } | |
|   } | |
| } | |

FIG. 31

| geometry_slice_data( ) { | Descriptor |
|---|---|
|    for( depth = 0; depth < MaxGeometryOctreeDepth; depth++ ) { | |
|       for( nodeIdx = 0; nodeIdx < NumNodesAtDepth[ depth ]; nodeIdx++ ) { | |
|          xN = NodeX[ depth ][ nodeIdx ] | |
|          yN = NodeY[ depth ][ nodeIdx ] | |
|          zN = NodeZ[ depth ][ nodeIdx ] | |
|          geometry_node( depth, nodeIdx, xN, yN, zN ) | |
|       } | |
|    } | |
|    if ( log2_trisoup_node_size > 0 ) | |
|       geometry_trisoup_data( ) | |
| } | |

FIG. 32

| attribute_slice_bitstream( ) { | Descriptor |
|---|---|
| attribute_slice_header( ) | |
| attribute_slice_data( ) | |
| } | |

FIG. 33

| attribute_slice_header( ) { | Descriptor |
|---|---|
|   ash_attr_parameter_set_id | ue(v) |
|   ash_attr_sps_attr_idx | ue(v) |
|   ash_attr_geom_slice_id | ue(v) |
|   if ( aps_slice_qp_delta_present_flag ) { | |
|     ash_attr_qp_delta_luma | se(v) |
|     if( attribute_dimension_minus1[ ash_attr_sps_attr_idx ] > 0 ) | |
|       ash_attr_qp_delta_chroma | se(v) |
|   } | |
|   ash_attr_layer_qp_delta_present_flag | u(1) |
|   if ( ash_attr_layer_qp_delta_present_flag ) { | |
|     ash_attr_num_layer_qp_minus1 | ue(v) |
|     for( i = 0; i < NumLayerQp; i++ ){ | |
|       ash_attr_layer_qp_delta_luma[i] | se(v) |
|       if( attribute_dimension_minus1[ ash_attr_sps_attr_idx ] > 0 ) | |
|         ash_attr_layer_qp_delta_chroma[i] | se(v) |
|     } | |
|   } | |
|   ash_attr_region_qp_delta_present_flag | u(1) |
|   if ( ash_attr_region_qp_delta_present_flag ) { | |
|     ash_attr_qp_region_box_origin_x | ue(v) |
|     ash_attr_qp_region_box_origin_y | ue(v) |
|     ash_attr_qp_region_box_origin_z | ue(v) |
|     ash_attr_qp_region_box_width | ue(v) |
|     ash_attr_qp_region_box_height | ue(v) |
|     ash_attr_qp_region_box_depth | ue(v) |
|     ash_attr_region_qp_delta | se(v) |
|   } | |
|   byte_alignment( ) | |
| } | |

FIG. 34

| attribute_slice_data( ) { | Descriptor |
|---|---|
|     dimension = attribute_dimension[ ash_attr_sps_attr_idx ] | |
|     zerorun | ae(v) |
|     for( i = 0; i < pointCount; i++ ) { | |
|         if( attr_coding_type = = 0 && <br>             maxPredDiff[ i ] > lifting_adaptive_prediction_threshold && <br>             MaxNumPredictors > 1 ) { | |
|             predIndex[ i ] | ae(v) |
|         } | |
|         if( zerorun > 0 ) { | |
|             for( k = 0; k < dimension ; k++ ) | |
|                 values[ k ][ i ] = 0 | |
|             zerorun -= 1 | |
|         } | |
|         else { | |
|             attribute_coding( dimension, i ) | ae(v) |
|             zerorun | ae(v) |
|         } | |
|     } | |
|     byte_alignment( ) | |
| } | |

POINT CLOUD DATA TRANSMISSION APPARATUS, POINT CLOUD DATA TRANSMISSION METHOD, POINT CLOUD DATA RECEPTION APPARATUS, AND POINT CLOUD DATA RECEPTION METHOD

This application is a National Phase application under 35 U.S.C. 371 of International Application No. PCT/KR2021/010734, filed on Aug. 12, 2021, which claims the benefit of Korean Application No. 10-2020-0101412, filed on Aug. 12, 2020, the contents of which are incorporated by reference herein in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), extended reality (XR), and self-driving services. However, tens of thousands to hundreds of thousands of point data are required to represent point cloud content. Therefore, there is a need for a method for efficiently processing a large amount of point data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud.

Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for efficiently transmitting and receiving a geometry-point cloud compression (G-PCC) bitstream.

Another object of the present disclosure is to provide a point cloud data transmission device, a point cloud data transmission method, a point cloud data reception device, and a point cloud data reception method for performing transmission/reception of point cloud data through compression by applying a predication-based coding method so as to efficiently compress the point cloud data.

Another object of the present disclosure is to provide a point cloud data transmission device, a point cloud data transmission method, a point cloud data reception device, and a point cloud data reception method for performing prediction and compression on a root node of a predictive tree and performing decompression at a receiving side, when compressing point cloud data by applying a prediction-based coding method.

Another object of the present disclosure is to provide a point cloud data transmission device, a point cloud data transmission method, a point cloud data reception device, and a point cloud data reception method for performing prediction and compression on root nodes of compression units and performing decompression at a receiving side by allowing dependency between the compression units, when points of point cloud data are divided into a plurality of compression units and points within each compression unit are compressed based on a predictive tree.

Another object of the present disclosure is to provide a point cloud data transmission device, a point cloud data transmission method, a point cloud data reception device, and a point cloud data reception method for performing prediction and compression on root nodes within a separate compression unit and performing decompression at a receiving side by gathering root nodes within compression units to construct a separate compression unit, when points of point cloud data are divided into a plurality of compression units and points within each compression unit are compressed based on a predictive tree.

The objects of the present disclosure are not limited only what has been described hereinabove and the scope of the present disclosure may be extended to other objects that may be inferred by those skilled in the art based on the entire contents of the present document.

Technical Solution

To achieve these objects and other advantages and in accordance with embodiments, a point cloud data transmission method includes encoding geometry data of point cloud data, encoding attribute data of the point cloud data based on the geometry data, and transmitting the encoded geometry data, the encoded attribute data, and signaling data.

The encoding the geometry data may include dividing the geometry data into a plurality of compression units, generating, for each compression unit, a predictive tree based on the geometry data within each compression unit, and compressing the geometry data within the compression unit by performing prediction based on the prediction tree.

The compressing the geometry data may include detecting one or more reference compression units referenced by a root node within a current compression unit from other compression units, detecting a reference node referenced by the root node within the current compression unit from the detected one or more reference compression units, and compressing the root node by performing prediction on the root node within the current compression unit based on the detected reference node.

The signaling data may include information related to the one or more reference compression units and to the reference node The compressing the geometry data may include constructing a new compression unit by gathering root nodes of the compression units, generating a geometry tree based on root nodes within the constructed compression unit, and compressing the root nodes by performing prediction based on the generated geometry tree.

The signaling data may include information related to the new compression unit and information related to an original compression unit of each root node.

In accordance with embodiments, a point cloud data transmission device includes a geometry encoder configured to encode geometry data of point cloud data, an attribute encoder configured to encode attribute data of the point cloud data based on the geometry data, and a transmitter configured to transmit the encoded geometry data, the encoded attribute data, and signaling data.

The geometry encoder may divide the geometry data into a plurality of compression units, generate, for each compression unit, a predictive tree based on the geometry data within each compression unit, and compress the geometry data within the compression unit by performing prediction based on the prediction tree.

The geometry encoder may detect one or more reference compression units referenced by a root node within a current compression unit from other compression units, detect a reference node referenced by the root node within the current compression unit from the detected one or more reference compression units, and compress the root node by performing prediction on the root node within the current compression unit based on the detected reference node.

The signaling data may include information related to the one or more reference compression units and to the reference node.

The geometry encoder may construct a new compression unit by gathering root nodes of the compression units, generate a geometry tree based on root nodes within the constructed compression unit, and compress the root nodes by performing prediction based on the generated geometry tree.

The signaling data may include information related to the new compression unit and information related to an original compression unit of each root node.

In accordance with embodiments, a point cloud data reception method includes receiving geometry data, attribute data, and signaling data, decoding the geometry data based on the signaling data, decoding the attribute data based on the signaling data and the decoded geometry data, and rendering point cloud data that is restored based on the signaling data, the decoded geometry data and the decoded attribute data, The decoding the geometry data may include generating a predictive tree within a compression unit based on the signaling data, and reconstructing the geometry data within the compression unit by perming prediction based on the predictive tree.

The reconstructing the geometry data may include identifying a reference compression unit for a root node of a current compression unit and identifying a reference node, based on the signaling data, acquiring prediction information of the root node by performing prediction for the root node of the current compression unit, based on the signaling data and the reference node, and reconstructing a position of the root node, based on prediction information of the root node and residual information of the root node.

The signaling data may include information related to one or more reference compression units referenced by the root node of the current compression unit and to a reference node referenced by the root node of the current compression unit from the one or more reference compression units.

The reconstructing the geometry data may include acquiring prediction information of root nodes of compression units by performing prediction on the root nodes based on the signaling data, and reconstructing a position of the root nodes based on prediction information of the root nodes and residual information of received root nodes.

The signaling data may include information related to a new compression unit and information related to an original compression unit of each root node.

Advantageous Effects

A point cloud data transmission method, a point cloud data transmission device, a point cloud data reception method, and a point cloud data reception device according to embodiments may provide a good-quality point cloud service.

A point cloud data transmission method, a point cloud data transmission device, a point cloud data reception method, and a point cloud data reception device according to embodiments may achieve various video codec methods.

A point cloud data transmission method, a point cloud data transmission device, a point cloud data reception method, and a point cloud data reception device according to embodiments may provide universal point cloud content such as a self-driving service (or an autonomous driving service).

A point cloud data transmission method, a point cloud data transmission device, a point cloud data reception method, and a point cloud data reception device according to embodiments may perform space-adaptive partition of point cloud data for independent encoding and decoding of the point cloud data, thereby improving parallel processing and providing scalability.

A point cloud data transmission method, a point cloud data transmission device, a point cloud data reception method, and a point cloud data reception device according to embodiments may perform encoding and decoding by partitioning the point cloud data in units of tiles and/or slices, and signal necessary data therefore, thereby improving encoding and decoding performance of the point cloud.

A point cloud data transmission method, a point cloud data transmission device, a point cloud data reception method, and a point cloud data reception device according to embodiments may provide fast encoding and decoding in an environment requiring low delay or low latency by using a prediction-based point cloud compression method.

A point cloud data transmission method, a point cloud data transmission device, a point cloud data reception method, and a point cloud data reception device according to embodiments may raise the compression efficiency of point cloud data by performing prediction and compression even on root nodes in a predictive tree.

A point cloud data transmission method, a point cloud data transmission device, a point cloud data reception method, and a point cloud data reception device according to embodiments may perform prediction and compression on root nodes of compression units by allowing dependency between the compression units, when points of point cloud data are divided into a plurality of compression units and points within each compression unit are compressed based on a predictive tree.

A point cloud data transmission method, a point cloud data transmission device, a point cloud data reception method, and a point cloud data reception device according to embodiments may perform prediction and compression on root nodes within a separate compression unit by gathering root nodes within compression units to construct a separate compression unit, when points of point cloud data are divided into a plurality of compression units and points within each compression unit are compressed based on a predictive tree. Thereby, the compression efficiency of the point cloud data may be raised.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 6 illustrates an example of octree and occupancy code according to embodiments.

FIG. 7 illustrates an example of a neighbor node pattern according to embodiments.

FIG. 20 is a diagram illustrating an embodiment of a syntax structure of a sequence parameter set according to the present disclosure.

FIG. 21 is a diagram illustrating an example of a syntax structure of a geometry parameter set according to embodiments.

FIG. 22 is a diagram illustrating another example of a syntax structure of a geometry parameter set according to embodiments.

FIG. 23 is a diagram illustrating an example of a syntax structure of a tile parameter set according to embodiments.

FIG. 24 is a diagram illustrating another example of a syntax structure of a tile parameter set according to embodiments.

FIG. 25 is a diagram illustrating an example of a syntax structure of an attribute parameter set according to embodiments.

FIG. 26 is a diagram illustrating an example of a syntax structure of a geometry slice bitstream( ) according to embodiments.

FIG. 27 is a diagram illustrating an example of a syntax structure of a geometry slice header according to embodiments.

FIG. 28 is a diagram illustrating another example of a syntax structure of a geometry slice header according to embodiments.

FIG. 29 is a diagram illustrating an example of a syntax structure of geometry predictive tree data according to embodiments.

FIG. 30 is a diagram illustrating an example of a syntax structure of geometry_predtree_node_root_slice (root_slice_flag) according to embodiments.

FIG. 31 is a diagram illustrating an example of a syntax structure of geometry slice data according to the present disclosure.

FIG. 32 is a diagram illustrating an example of a syntax structure of an attribute slice bitstream( ) according to embodiments.

FIG. 33 is a diagram illustrating an example of a syntax structure of an attribute slice header according to embodiments.

FIG. 34 is a diagram illustrating an example of a syntax structure of attribute slice data according to embodiments.

BEST MODE

Figure 1:
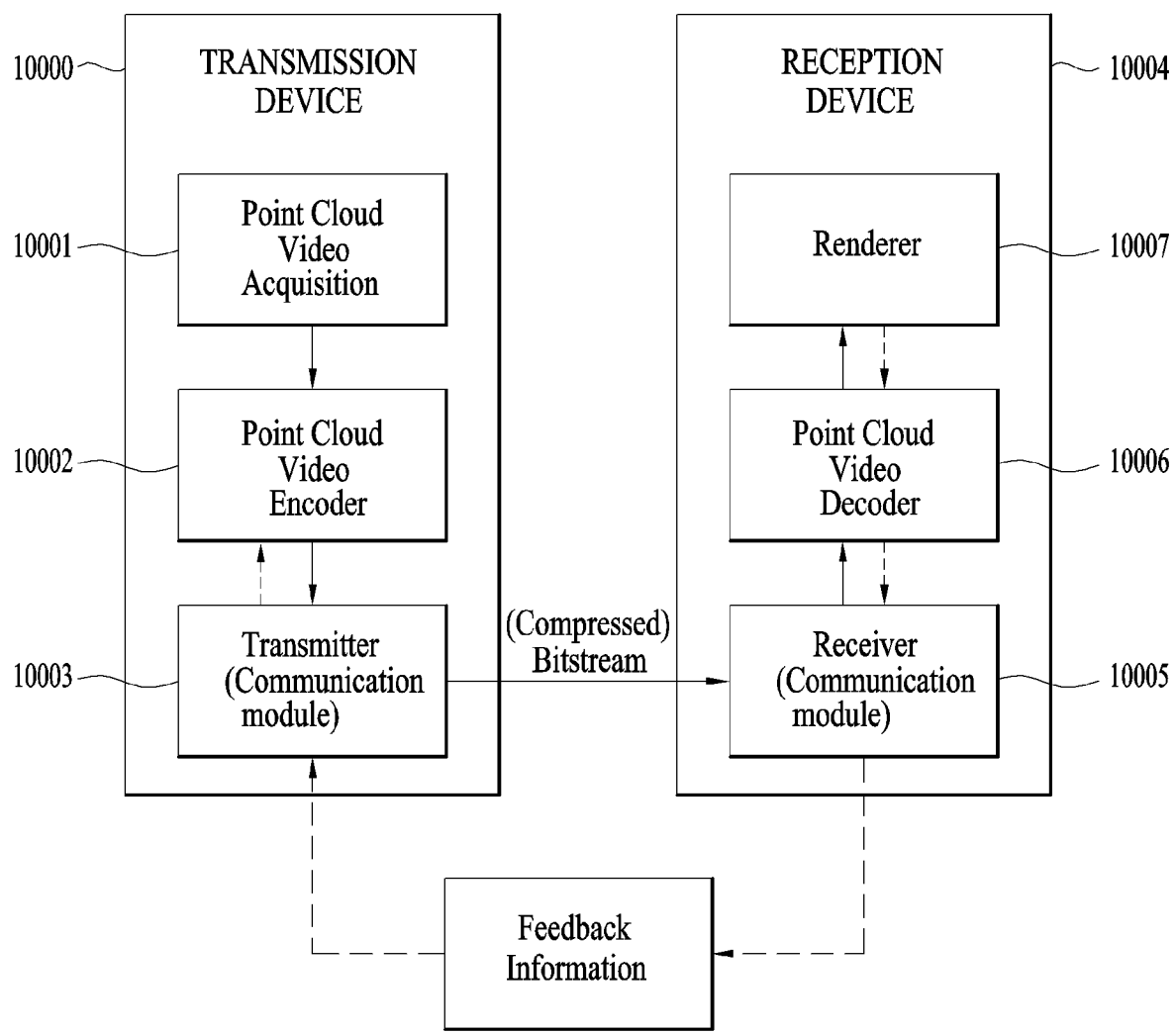
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in this specification have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. According to an embodiment, the renderer 10007 may render the decoded point cloud data according to a viewport. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to the embodiments may represent information about a position, orientation, angle, and motion of a user's head. The reception device 10004 according to the embodiments may calculate viewport information based on the head orientation information. The viewport information is information about a region of a point cloud video that the user is viewing (that is, a region that the user is currently viewing). That is, the viewport information is information about a region that the user is currently viewing in the point cloud video. In other words, the viewport or viewport region may represent a region that the user is viewing in the point cloud video. A viewpoint is a point that the user is viewing in the point cloud video, and may represent a center point of the viewport region. That is, the viewport is a region centered on a viewpoint, and the size and shape of the region may be determined by a field of view (FOV). Accordingly, the reception device 10004 may extract the viewport information based on a vertical or horizontal FOV supported by the device as well as the head orientation information. In addition, the reception device 10004 may perform gaze analysis or the like based on the head orientation information and/or the viewport information to determine the way the user consumes a point cloud video, a region that the user gazes at in the point cloud video, and the gaze time. According to embodiments, the reception device 10004 may transmit feedback information including the result of the gaze analysis to the transmission device 10000. According to embodiments, a device such as a VR/XR/AR/MR display may extract a viewport region based on the position/orientation of a user's head and a vertical or horizontal FOV supported by the device. According to embodiments, the head orientation information and the viewport information may be referred to as feedback information, signaling information, or metadata.

The feedback information according to the embodiments may be acquired in the rendering and/or display process. The feedback information may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The feedback information may not only be transmitted to the transmitting side, but also be consumed by the receiving side. That is, the point cloud content providing system may process (encode/decode/render) point cloud data based on the feedback information. For example, the point cloud video decoder 10006 and the renderer 10007 may preferentially decode and render only the point cloud video for a region currently viewed by the user, based on the feedback information, that is, the head orientation information and/or the viewport information.

The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
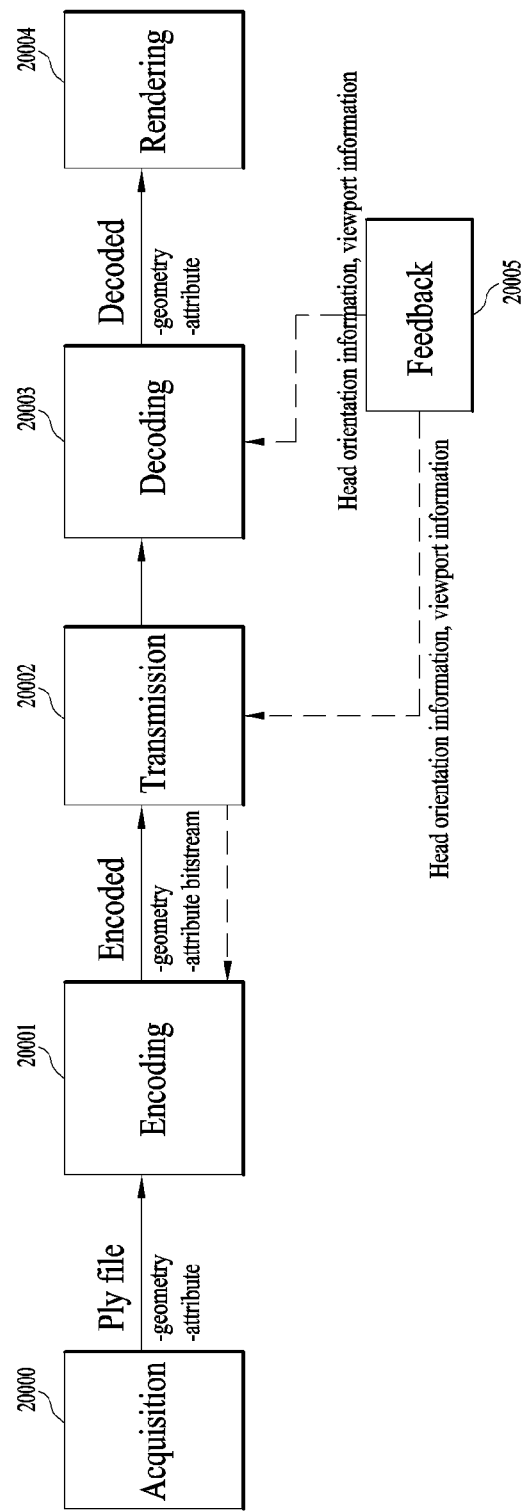
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC). The point cloud content providing system according to the embodiments (for example, the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like.

The point cloud content providing system (for example, the point cloud transmission device 10000 or the point cloud video acquisition unit 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
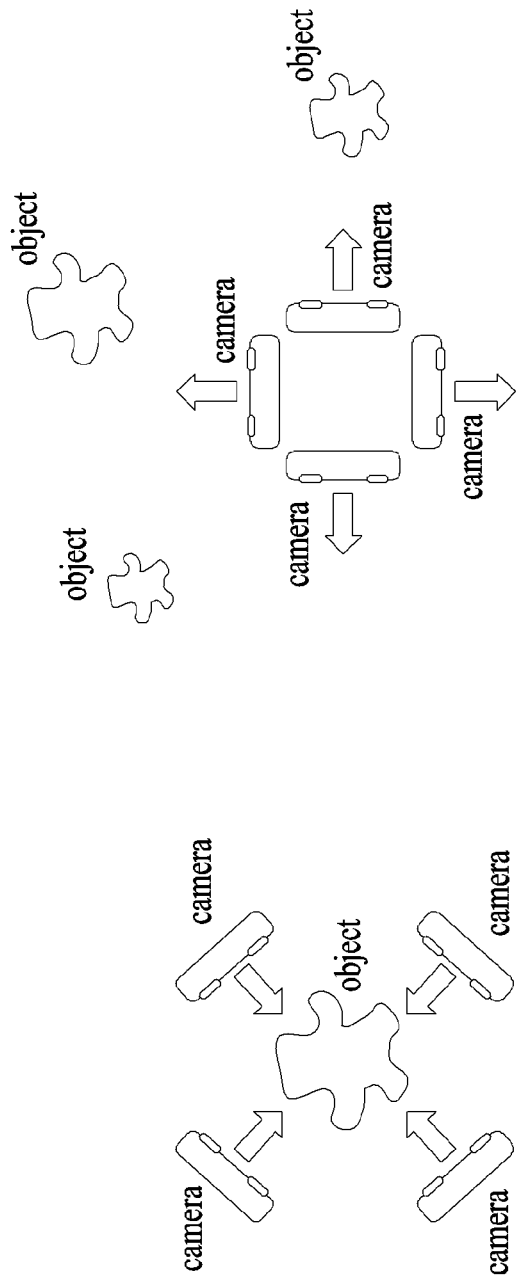
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
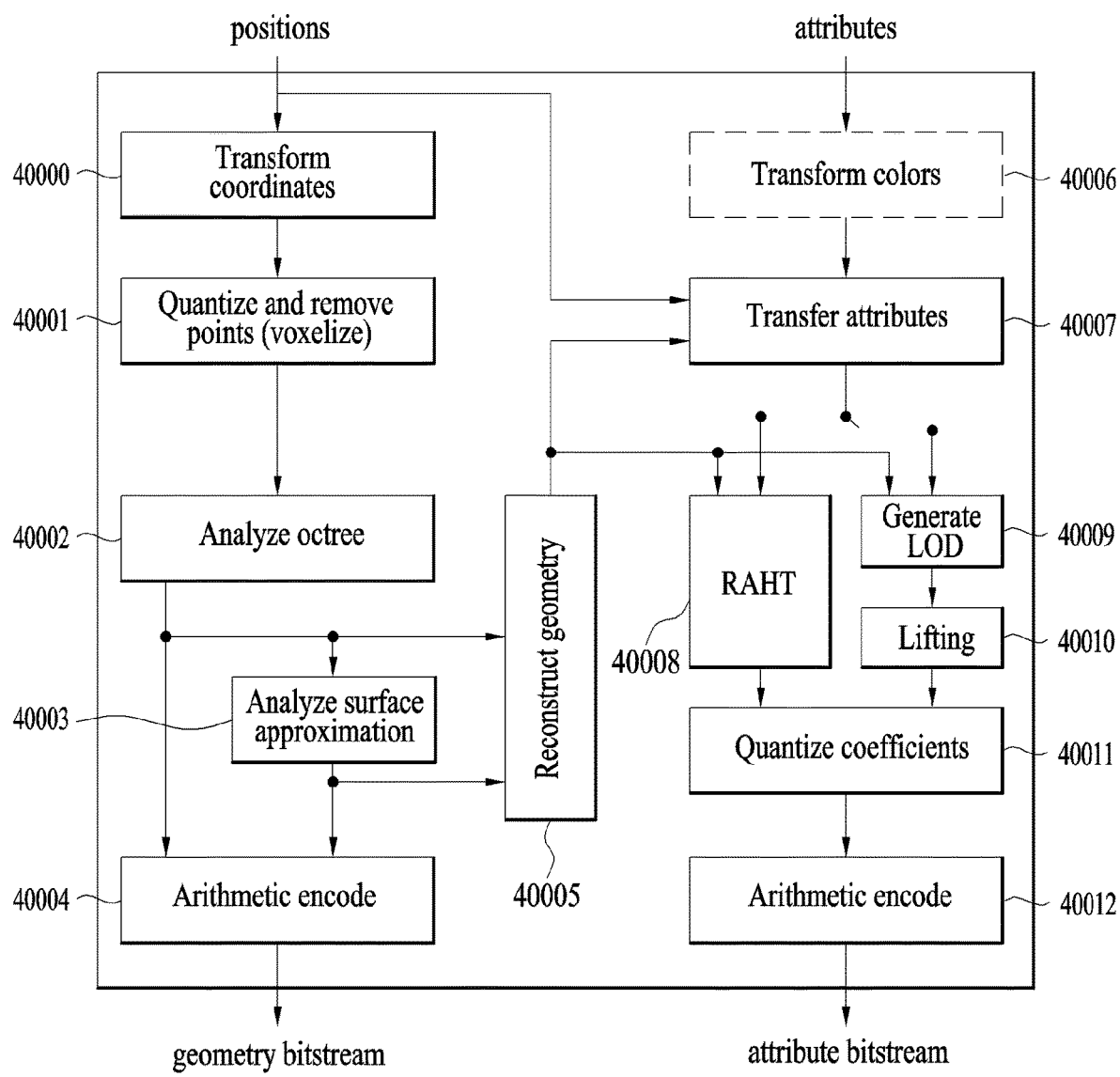
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 to 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
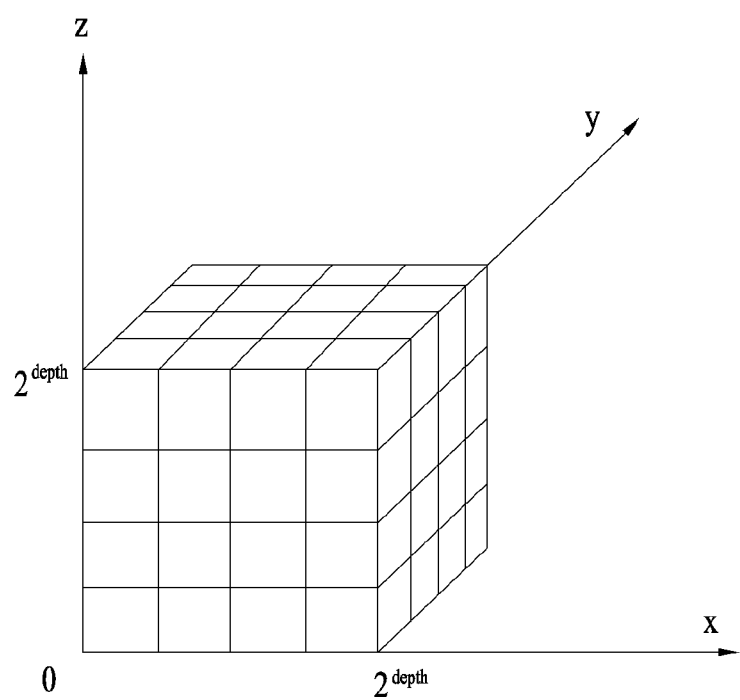
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (24, 24, 24) is recursively subdivided. One voxel includes at least one point. The spatial coordinates of a voxel may be estimated from the positional relationship with a voxel group. As described above, a voxel has an attribute (such as color or reflectance) like pixels of a 2D image/ video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and (2d, 2d, 2d). Here, $2^d$ may be set to a value constituting the smallest bounding box surrounding all points of the point cloud content (or point cloud video). Here, d denotes the depth of the octree. The value of d is determined in Equation 1. In Equation 1, $(x^{int}_n, y^{int}_n, z^{int}_n)$ denotes the positions (or position values) of quantized points.

$$d = \text{Ceil}(\text{Log } 2(\text{Max}(x_n^{int}, y_n^{int}, z_n^{int}, n=1, \ldots, N)+1)) \quad \text{Equation 1}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (for example, the arithmetic encoder 40004) according to the embodiments may perform entropy encoding on the occupancy codes. In order to increase the compression efficiency, the point cloud video encoder may perform intra/inter-coding on the occupancy codes. The reception device (for example, the reception device 10004 or the point cloud video decoder 10006) according to the embodiments reconstructs the octree based on the occupancy codes.

The point cloud video encoder (for example, the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

Equation 2

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix} \quad (1)$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad (2)$$

$$\begin{bmatrix} \sigma_x^2 \\ \sigma_y^2 \\ \sigma_z^2 \end{bmatrix} = \sum_{i=1}^{n}\begin{bmatrix} \bar{x}_i^2 \\ \bar{y}_i^2 \\ \bar{z}_i^2 \end{bmatrix} \quad (3)$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table 1 below shows a combination of vertices for creating a triangle according to the number of the vertices. The vertices are ordered from 1 to n. The table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

[Table 1] Triangles Formed from Vertices Ordered 1, . . . , n called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments. In order to increase the compression efficiency of the point cloud video, the point cloud video encoder according to the embodiments may perform entropy coding based on context adaptive arithmetic coding.

The point cloud video encoder may entropy encode based on a context adaptive arithmetic coding to enhance compression efficiency of the point cloud video.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The up part of FIG. 7 shows a cube corresponding to a node (a cube positioned in the middle) and six cubes (neighbor nodes) sharing at least one face with the cube. The nodes shown in the figure are nodes of the same depth. The

TABLE 1

| n | Triangles |
|---|-----------|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are numbers shown in the figure represent weights (1, 2, 4, 8, 16, and 32) associated with the six nodes, respectively. The weights are assigned sequentially according to the positions of neighboring nodes.

The down part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (for example, based on a table by which 64 is changed to 10 or 6).

Figure 8:
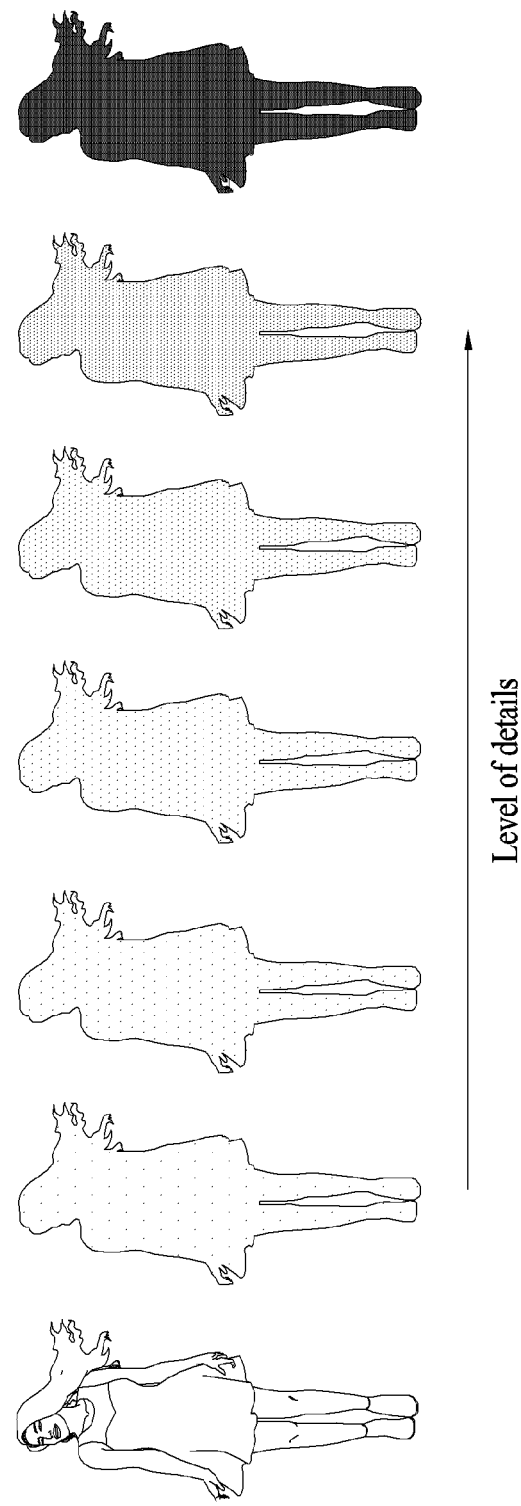
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud video encoder (for example, the LOD generator 40009) may classify (or reorganize) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
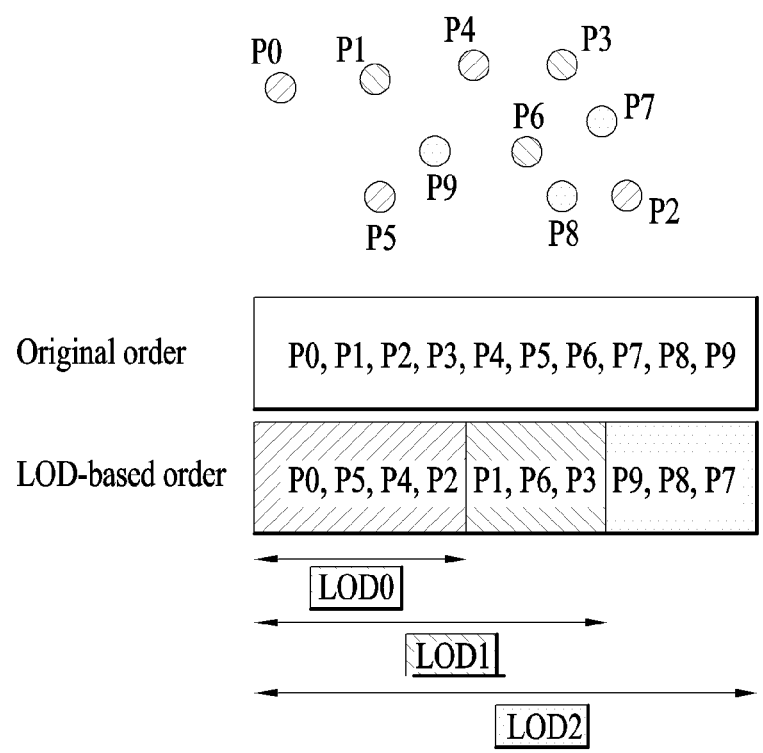
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (for example, the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (for example, the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in Table 3.

TABLE 2 int PCCQuantization(int value, int quantStep) {
if( value >=0) {
return floor(value / quantStep + 1.0 / 3.0);
} else {
return -floor(-value / quantStep + 1.0 / 3.0);
}
}

TABLE 3 int PCCInverseQuantization(int value, int quantStep) {
if( quantStep == 0) {
return value;
} else {
return value * quantStep;
}
}

When the predictor of each point has neighbor points, the point cloud video encoder (e.g., the arithmetic encoder 40012) according to the embodiments may perform entropy coding on the quantized and inversely quantized residual attribute values as described above. 1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

Equation 3

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 40012). The weights are calculated as $w_{l-1_{x,y,z}}=w_{l_{2x,y,z}}+w_{l_{2x+1,y,z}}$. The root node is created through the $g_{1_{0,0,0}}$ and $g_{1_{0,0,1}}$ as Equation 4.

Equation 4

$$\begin{bmatrix} gDC \\ h0_{0,0,0} \end{bmatrix} = T_{w1000w1001} \begin{bmatrix} g1_{0,0,0z} \\ g1_{0,0,1} \end{bmatrix}$$

The value of gDC is also quantized and subjected to entropy coding like the high-pass coefficients.

Figure 10:
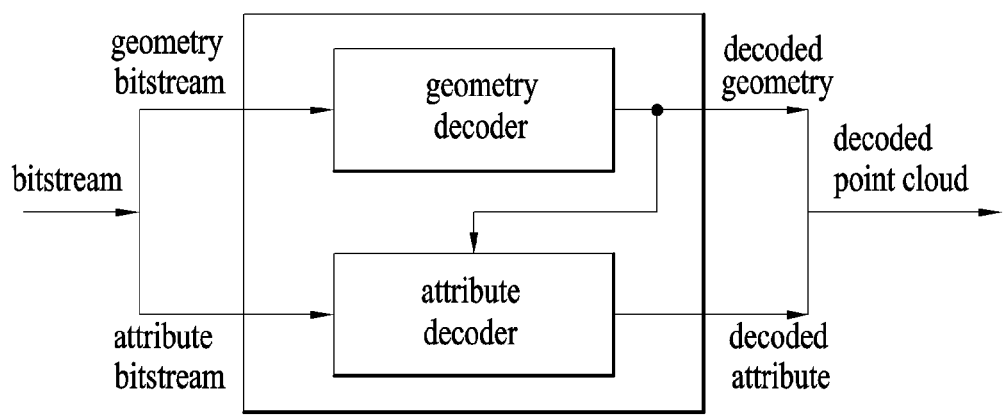
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
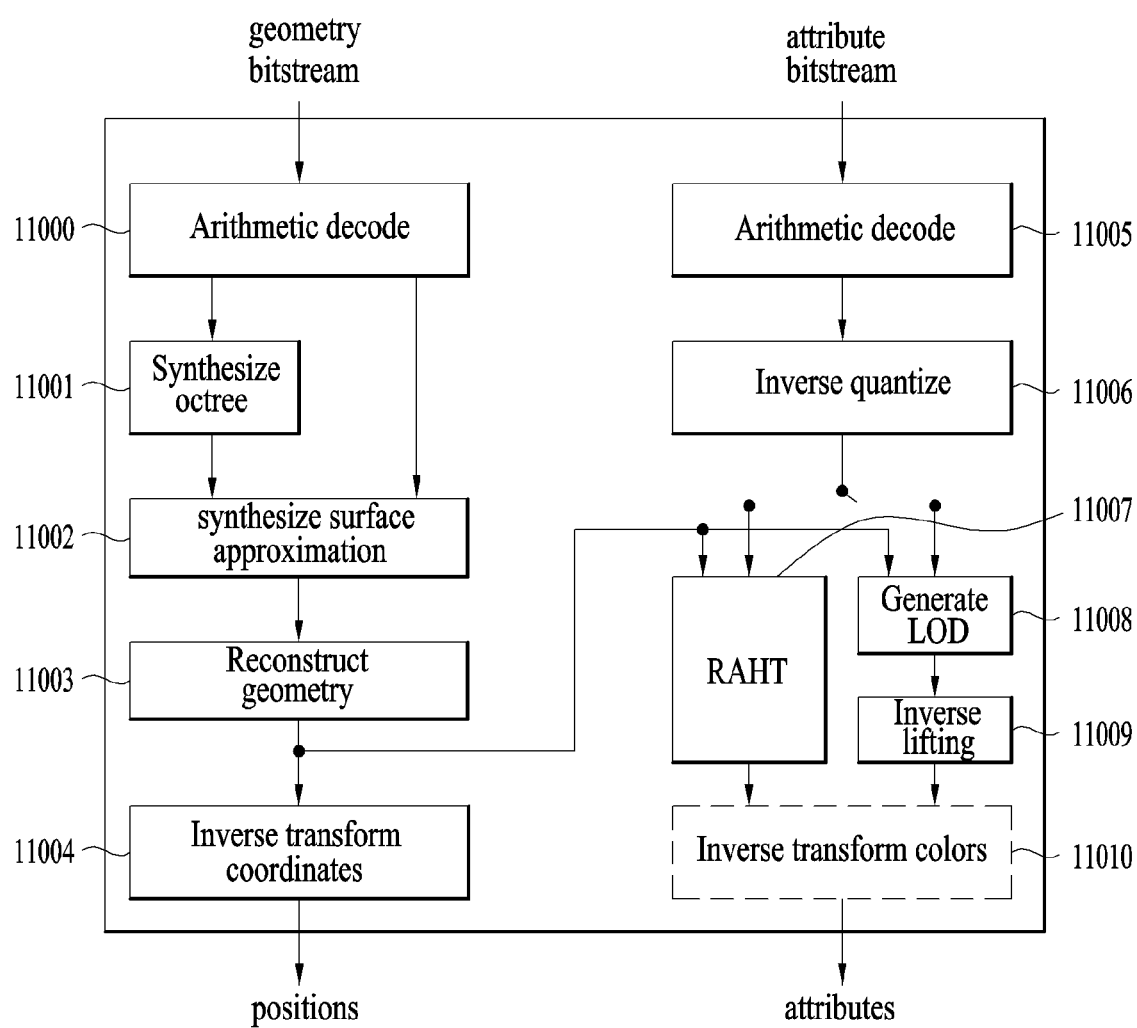
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is a reverse process of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
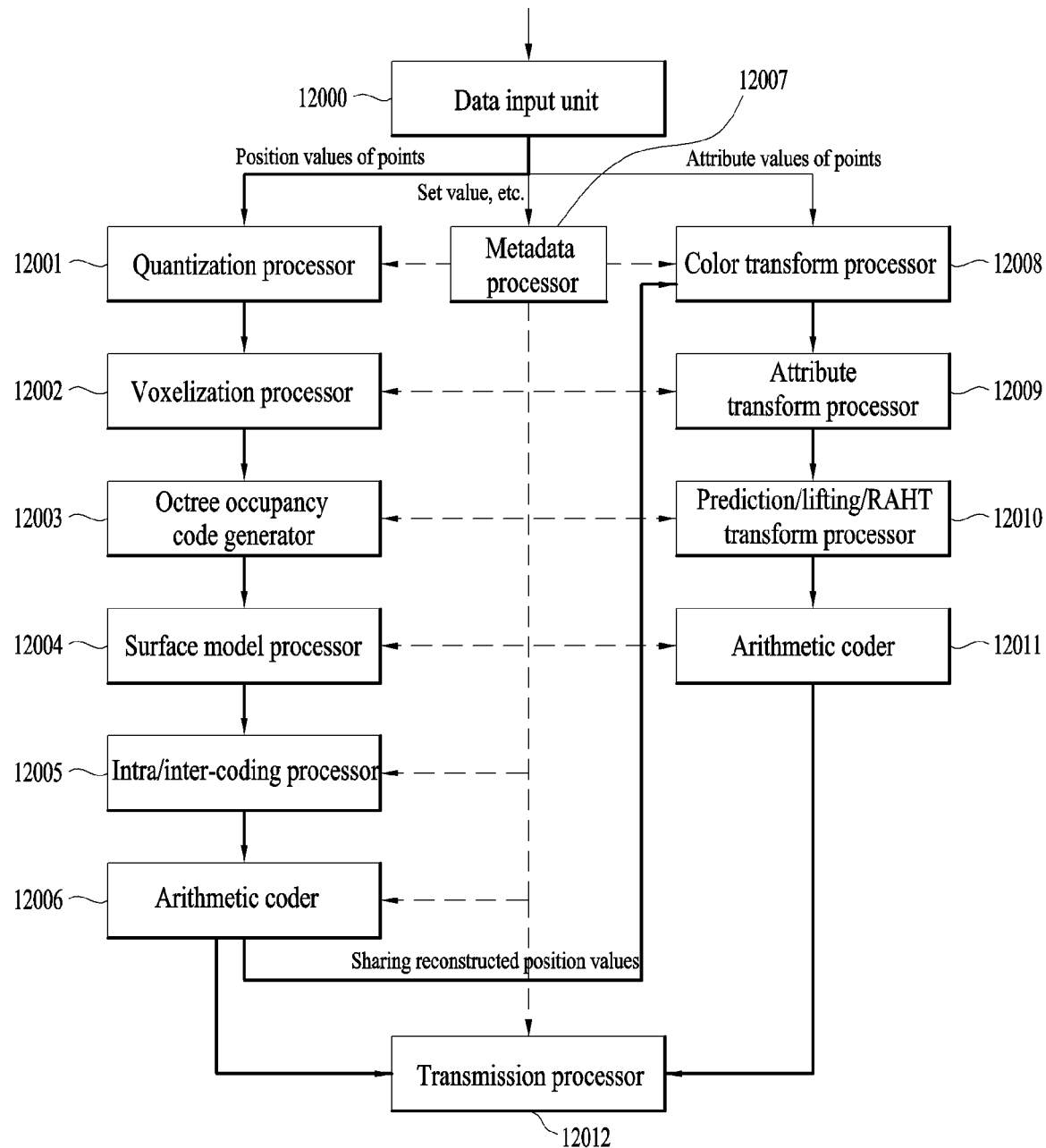
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. A detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. A detailed description thereof is omitted. The prediction/lifting/RAHT transform processor 12010 according to the embodiments may code the transformed attributes by any one or more combinations of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream Geom0$^0$ and one or more attribute bitstreams Attr0$^0$ and Attr1$^0$. The TPS (or tile inventory) according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
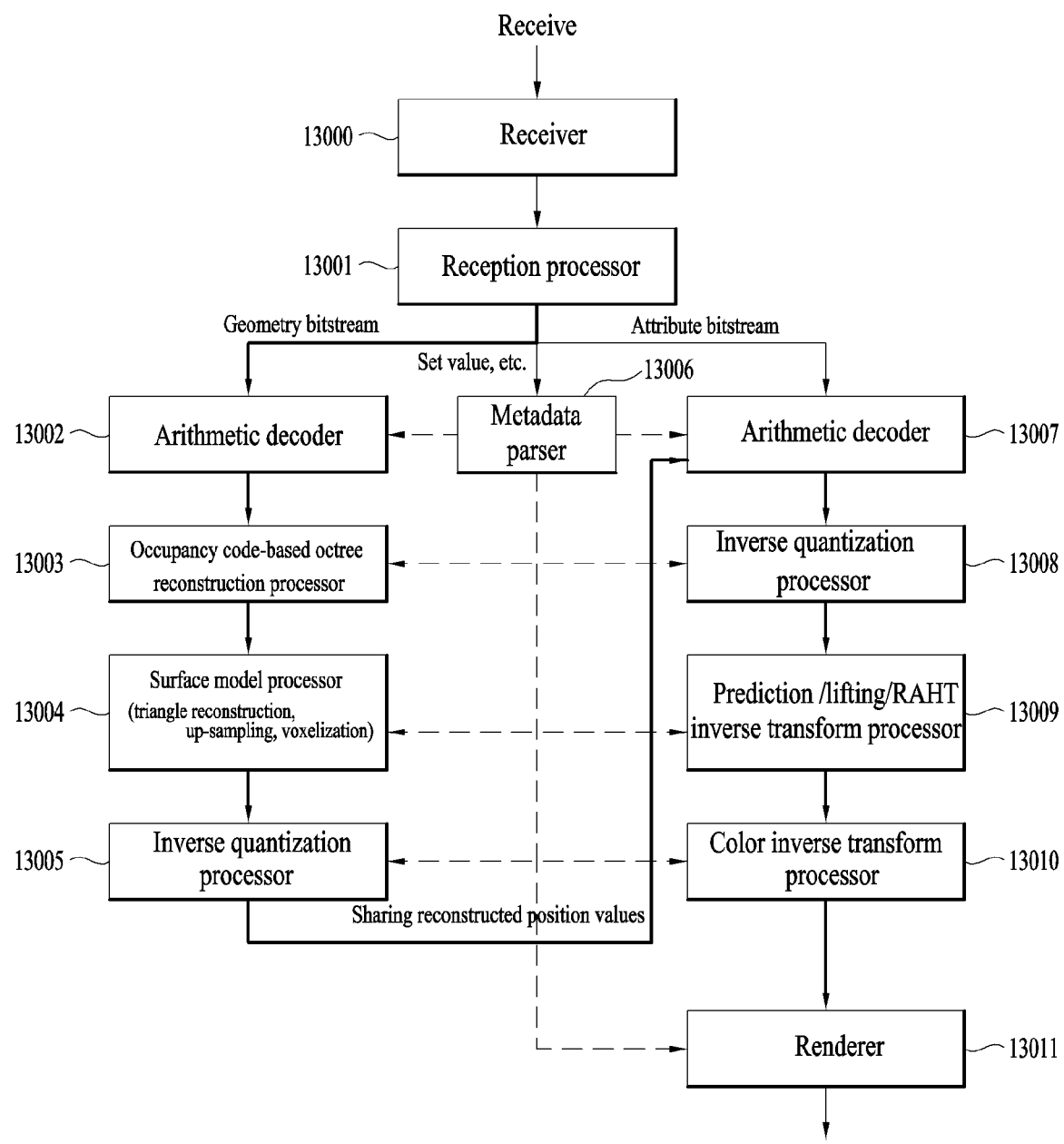
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. A detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream(or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (for example, triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding which are the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
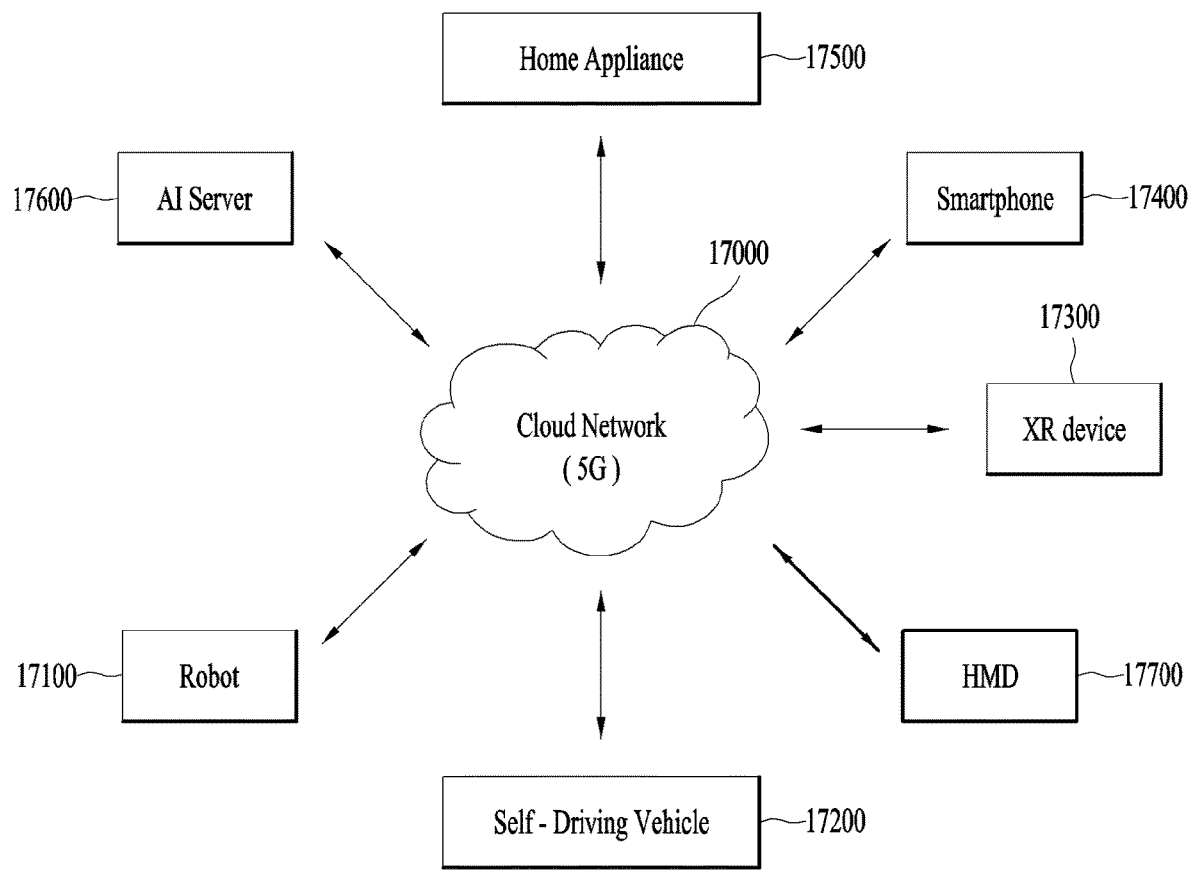
FIG. 14 illustrates an exemplary structure operable in connection with point cloud data methods/devices according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compressed data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud data may include a set of points, and each point may have a geometry (referred to also as geometry information) and an attribute (referred to as attribute information). The geometry information represents three-dimensional (3D) position information (xyz) of each point. That is, the position of each point is represented by parameters in a coordinate system representing a 3D space (e.g., parameters (x, y, z) of three axes, X, Y, and Z axes, representing a space). The attribute information represents color (RGB, YUV, etc.), reflectance, normal vectors, transparency, etc. of the point.

The point cloud data transmission device according to the embodiments may perform low-latency coding according to content characteristics of the point cloud data. For example, when the point cloud data is data captured in real time from a LiDAR or a 3D map data transmitted in real time, the point cloud data transmission device needs to process the point cloud data such that latency is minimized and compression efficiency is raised.

According to embodiments, a point cloud data encoding process includes compressing geometry information based on an octree, a trisoup, or prediction and compressing attribute information based on geometry information reconstructed (or decoded) with position information changed through compression. A point cloud data decoding process includes receiving an encoded geometry bitstream and an encoded attribute bitstream, decoding geometry information based on an octree, a trisoup, or prediction, and decoding attribute information based on geometry information reconstructed through a decoding operation.

Since octree-based or trisoup-based geometry information compression according to the embodiments has been described in detail with reference to FIGS. 4 to 13, a description thereof is omitted herein.

Hereinafter, in an embodiment of the present disclosure, prediction-based geometry information compression will be described.

Prediction-based geometry information compression according to the embodiments is performed by defining a prediction structure for point cloud data. This structure is represented as a predictive tree having a vertex associated with each point of the point cloud data. The predictive tree may include a root vertex (referred to as a root point) and a leaf vertex (referred to as a leaf point). Points below the root point may have at least one child, and depth increases in the direction of the leaf point. Each point may be predicted from parent nodes in the predictive tree. According to embodiments, each point may be predicted by applying one of various prediction modes (e.g., no prediction, delta prediction, linear prediction, and parallelogram prediction) based on the point positions of a parent, a grandparent, and a great-grandparent of the corresponding point.

In this way, prediction-based coding performs prediction on the point cloud data based on neighbor (or periphery) point information. In addition, since this prediction-based coding does not perform step-by-step scanning for all points, there is no need to wait for all point cloud data to be captured, and progressively captured point cloud data may be encoded, so that the prediction-based coding is suitable for point cloud data content requiring low-latency processing. Therefore, prediction-based coding has an advantage of increasing coding speed.

However, no prediction is performed on the root node. In other words, position information of the root node (i.e., the x, y, z coordinates of the root node) is transmitted to a receiving side without compression. This is because each point in a predictive tree is predicted based on at least one parent node and the root node does not have a parent node.

That is, the prediction-based geometry compression method may be used to reduce the amount of transmitted information based on the positional similarity of successive points. In this case, each point may be predicted by applying various prediction modes. Thereamong, since an initial value (e.g., the root node) has no point to refer to (i.e., a parent point), the initial value is not predicted and an actual value (i.e., the x, y, z coordinate value) is transmitted to the receiving side.

Therefore, when the number of root nodes increases, the coding speed increases, whereas compression efficiency decreases.

The present disclosure proposes various embodiments of compressing the root node to increase the compression efficiency of the point cloud data. In particular, the present disclosure proposes various embodiments of compressing the root node when encoding geometry information, thereby increasing the compression efficiency of geometry information.

That is, the present disclosure describes a method for raising the compression efficiency of prediction-based geometry (i.e., position) information among point cloud data compression methods.

The method proposed in the present disclosure may be generally used for compression of point cloud data and may also be used for scalable compression of point cloud data. In addition, the prediction-based geometry compression method described in the present disclosure may also be used for prediction-based attribute compression.

The present disclosure separately describes a method for raising compression efficiency by allowing prediction of root nodes according to a first embodiment and a second embodiment.

The present disclosure describes a method of allowing dependency between slices/trees and predicting a root node based on the dependency between slices/trees, as the first embodiment. In this case, a root node of a current predictive tree may be predicted based on a specific point (referred to as a reference point) of another predictive tree (referred to as a reference tree or reference predictive tree).

The present disclosure describes a method of configuring root nodes of a plurality of predictive trees using a separate slice and performing prediction on root nodes in the separately configured slice, as the second embodiment. That is, the second embodiment relates to a method of performing prediction on root nodes by constructing one slice only with root nodes of a plurality of predictive trees. In this case, a current root node in the separately configured slice may be predicted based on at least one other root node in the corresponding slice.

Figure 35:
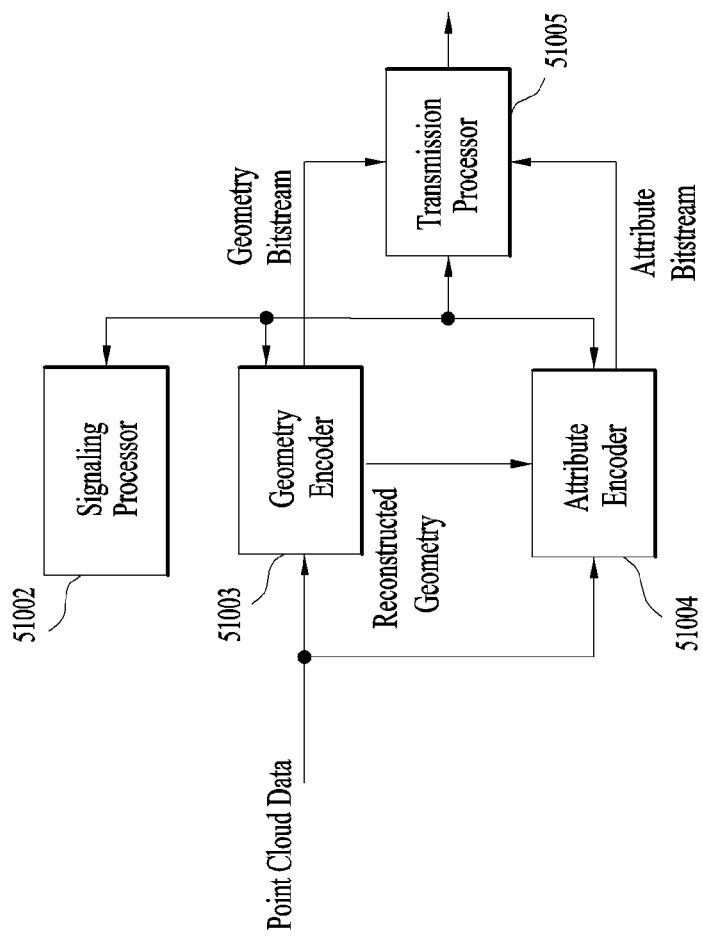
FIG. 35 is a diagram illustrating another example of a point cloud transmission device according to embodiments.

According to embodiments, a point cloud data encoding process corresponding to the first embodiment and/or the second embodiment may be performed by the point cloud video encoder 10002 of FIG. 1, the encoding 20001 of FIG. 2, the point cloud video encoder of FIG. 4, the point cloud video encoder of FIG. 12, or the geometry encoder 51003 of FIG. 35. A point cloud data decoding process corresponding to the first embodiment and/or the second embodiment according to the embodiments may be performed by the point cloud video decoder 10006 of FIG. 1, the decoding 20003 of FIG. 2, the point cloud video decoder of FIG. 11, the point cloud video decoder of FIG. 13, or the geometry decoder 61003 of FIG. 38. Detailed descriptions of FIGS. 35 and 38 will be given later.

First Embodiment

According to embodiments, input point cloud data is divided into compression units (or prediction units), and sorting of the point cloud data and construction of a predictive tree are performed within a compression unit.

According to embodiments, the point cloud data may be configured as or divided into compression units (or prediction units) by combining one or more of various methods. This method may be used for the purpose of performing parallel processing or preventing error propagation. For example, the entire point cloud data may be configured as one compression unit, or locally adjacent points in the x, y, z coordinates may be gathered to configure a compression unit. Alternatively, the point cloud data may be sorted in a certain order and then be divided into certain numerical units to configure the compression unit. An LOD unit may be configured as the compression unit or the compression unit may be configured by gathering similar points in a radius/azimuth/elevation unit in a cylindrical coordinate system. In this case, the greater the similarity between a parent and a child of a predictive tree, the better the prediction performance, so that less residual information is generated. Therefore, in an embodiment of the present disclosure, a compression unit is configured by gathering similar points.

In an embodiment of the present disclosure, a compression unit (or prediction unit) is a slice. For example, a slice may be constructed by gathering similar points in units of a certain number of points (e.g., 512 points, 1024 points, etc.).

Further, in prediction-based compression, prediction accuracy increases as similar points exist adjacently. Considering this, points to be predicted may be rearranged such that similar points are adjacent to each other. Rearrangement may be performed on the entire point cloud or in units of slices, or both methods may be used.

In an embodiment of the present disclosure, when points of input point cloud data are divided in slice units (i.e., compression units or prediction units), the points of the point cloud data are sorted for each slice and rearranged. In this case, the number of points of the point cloud data included in each slice may be the same or different for each slice and may also be preconfigured.

That is, as a method for increasing the compression efficiency of the point cloud data within a slice, points of the point cloud data within the slice may be sorted in a predetermined order. That is, in predictive coding, since prediction is performed based on the similarity between adjacent points and residual information (also referred to as a prediction error) is transmitted, compression efficiency is increased when similar points are arranged adjacently.

For example, when geometry information is considered, the points of the point cloud data within a corresponding slice may be sorted in order of Morton codes or in order of Hilbert codes, or points having similar radiuses, azimuths, and elevations may be grouped in a cylindrical coordinate system.

After the points of the point cloud data are sorted within each slice, a predictive tree may be constructed within each slice.

According to embodiments, the predictive tree may be constructed through a process of assigning a parent-child relationship to points that are positionally nearest to a certain point. In this case, a parent may be defined through neighbor search within a slice. According to embodiments, a neighbor may be defined as at least one point having a high geometric similarity. That is, in order to discover a neighbor point, a nearest neighbor search method based on a Euclidean distance may be used. For example, a point that minimizes a geometric difference between points may be defined as the neighbor point. In addition, a predictive tree as illustrated in FIG. 15 may be constructed by establishing a parent-child relationship for neighbor points.

Figure 15:
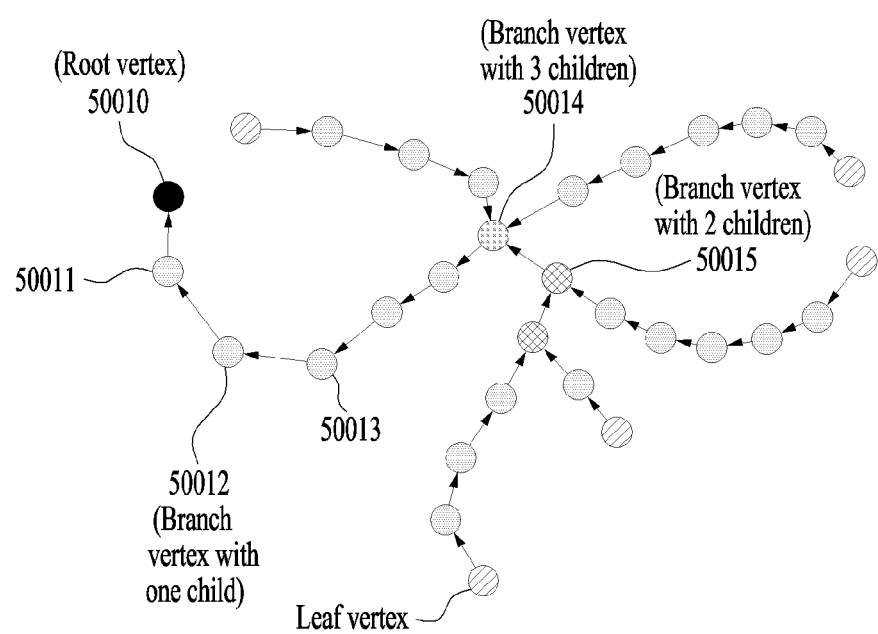
FIG. 15 is a diagram illustrating an example of a predictive tree structure of a specific slice according to embodiments

FIG. 15 is a diagram illustrating an example of a predictive tree structure of a specific slice according to embodiments.

That is, a final predictive tree may be a process of defining a point to be compressed (as in FIG. 15, a specific point among point cloud sets having relationships such as a parent, a grandparent, and a great-grandparent) as a child and a point to be predicted as a parent and searching for a parent-child relationship and may be constructed as a series of parents and children. For example, if it is assumed that a point 50013 is a point to be compressed, a point 50012 becomes a parent, a point 50011 becomes a grandparent, and a point 50010 becomes a great-grandparent.

According to embodiments, when constructing the predictive tree, a point at which compression starts for the first time is configured as a root vertex (or root node). The point 50011 becomes a child having the root vertex (i.e., the root point) 50010 as a parent. According to embodiments, it may be assumed that the point 50011 has the highest similarity to the root point 50010 based on geometry. According to embodiments, the predictive tree may have a point (or vertex) having a plurality of children. According to embodiments, the number of children may be limited to a certain number (e.g., 3) or may be unlimited. For example, as illustrated, a point (or vertex) 50014 has three children and a point (or vertex) 50015 has two children.

According to embodiments, when the predictive tree is generated as illustrated in FIG. 15, prediction of points may be performed using a prediction mode.

For example, when V(p) is defined as a point to be compressed on the predictive tree, i.e., as a p-th point, V(p−1) is defined as a parent point (or vertex) of the p-th point, V(p−2) is defined as a grandparent point of the p-th point, V(p−3) is defined as a great-grandparent point of the p-th point, and V(p−4) is defined as a great-great grandparent point of the p-th point, a prediction error E for each prediction mode may be defined as indicated in Equation 5 below. For example, 7 prediction error values E may be calculated by applying each of prediction modes of Equation 5 below to the point V(p), and a prediction mode having the smallest prediction error value among the calculated 7 prediction error values may be configured as a prediction mode of the point V(p). For example, when a prediction error value (E={[V(p)−V(p−1)]−a*[V(p−1)−V(p−2)−b]}) obtained by applying the second equation is the smallest value (i.e., a value that minimizes an error) among the 7 prediction error values, the prediction mode of the point (V(p)) may be configured (or selected) as prediction mode 2 (mode 2). In addition, configured (selected) prediction mode information (pred_mode) and coefficient information (e.g., a, b, etc.) of the configured prediction mode may be signaled in signaling information and/or a slice and then transmitted to a reception device. The signaling information may include parameter sets (e.g., an SPS, a GPS, an APS, and a TPS (also referred to as a tile inventory)), a header of a slice carrying corresponding residual information (also referred to as a prediction error), and the like. The prediction mode information is also referred to as mode information.

mode 1: $E=[V(p)-a*V(p-1)-b]$ mode 2: $E=\{[V(p)-V(p-1)]-a*[V(p-1)-V(p-2)]-b\}$ mode 3: $E=\{[V(p)+V(p-1)]/2-a*[V(p-1)+V(p-2)]/2-b\}$ mode 4: $E=\{[V(p)-V(p-1)]-a*[V(p-2)-V(p-3)]-b\}$ mode 5: $E=\{[V(p)+V(p-1)+V(p-2)]/3-a*[V(p-1)+V(p-2)+V(p-3)]/3-b\}$, mode 6: $E=\{[V(p)+V(p-1)+V(p-2)]/3-a'*[V(p-2)+V(p-3)+V(p-4)]/3-b'\}$ mode 7: $E=\{[V(p)-2V(p-1)+V(p-2)]-a*[V(p-1)-2V(p-2)+V(p-3)]-b\}$ [Equation 5]

Equation 6 below indicates examples of an equation of calculating prediction information for each prediction mode. For example, if a prediction mode of the point V(p) selected by applying Equation 5 is prediction mode 2 (mode 2), prediction information V'(p) corresponding to prediction mode 2 may be obtained by applying the second equation (V'(p)=(a+1)*V(p−1)−a*V(p−2)+b) of Equation 6. That is, V'(p) that minimizes an error for Equation 5 may be predicted as indicated in Equation 6 below.

mode 1: $V'(p)=a*V(p-1)+b$ mode 2: $V'(p)=(a+1)*V(p-1)-a*V(p-2)+b$ mode 3: $V'(p)=(a-1)*V(p-1)+a*V(p-2)+2b$ mode 4: $V'(p)=V(p-1)+a*V(p-2)-a*V(p-3)+b$ mode 5: $V'(p)=(a-1)*V(p-1)+(a-1)*V(p-2)+a*V(p-3)+3b$ mode 6: $V'(p)=V(p-1)+(a-1)*V(p-2)+a*V(p-3)+a*V(p-4)+3b$ mode 7: $V'(p)=(a+2)*V(p-1)-(2a+1)*V(p-2)+a*V(p-3)+b$ [Equation 6]

According to embodiments, mode 1 may be referred to as delta prediction, mode 2 or mode 3 may be referred to as linear prediction, and mode 4, mode 5, mode 6, or mode 7 may be referred to as parallelogram predictor or parallelogram prediction.

In the case of nodes (i.e., points) other than a root node, a transmitting side may transmit a prediction mode for each point and the difference (this is referred to as residual information or a prediction error) between the position of the point and a predicted position to the receiving side.

In addition, the present disclosure may use and signal a predesignated method for the above-mentioned various prediction methods in a certain unit (e.g., a slice unit, a coding block unit, a frame unit, or N units) or signal a method of minimizing an error for each point. Further, even for prediction coefficients a and b, a predetermined value may be used and signaled, or a method of minimizing an error for each point may be signaled.

In the case of the root node 50010, prediction is not conventionally performed, and a separate prediction mode is signaled and position information is directly transmitted to the receiving side.

Therefore, when the number of slices increases, that is, when the number of root nodes increases, coding speed increases, whereas compression efficiency decreases.

Figure 16:
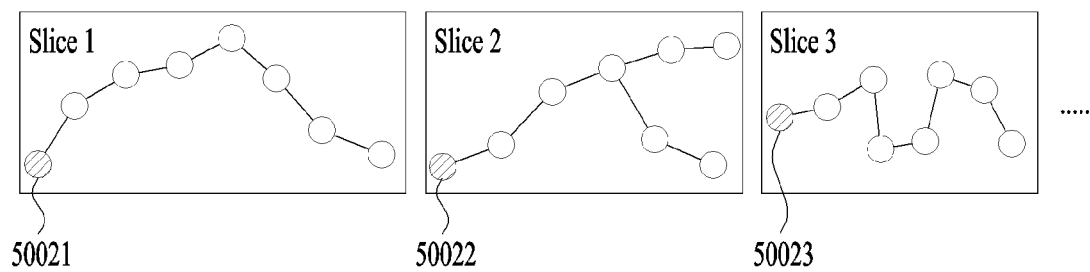
FIG. 16 is a diagram illustrating an example in which point cloud data is divided into three slices according to embodiments.

FIG. 16 is a diagram illustrating an example in which point cloud data is divided into three slices according to embodiments.

According to embodiments, slices construct respective independent predictive trees, and each slice may initially start with a root node so that each slice may be independently encoded/decoded.

In FIG. 16, circles represent nodes (or points), reference numeral 50021 represents a root node of slice 1 (or a starting point of slice 1), 50022 represents a root node of slice 2 (or a starting point of slice 2), 50023 represents a root node of slice 3 (or a starting point of slice 3).

Solid lines connecting each node represents a parent-child relationship, and a predictive tree may be constructed by connecting points in each slice.

When the predictive trees are configured as illustrated in FIG. 16, prediction is conventionally not performed on the root nodes 50021 to 50023 of the slices 1 to 3.

In this case, as the number of slices increases (i.e., as the number of root nodes increases), the amount of directly transmitted position information increases and thus compression efficiency may decrease.

To solve this problem, that is, to raise the compression efficiency of point cloud data composed of multiple slices, the first embodiment of the present disclosure allows dependency between slices and performs prediction by applying a prediction mode to a start mode of a slice (i.e., a root node of a predictive tree).

To compress root nodes of predictive trees, the first embodiment allows dependency between slices or predictive trees. That is, dependency between slices has not conventionally been allowed. In other words, prediction of points has been performed within a slice, and slices have been independent.

Figure 17:
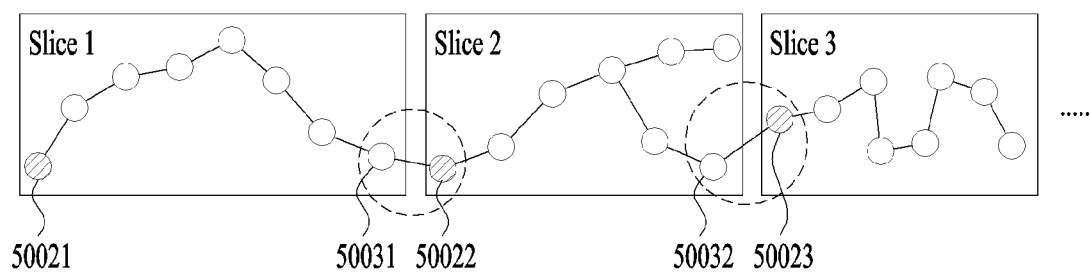
FIG. 17 is a diagram illustrating an example of predictive trees allowing dependency between slices for root node prediction according to a first embodiment.

FIG. 17 is a diagram illustrating an example of predictive trees allowing dependency between slices for root node prediction according to the first embodiment.

That is, FIG. 17 is a diagram illustrating the relationship between slices when dependency is allowed for independent slices.

In other words, conventionally, starting nodes of slice 2 and slice 3 have been encoded as root nodes without prediction. However, in the present disclosure, a root node of slice 2 may be predicted using, as a reference, slice 1, which is a previous slice, and a root node of slice 3 may be predicted using, as a reference, slice 2 for which prediction has been performed.

In FIG. 17, an example in which slice 2 refers to slice 1, which is a previous slice, and slice 3 refers to slice 2, which is a previous slice, is an embodiment to aid in understanding by those skilled in the art.

Next, a method of obtaining association between slices will be described. In the present disclosure, association between slices may be obtained using two steps (e.g., a reference tree selection step and a reference point selection step). That is, the reference tree selection step is a step of searching for (or detecting) k (k>0) reference trees, and the reference point selection step is a step of searching for (or detecting) a reference point within the k reference trees.

In other words, first, the k (k>0) reference trees may be searched for (or detected), and a reference point (e.g., a node conventionally transmitted as a root, such as a starting node of a slice) among the k (k>0) reference trees may be searched for. According to embodiments, the reference tree may be a previous predictive tree on which prediction (or decoding) has been performed. The reference point may be any point in the reference tree. FIG. 17 illustrates an example in which an end point in the reference tree is the reference point.

Next, a process of searching for the reference node (i.e., a specific point in the reference tree) of a starting node of a current slice (i.e., a root node of a current predictive tree) on which prediction is to be performed when the predictive tree is constructed in units of slices will be described.

To perform prediction on the starting node of the current slice (i.e., the root node of the current predictive tree), the reference node (i.e., a point to be predicted) should be detected from a predictive tree of another slice. According to embodiments, the reference point is detected as a point nearest to a target point (i.e., a root node of a current slice). In the present disclosure, the reference point may be selected from among points decoded through nearest neighbor search. However, in this case, as the number of slices increases, the number of target points increases, causing a problem in that execution speed is reduced. To prevent this problem, an embodiment of the present disclosure selects a predictive tree that minimizes the distance between predictive trees as a reference tree and then selects a point nearest to a root node of a current predictive tree (i.e., a starting node of a current slice) from among points in the selected reference tree as the reference point (i.e., prediction target point).

In the present disclosure, the position of a predictive tree may be defined using at least one of the following embodiments in order to obtain the distance between predictive trees.

a) An average value of all point positions in a predictive tree
b) A median of all point positions in the predictive tree
c) A representative value of all point positions in the predictive tree (e.g., a starting point (or a root node) or an end point (or a leaf node))
d) A center value of a bounding box which includes all points in the predictive tree but is minimized
e) A center value of the center/surface of a vertex/segment of a specific position of the smallest bounding box which includes all points in the predictive tree but is minimized For example, if a) above is used, the distance between a current predictive tree and another predictive tree may be obtained as the difference between the average values of all point positions in respective predictive trees. As another example, if c) above is used, the distance between the current predictive tree and another predictive tree may be obtained by the difference between representative values of all point positions in respective predictive trees. In this case, assuming that the representative value is a start point (i.e., root node), the distance between the current predictive tree and another predictive tree may be obtained by the difference between position values of start points (i.e., root nodes) of respective predictive tree.

After the position of the predictive tree is determined, the distance between two different predictive trees (e.g., a current predictive tree and a reference target predictive tree) may be defined as in Equation 7 below.

$$\text{Dist}_{tree} = |C_n - C_m| = \sqrt{(X_n - X_m)^2 + (Y_n - Y_m)^2 + (Z_n - Z_m)^2}$$ [Equation 7]

In Equation 7, $C_n$ (=$[X_n, Y_n, Z_n]$) may denote the position of a current predictive tree, and $C_m$ (=$[X_m, Y_m, Z_m]$) denotes the position of one of other predictive trees (e.g., predictive trees on which prediction (or decoding) has been completed).

That is, k (>0) nearest neighbor predictive trees may be selected as k reference trees by applying Equation 7 to predicted (or decoded) predictive trees on which prediction (or decoding) has been completed. In this case, k should be at least one, and the number of k may be increased to raise the accuracy of estimation of a reference tree. In addition, a method of obtaining k nearest trees may use the same method as nearest neighbor search which has conventionally been used. For example, k predictive trees may be determined as reference trees in order of proximity to a current predictive tree. In Equation 7, the smaller the value of $\text{Dist}_{tree}$, the nearer the distance between two predictive trees.

In addition, when the k reference trees are determined as above, a reference node (or point) may be determined among nodes (or points) belonging to the k reference trees. If a predictive tree is defined as a set including N points, a point nearest to a node to be compressed (i.e., a root node of a current tree) among k×N points may be selected as a reference point. When the position of the point to be compressed is $P_n = [x_n, y_n, z_n]$ and the position of a point to be referenced is $P_m = [x_m, y_m, z_m]$, the distance between the two points may be defined as in Equation 8 below:

$$\text{dist} = |P_n - P_m| = \sqrt{(x_n - x_m)^2 + (y_n - y_m)^2 + (z_n - z_m)^2}$$ [Equation 8]

According to embodiments, $P_m$, at which the distance value of Equation 8 is minimized, may be defined as the reference point with respect to k×N points.

In this case, slice indicator information (e.g., a slice indicator or reference_gsh_slice_id) for identifying a slice in which the reference point is located and node index information (e.g., a node index or reference_node_idx) for identifying the reference point may be signaled in signaling information and/or a slice and then transmitted to the reception device. The signaling information may include parameter sets (e.g., an SPS, a GPS, an APS, and a TPS (also referred to as a tile inventory)), a header of a slice, and the like.

FIG. 17 is a diagram illustrating an example of predictive trees allowing dependency between slices when k is 1 and N is 8.

FIG. 17 illustrates an example in which a reference tree of slice 2 is determined as slice 1, and an end point (e.g., a leaf node) 50031 of slice 1 is determined as a reference point (i.e., prediction information of a root node of slice 2). In this case, instead of a position value (i.e., x, y, z coordinate value) of a root node 50022 of slice 2, a difference value (i.e., residual information) between a position value of the root node 50022 of slice 2 and a position value of the leaf node 50031 of slice 1 is transmitted to the receiving side. In other words, prediction is performed on the root node 50022 of slice 2, and residual information of the root node of slice 2 is transmitted to the receiving side. In this case, the slice indicator information signaled in the signaling information may be information for identifying slice 1, and the node index information may be information for identifying the leaf node 50031 of slice 1.

FIG. 17 illustrates an example in which a reference tree of slice 3 is determined as slice 2, and an end point (e.g., a leaf node) 50032 of slice 2 is determined as the reference point (i.e., prediction information of a root node of slice 3). In this case, instead of the position value of the root node 50023 of slice 3 (i.e., x, y, z coordinate value), a difference value (i.e., residual information) between the position value of the root node 50023 of slice 3 and the position value of the leaf node 50032 of slice 2 is transmitted to the receiving side. In other words, prediction is performed on the root node 50023 of slice 3, and the residual information of the root node of slice 3 is transmitted to the receiving side. In this case, the slice indicator information signaled in the signaling information may be information for identifying slice 2, and the node index information may be information for identifying the leaf node 50032 of slice 2.

On the other hand, when data is acquired radially from a rotational axis as in LiDAR, the coordinate system may be transformed into a vertical position of a laser, a rotational angle of the laser, and a distance of the laser from a central axis and then be sorted. In this case, association between points may be raised by forming directionality of sorting as zigzag. For example, the case in which data obtained with respect to rotational angle 1 among data obtained from the k-th laser is sorted in a radius order may be considered. That is, points distributed on a discretely distributed laser ray are considered as one group. In this case, continuity between slices may be increased by alternating the order of sorting adjacent laser rays according to radius. According to embodiments, adjacent laser rays may be a (k−1)-th laser and a (k+1)-th laser and may be rotation angle (l−1) and rotation angle (l+1). That is, when sorting is performed on laser ray (k,l) in a direction of increasing the radius, sorting may be performed on laser lays (k−1, l), (k+1, l), (k, l−1), and (k, l+1) in a direction of decreasing the radius. In this case, by increasing continuity between slices or within slices, an effect of reducing residual information of predictive geometry coding may occur.

Prediction mode information, residual information, and information related to root node compression of each point for each slice described so far may be transmitted to the reception device in the form of a bitstream after entropy encoding.

Second Embodiment

To increase compression efficiency by allowing prediction of a root node during predictive tree-based geometry encoding, the second embodiment performs prediction by configuring root nodes of respective slices using a separate slice. That is, root nodes of a plurality of predictive trees are configured using a separate slice, and prediction is performed on root nodes in the separately configured slice.

Figure 18:
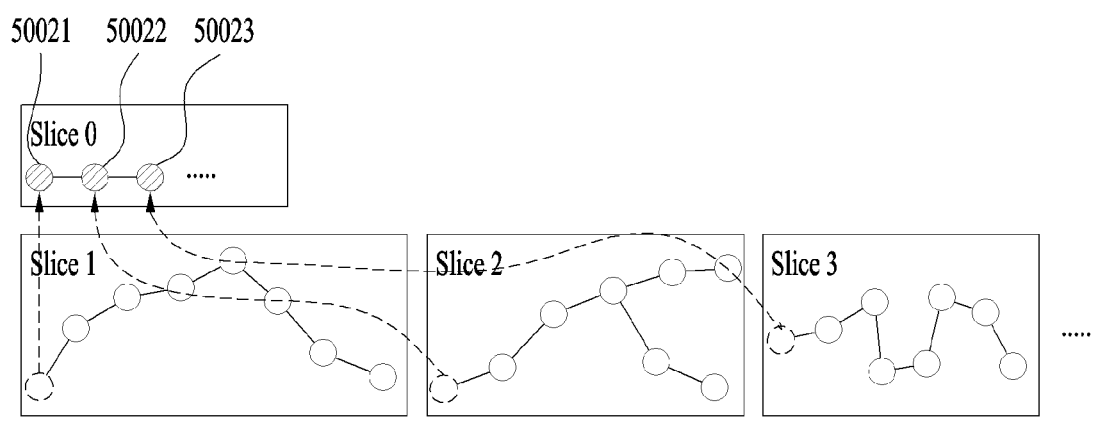
FIG. 18 is a diagram illustrating an example of configuring a new slice with starting nodes of slices, for root node prediction, according to a second embodiment.

FIG. 18 is a diagram illustrating an example of configuring a new slice with starting nodes of slices, for root node prediction, according to the second embodiment. A starting node in each slice is selected as a root node of a predictive tree in each slice.

Referring to FIG. 18, point cloud data is divided into slices 1 to 3, and a new slice (i.e., slice 0) is configured by gathering starting nodes 50021 to 50023 of slice 1 to slice 3. In the present disclosure, the new slice (i.e., slice 0) will be referred to as a root slice.

According to embodiments, a geometry tree is constructed based on root nodes included in the root slice. In this case, the structure of the geometry tree may be a predictive tree, an octree, or other trees (e.g., a binary tree and a quadtree). For example, if the geometry tree structure of the root slice is an octree, root nodes are predicted based on the octree. As another example, if the geometry tree structure of the root slice is a predictive tree, root nodes are predicted based on the predictive tree.

If the geometry tree structure of the root slice is the predictive tree, the order of root nodes may be a slice order as illustrated in FIG. 18, or the predictive tree may be constructed by establishing a parent-child relationship using a nearest neighbor search method.

Then, when the predictive tree of the root slice is constructed, prediction is performed on each point of the predictive tree of the root slice by applying FIG. 15, Equation 5, and Equation 6 described above. In an embodiment, a prediction mode of each point may be one of mode 1 to mode 7, and prediction mode information of each point and residual information of each point are transmitted to the receiving side. That is, a current root node in the root slice (or slice 0) may be predicted based on at least one root node, other than the current root node, in the root slice.

According to embodiments, prediction is not performed on a starting node (i.e., a root node of the predictive tree) even in the root slice. That is, for the starting node of the root slice, a position value (i.e., x, y, z coordinate value) of the starting node is transmitted to the receiving side without compression.

According to embodiments, root nodes in slices, for example, slice 1 to slice 3, other than the root slice are used only as information for prediction of other points of the corresponding slice (i.e., child nodes of the root node).

According to embodiments, for the root slice (i.e., slice 0), information (a slice indicator or a node index) about an original position of each node may be signaled in signaling information and/or a slice and transmitted to the reception device. For example, information about an original position of a starting node 50021 in the root slice, i.e., slice indicator information (a slice indicator or reference_gsh_slice_id), may be information for identifying slice 1, and node index information (a node index or reference_node_idx) may be information for identifying a root node of slice 1.

According to embodiments, for the remaining slices (e.g., slice 1 to slice 3) except for the root slice, position information including a starting node (e.g., slice indicator=0) and node index information (e.g., the position of each node within slice 0) may be signaled in signaling information and/or a slice and transmitted to the reception device. For example, in the case of slice 1, slice indicator information (a slice indicator or reference_gsh_slice_id) may be information for identifying slice 0 (i.e., root slice), and node index information (a node index or reference_node_idx) may be information for identifying the position of the node 50021 in slice 0. As another example, in the case of slice 2, the slice indicator information (slice indicator or reference_gsh_slice_id) may be information for identifying slice 0 (i.e., root slice), and the node index information (node index or reference_node_idx) may be information for identifying the position of a node 50022 in slice 0.

The above-described signaling information may include parameter sets (e.g., an SPS, a GPS, an APS, and a TPS (also referred to as a tile inventory)), a header of a slice, and the like.

According to embodiments, as a method for increasing compression efficiency by allowing prediction of a root node during predictive tree-based geometry encoding, the first embodiment and the second embodiment may be used independently, or the first embodiment and the second embodiment may be used simultaneously. The first embodiment and/or the second embodiment may also be applied to octree-based compression or attribute compression.

In the above first and second embodiments, while the case in which one predictive tree is matched per slice has been described, in the present disclosure, the contents described in the embodiments of the present disclosure may be applied even when a plurality of predictive trees is included in one slice or one predictive tree is included in a plurality of slices.

For example, when a plurality of predictive trees is included in one slice, dependency may be defined for a root node of each predictive tree, and in this case, information about a reference predictive tree may be transmitted. In this case, tree indicator information (e.g., a tree indicator, tree_id, or reference_tree_id) capable of distinguishing between the predictive trees may be defined within a corresponding slice, frame, or sequence. Alternatively, prediction between root nodes of respective predictive trees may be allowed, and dependency information between roots (e.g., a tree ID including a reference root node) may be signaled in signaling information and/or a slice and transmitted to the reception device. The signaling information may include parameter sets (e.g., an SPS, a GPS, an APS, and a TPS (also referred to as a tile inventory)), a header of a slice, and the like.

As another example, when one predictive tree is included in a plurality of slices, in order to indicate that information included in the plurality of slices is used to construct one predictive tree, a predictive tree in each slice may be regarded as a divided predictive tree, and dependency between slices and a reference slice may be signaled in signaling information and transmitted to the reception device.

Prediction mode information, residual information, information related to root node prediction of each point for each slice including a root slice described above may be transmitted to the reception device in the form of a bitstream after entropy encoding.

Figure 19:
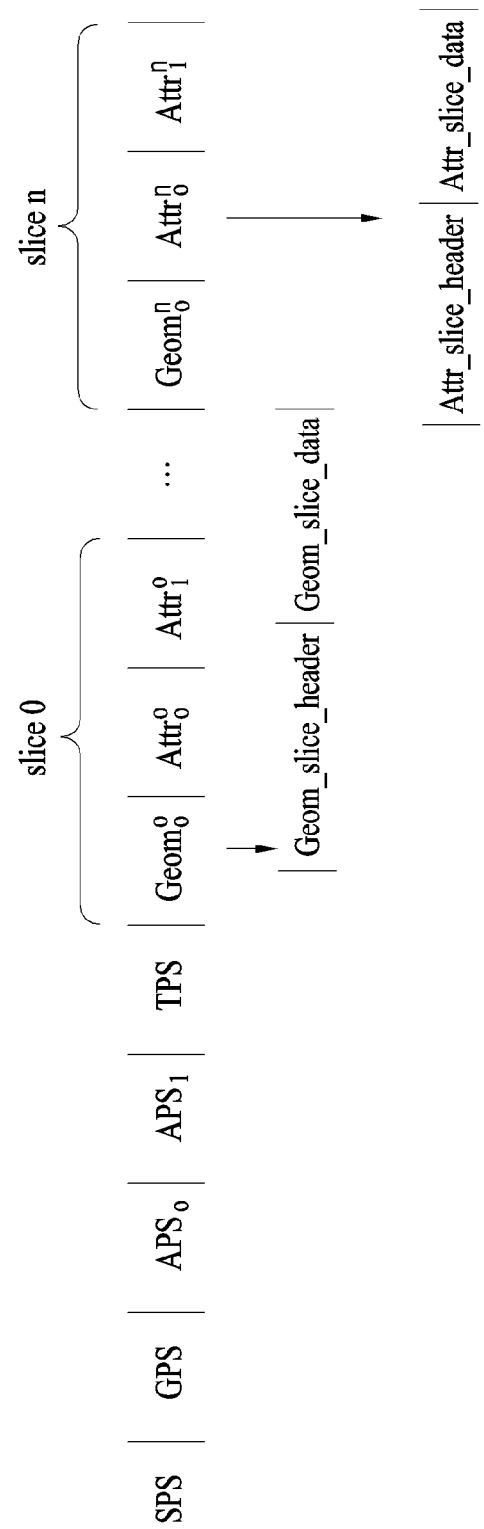
FIG. 19 illustrates an example of a bitstream structure of point cloud data for transmission/reception according to embodiments.

FIG. 19 illustrates an example of a bitstream structure of point cloud data for transmission/reception according to embodiments. According to embodiments, a bitstream output from any one of the point cloud video encoders of FIGS. 1, 2, 4, 12, and 35 may have the form of FIG. 19.

According to embodiments, the bitstream of the point cloud data provides a tile or a slice so that the point cloud data may be divided and processed according to a region. Each region of the bitstream according to the embodiments may have different importance. Accordingly, when the point cloud data is divided into tiles, a different filter (encoding method) and a different filter unit may be applied to each tile. In addition, when the point cloud data is divided into slices, a different filter and a different filter unit may be applied to each slice.

When dividing point cloud data into regions and compressing the point cloud data, the transmission device and the reception device according to the embodiments may transmit and receive the bitstream with a high-level syntax structure to selectively transmit attribute information in the divided regions.

The transmission device according to embodiments transmits the point cloud data according to the structure of the bitstream as illustrated in FIG. 19, so that different encoding operations may be applied according to importance and an encoding method with good quality may be used in an important region. In addition, efficient encoding and transmission according to the characteristics of the point cloud data may be supported and attribute values according to the demand of a user may be provided.

The reception device according to the embodiments receives the point cloud data according to the structure of the bitstream as illustrated in FIG. 19, so that a different filtering (decoding method) may be applied to each region (region divided into tiles or slices) according to the processing capability of the reception device, instead of using a complicated decoding (filtering) method for the entire point cloud data. Accordingly, better picture quality in a region important to the user may be provided and appropriate system latency may be ensured.

When a geometry bitstream, an attribute bitstream, and/or a signaling bitstream (or signaling information) according to the embodiments are composed of one bitstream(or G-PCC bitstream) as illustrated in FIG. 19, the bitstream may include one or more sub-bitstreams. The bitstream according to the embodiments includes an SPS for sequence level signaling, a GPS for signaling of geometry information coding, one or more APSs ($APS_0$ and $APS_1$) for signaling of attribute information coding, a tile inventory (also referred to as a TPS) for tile level signaling, and one or more slices (slice 0 to slice n). That is, the bitstream of the point cloud data according to the embodiments may include one or more tiles, and each tile may be a slice group including one or more slices (slice 0 to slice n). The tile inventory (i.e., TPS) according to the embodiments may include information about each tile (e.g., coordinate value information and height/size information of a tile bounding box) for one or more tiles. Each slice may include one geometry bitstream Geom0 and/or one or more attribute bitstreams Attr0 and Attr1. For example, slice 0 may include one geometry bitstream $Geom0^0$ and one or more attribute bitstreams $Attr0^0$ and $Attr1^0$.

The geometry bitstream within each slice may include a geometry slice header (geom_slice_header) and geometry slice data (geom_slice_data). According to embodiments, the geometry bitstream within each slice may also be referred to as a geometry data unit, the geometry slice header may also be referred to as a geometry data unit header, and the geometry slice data may also be referred to as geometry data unit data.

Each attribute bitstream in each slice may include an attribute slice header (attr_slice_header) and attribute slice data (attr_slice_data). According to embodiments, the attribute slice header in each slice may also be referred to as an attribute data unit, the attribute slice header may also be referred to as an attribute data unit header, and the attribute slice data may also be referred to as attribute data unit data.

According to embodiments, parameters required for encoding and/or decoding of the point cloud data may be newly defined in parameter sets of the point cloud data (e.g., an SPS, a GPS, an APS, and a TPS (also referred to as a tile inventory) and/or in a header of a corresponding slice. For example, when encoding and/or decoding of geometry information is performed, the parameters may be added to the GPS and, when tile-based encoding and/or decoding is performed, the parameters may be added to a tile and/or a slice header.

According to embodiments, information related to root node prediction of predictive geometry may be signaled in the GPS and/or a geometry slice header (also referred to as a geometry data unit header).

According to embodiments, the information related to root node prediction of the predictive geometry may be signaled in an APS and/or an attribute slice header (also referred to as an attribute data unit header) in order to be associated with an attribute coding method or applied to attribute coding.

According to embodiments, the information related to root node prediction of the predictive geometry may be signaled in the SPS and/or the TPS.

According to embodiments, the information related to root node prediction of the predictive geometry may be signaled in geometry predictive tree data (geometry_predtree_data( )). The geometry predictive tree data (geometry_predtree_data( )) may be included in a geometry slice (also referred to as a geometry data unit).

According to embodiments, when a syntax element defined below is capable of being applied to a plurality of point cloud data streams as well as a current point cloud data stream, the information related to root node prediction may be delivered through a parameter set of higher-level concept.

According to embodiments, the information related to root node prediction may be defined at a corresponding position or a separate position according to an application or a system so that an application range or an application method thereof may be differently used. A field, which is the term used in syntaxes of the present disclosure described hereinbelow, may have the same meaning as a parameter or a syntax element.

According to embodiments, parameters (which may be variously called metadata, signaling information, etc.) may be generated by a metadata processor (or metadata generator) or a signaling processor of the transmission device and may be transmitted to the reception device and used in a decoding/reconstruction process. For example, parameters generated and transmitted by the transmission device may be obtained by a metadata parser of the reception device.

According to embodiments, compression through a reference relationship between slices may be applied to reference nodes in other slices not only for a starting node (i.e., a root node) of a slice but also for an arbitrary node. In addition, the reference relationship between slices may be extended and applied to a reference relationship between predictive trees.

FIG. 20 shows an embodiment of a syntax structure of a sequence parameter set (SPS) (seq_parameter_set( )) according to the present disclosure. The SPS may contain sequence information about a point cloud data bitstream.

The SPS according to the embodiments may include a main_profile_compatibility_flag field, a unique_point_positions_constraint_flag field, a level_idc field, an sps_seq_parameter_set_id field, an sps_bounding_box_present_flag field, an sps_source_scale_factor_numerator_minus1 field, an sps_source_scale_factor_denominator_minus1 field, an sps_num_attribute_sets field, log2_max_frame_idx field, an axis_coding_order field, an sps_bypass_stream_enabled_flag field, and an sps_extension_flag field.

The main_profile_compatibility_flag field may indicate whether the bitstream conforms to the main profile. For example, main_profile_compatibility_flag equal to 1 may indicate that the bitstream conforms to the main profile. For example, main_profile_compatibility_flag equal to 0 may indicate that the bitstream conforms to a profile other than the main profile.

When unique_point_positions_constraint_flag is equal to 1, in each point cloud frame that is referred to by the current SPS, all output points may have unique positions. When unique_point_positions_constraint_flag is equal to 0, in any point cloud frame that is referred to by the current SPS, two or more output points may have the same position. For example, even when all points are unique in the respective slices, slices in a frame and other points may overlap. In this case, unique_point_positions_constraint_flag is set to 0.

level_idc indicates a level to which the bitstream conforms.

sps_seq_parameter_set_id provides an identifier for the SPS for reference by other syntax elements.

The sps_bounding_box_present_flag field indicates whether a bounding box is present in the SPS. For example, sps_bounding_box_present_flag equal to 1 indicates that the bounding box is present in the SPS, and sps_bounding_box_present_flag equal to 0 indicates that the size of the bounding box is undefined.

According to embodiments, when sps_bounding_box_present_flag is equal to 1, the SPS may further include an sps_bounding_box_offset_x field, an an sps_bounding_box_offset_z field, sps_bounding_box_offset_y field, sps_bounding_box_offset_log2_scale field, an sps_bounding_box_size_width field, an sps_bounding_box_size_height field, and an sps_bounding_box_size_depth field.

sps_bounding_box_offset_x indicates the x offset of the source bounding box in Cartesian coordinates. When the x offset of the source bounding box is not present, the value of sps_bounding_box_offset_x is 0.

sps_bounding_box_offset_y indicates the y offset of the source bounding box in Cartesian coordinates. When the y offset of the source bounding box is not present, the value of sps_bounding_box_offset_y is 0.

sps_bounding_box_offset_z indicates the z offset of the source bounding box in Cartesian coordinates. When the z offset of the source bounding box is not present, the value of sps_bounding_box_offset_z is 0.

sps_bounding_box_offset_log2_scale indicates a scale factor for scaling quantized x, y, and z source bounding box offsets.

sps_bounding_box_size_width indicates the width of the source bounding box in Cartesian coordinates. When the width of the source bounding box is not present, the value of sps_bounding_box_size_width may be 1.

sps_bounding_box_size_height indicates the height of the source bounding box in Cartesian coordinates. When the height of the source bounding box is not present, the value of sps_bounding_box_size_height may be 1.

sps_bounding_box_size_depth indicates the depth of the source bounding box in Cartesian coordinates. When the depth of the source bounding box is not present, the value of sps_bounding_box_size_depth may be 1.

sps_source_scale_factor_numerator_minus1 plus 1 indicates the scale factor numerator of the source point cloud.

sps_source_scale_factor_denominator_minus1 plus 1 indicates the scale factor denominator of the source point cloud.

sps_num_attribute_sets indicates the number of coded attributes in the bitstream.

The SPS according to the embodiments includes an iteration statement repeated as many times as the value of the sps_num_attribute_sets field. In an embodiment, i is initialized to 0, and is incremented by 1 each time the iteration statement is executed. The iteration statement is repeated until the value of i becomes equal to the value of the sps_num_attribute_sets field. The iteration statement may include an attribute_dimension_minus1[i] field and an attribute_instance_id[i] field. attribute_dimension_minus1[i] plus 1 indicates the number of components of the i-th attribute.

The attribute_instance_id[i] field specifies the instance ID of the i-th attribute.

According to embodiments, when the value of the attribute_dimension_minus1[i] field is greater than 1, the iteration statement may further include an attribute_secondary_bitdepth_minus1[i] field, an attribute_cicp_colour_primaries[i] field, an attribute_cicp_transfer_characteristics[i] field, an attribute_cicp_matrix_coeffs[i] field, and an attribute_cicp_video_full_range_flag[i] field.

attribute_secondary_bitdepth_minus1[i] plus 1 specifies the bitdepth for the secondary component of the i-th attribute signal(s).

attribute_cicp_colour_primaries[i] indicates the chromaticity coordinates of the color attribute source primaries of the i-th attribute.

attribute_cicp_transfer_characteristics[i] either indicates the reference opto-electronic transfer characteristic function of the color attribute as a function of a source input linear optical intensity with a nominal real-valued range of 0 to 1 or indicates the inverse of the reference electro-optical transfer characteristic function as a function of an output linear optical intensity attribute_cicp_matrix_coeffs[i] describes the matrix coefficients used in deriving luma and chroma signals from the green, blue, and red, or Y, Z, and X primaries of the i-th attibute.

attribute_cicp_video_full_range_flag[i] specifies the black level and range of the luma and chroma signals as derived from E'Y, E'PB, and E'PR or E'R, E'G, and E'B real-valued component signals of the i-th attibute.

The known_attribute_label_flag[i] field indicates whether a know_attribute_label[i] field or an attribute_label_four_bytes[i] field is signaled for the i-th attribute. For example, when known_attribute_label_flag[i] equal to 0 indicates the known_attribute_label[i] field is signaled for the i-th attribute. known_attribute_label_flag[i] equal to 1 indicates that the attribute_label_four_bytes[i] field is signaled for the i-th attribute.

known_attribute_label[i] specifies the type of the i-th attribute. For example, known_attribute_label[i] equal to 0 may specify that the i-th attribute is color. known_attribute_label[i] equal to 1 may specify that the i-th attribute is reflectance. known_attribute_label[i] equal to 2 may specify that the i-th attribute is frame index. Also, known_attribute_label[i] equal to 4 specifies that the i-th attribute is transparency. known_attribute_label[i] equal to 5 specifies that the i-th attribute is normals.

attribute_label_four_bytes[i] indicates the known attribute type with a 4-byte code.

According to embodiments, attribute_label_four_bytes[i] equal to 0 may indicate that the i-th attribute is color. attribute_label_four_bytes[i] equal to 1 may indicate that the i-th attribute is reflectance. attribute_label_four_bytes[i] equal to 2 may indicate that the i-th attribute is a frame index. attribute_label_four_bytes[i] equal to 4 may indicate that the i-th attribute is transparency. attribute_label_four_bytes[i] equal to 5 may indicate that the i-th attribute is normals.

log2_max_frame_idx indicates the number of bits used to signal a syntax variable frame_idx.

axis_coding_order specifies the correspondence between the X, Y, and Z output axis labels and the three position components in the reconstructed point cloud RecPic [pointidx][axis] with and axis=0 . . . 2.

sps_bypass_stream_enabled_flag equal to 1 specifies that the bypass coding mode may be used in reading the bitstream. As another example, sps_bypass_stream_enabled_flag equal to 0 specifies that the bypass coding mode is not used in reading the bitstream.

sps_extension_flag indicates whether the sps_extension_data syntax structure is present in the SPS syntax structure. For example, sps_extension_present_flag equal to 1 indicates that the sps_extension_data syntax structure is present in the SPS syntax structure. sps_extension_present_flag equal to 0 indicates that this syntax structure is not present.

When the value of the sps_extension_flag field is 1, the SPS according to the embodiments may further include an sps_extension_data_flag field.

sps_extension_data_flag may have any value.

FIG. 21 shows an embodiment of a syntax structure of the GPS (geometry_parameter_set( )) according to the present disclosure. The GPS may include information on a method of encoding geometry information of point cloud data included in one or more slices.

According to embodiments, the GPS may include a gps_geom_parameter_set_id field, a gps_seq_parameter_set_id field, gps_box_present_flag field, a unique_geometry_points_flag field, a geometry_planar_mode_flag field, a geometry_angular_mode_flag field, a neighbour_context_restriction_flag field, a inferred_direct_coding_mode_enabled_flag field, a bitwise_occupancy_coding_flag field, an adjacent_child_contextualization_enabled_flag field, a log2_neighbour_avail_boundary field, a log2_intra_pred_max_node_size field, a log2_trisoup_node_size field, a geom_scaling_enabled_flag field, a gps_implicit_geom_partition_flag field, and a gps_extension_flag field.

The gps_geom_parameter_set_id field provides an identifier for the GPS for reference by other syntax elements.

The gps_seq_parameter_set_id field specifies the value of sps_seq_parameter_set_id for the active SPS.

The gps_box_present_flag field specifies whether additional bounding box information is provided in a geometry slice header that references the current GPS. For example, the gps_box_present_flag field equal to 1 may specify that additional bounding box information is provided in a geometry slice header that references the current GPS. Accordingly, when the gps_box_present_flag field is equal to 1, the GPS may further include a gps_gsh_box_log2_scale_present_flag field.

The gps_gsh_box_log2_scale_present_flag field specifies whether the gps_gsh_box_log2_scale field is signaled in each geometry slice header that references the current GPS. For example, the gps_gsh_box_log2_scale_present_flag field equal to 1 may specify that the gps_gsh_box_log2_scale field is signaled in each geometry slice header that references the current GPS. As another example, the gps_gsh_box_log2_scale_present_flag field equal to 0 may specify that the gps_gsh_box_log2_scale field is not signaled in each geometry slice header and a common scale for all slices is signaled in the gps_gsh_box_log2_scale field of the current GPS.

When the gps_gsh_box_log2_scale_present_flag field is equal to 0, the GPS may further include a gps_gsh_box_log2_scale field.

The gps_gsh_box_log2_scale field indicates the common scale factor of the bounding box origin for all slices that refer to the current GPS.

unique_geometry_points_flag indicates whether all output points have unique positions in one slice in all slices currently referring to GPS. For example, unique_geometry_points_flag equal to 1 indicates that in all slices that refer to the current GPS, all output points have unique positions within a slice. unique_geometry_points_flag field equal to 0 indicates that in all slices that refer to the current GPS, the two or more of the output points may have same positions within a slice.

The geometry_planar_mode_flag field indicates whether the planar coding mode is activated. For example, geometry_planar_mode_flag equal to 1 indicates that the planar coding mode is active. geometry_planar_mode_flag equal to 0 indicates that the planar coding mode is not active.

When the value of the geometry_planar_mode_flag field is 1, that is, TRUE, the GPS may further include a geom_planar_mode_th_idcm field, a geom_planar_mode_th[1] field, and a geom_planar_mode_th[2] field.

The geom_planar_mode_th_idcm field may specify the value of the threshold of activation for the direct coding mode.

geom_planar_mode_th[i] specifies, for i in the range of 0 . . . 2, specifies the value of the threshold of activation for planar coding mode along the i-th most probable direction for the planar coding mode to be efficient.

geometry_angular_mode_flag indicates whether the angular coding mode is active. For example, geometry_angular_mode_flag field equal to 1 may indicate that the angular coding mode is active. geometry_angular_mode_flag field equal to 0 may indicate that the angular coding mode is not active.

When the value of the geometry_angular_mode_flag field is 1, that is, TRUE, the GPS may further include an lidar_head_position[0] field, a lidar_head_position[1] field, a lidar_head_position[2] field, a number_lasers field, a planar_buffer_disabled field, an implicit_qtbt_angular_max_node_min_dim_log2_to_split_z field, and an implicit_qtbt_angular_max_diff_to_split_z field.

The lidar_head_position[0] field, lidar_head_position[1] field, and lidar_head_position[2] field may specify the (X, Y, Z) coordinates of the lidar head in the coordinate system with the internal axes.

number_lasers specifies the number of lasers used for the angular coding mode.

The GPS according to the embodiments includes an iteration statement that is repeated as many times as the value of the number_lasers field. In an embodiment, i is initialized to 0, and is incremented by 1 each time the iteration statement is executed. The iteration statement is repeated until the value of i becomes equal to the value of the number_lasers field. This iteration statement may include a laser_angle[i] field and a laser_correction[i] field.

laser_angle[i] specifies the tangent of the elevation angle of the i-th laser relative to the horizontal plane defined by the 0-th and the 1st internal axes.

laser_correction[i] specifies the correction, along the second internal axis, of the i-th laser position relative to the lidar_head_position[2].

planar_buffer_disabled equal to 1 indicates that tracking the closest nodes using a buffer is not used in process of coding the planar mode flag and the plane position in the planar mode. planar_buffer_disabled equal to 0 indicates that tracking the closest nodes using a buffer is used.

implicit_qtbt_angular_max_node_min_dim_log2_to_split_z specifies the log 2 value of a node size below which horizontal split of nodes is preferred over vertical split.

implicit_qtbt_angular_max_diff_to_split_z specifies the log 2 value of the maximum vertical over horizontal node size ratio allowed to a node.

neighbour_context_restriction_flag equal to 0 indicates that geometry node occupancy of the current node is coded with the contexts determined from neighbouring nodes which is located inside the parent node of the current node. neighbour_context_restriction_flag equal to 1 indicates that geometry node occupancy of the current node is coded with the contexts determined from neighbouring nodes which is located inside or outside the parent node of the current node.

The inferred_direct_coding_mode_enabled_flag field indicates whether the direct_mode_flag field is present in the geometry node syntax. For example, the inferred_direct_coding_mode_enabled_flag field equal to 1 indicates that the direct_mode_flag field may be present in the geometry node syntax. For example, the inferred_direct_coding_ mode_enabled_flag field equal to 0 indicates that the direct_mode_flag field is not present in the geometry node syntax.

The bitwise_occupancy_coding_flag field indicates whether geometry node occupancy is encoded using bitwise contextualization of the syntax element occupancy map. For example, the bitwise_occupancy_coding_flag field equal to 1 indicates that geometry node occupancy is encoded using bitwise contextualisation of the syntax element ocupancy_map. For example, the bitwise_occupancy_coding_flag field equal to 0 indicates that geometry node occupancy is encoded using the dictionary encoded syntax element occupancy_byte.

The adjacent_child_contextualization_enabled_flag field indicates whether the adjacent children of neighboring octree nodes are used for bitwise occupancy contextualization. For example, the adjacent_child_contextualization_enabled_flag field equal to 1 indicates that the adjacent children of neighboring octree nodes are used for bitwise occupancy contextualization. For example, adjacent_child_contextualization_enabled_flag equal to 0 indicates that the children of neighbouring octree nodes are not used for the occupancy contextualization.

The log2_neighbour_avail_boundary field specifies the value of the variable NeighbAvailBoundary that is used in the decoding process. For example, when the neighbour_context_restriction_flag field is equal to 1, NeighbAvailabilityMask may be set equal to 1. For example, when the neighbour_context_restriction_flag field is equal to 0, NeighbAvailabilityMask may be set equal to 1<<log2_neighbour_avail_boundary.

The log2_intra_pred_max_node_size field specifies the octree node size eligible for occupancy intra prediction.

The log2_trisoup_node_size field specifies the variable TrisoupNodeSize as the size of the triangle nodes.

geom_scaling_enabled_flag indicates specifies whether a scaling process for geometry positions is applied during the geometry slice decoding process. For example, geom_scaling_enabled_flag equal to 1 specifies that a scaling process for geometry positions is applied during the geometry slice decoding process. geom_scaling_enabled_flag equal to 0 specifies that geometry positions do not require scaling.

geom_base_qp indicates the base value of the geometry position quantization parameter.

gps_implicit_geom_partition_flag indicates whether the implicit geometry partition is enabled for the sequence or slice. For example, equal to 1 specifies that the implicit geometry partition is enabled for the sequence or slice. gps_implicit_geom_partition_flag equal to 0 specifies that the implicit geometry partition is disabled for the sequence or slice. When gps_implicit_geom_partition_flag is equal to 1, the following two fields, that is, a gps_max_num_implicit_qtbt_before_ot field and a gps_min_size_implicit_qtbt field, are signaled.

gps_max_num_implicit_qtbt_before_ot specifies the maximal number of implicit QT and BT partitions before OT partitions. Then, the variable K is initialized by gps_max_num_implicit_qtbt_before_ot as follows.
K=gps_max_num_implicit_qtbt_before_ot.

gps_min_size_implicit_qtbt specifies the minimal size of implicit QT and BT partitions. Then, the variable M is initialized by gps_min_size_implicit_qtbt as follows.
M=gps_min_size_implicit_qtbt gps_extension_flag indicates whether a gps_extension_data syntax structure is present in the GPS syntax structure. For example, gps_extension_flag equal to 1 indicates that the gps_extension_data syntax structure is present in the GPS syntax. For example, gps_extension_flag equal to 0 indicates that the gps_extension_data syntax structure is not present in the GPS syntax.

When gps_extension_flag is equal to 1, the GPS according to the embodiments may further include a gps_extension_data_flag field.

gps_extension_data_flag may have any value. Its presence and value do not affect decoder conformance to profiles.

FIG. 22 is a diagram illustrating an embodiment of a syntax structure of a geometry parameter set (GPS) (geometry_parameter_set( )) including information related to root node prediction according to embodiments.

In FIG. 22, if the value of a geom_octree_flag field is False, that is, if a tree structure for geometry compression is a predictive tree, the GPS may further include a root_slice_present_flag field, a a dependent_slice_present_flag field, and dependent_tree_present_flag field.

The root_slice_present_flag field indicates whether root nodes in slices are grouped into a separate slice (i.e., a root slice or slice 0). For example, if the root nodes in slices are grouped into the separate slice (i.e., the root slice or slice 0), the value of the root_slice_present_flag field is 1 and, if the root nodes in slices are not grouped into the separate slice (i.e., the root slice or slice 0), the value of the root_slice_present_flag field becomes 0. If the value of the root_slice_present_flag field is 1, this indicates that prediction between root nodes is allowed as described above. If the value of the root_slice_present_flag field is 0, the root nodes exist at an original slice position and, in this case, prediction between the root nodes is not performed.

The dependent_slice_present_flag field indicates whether continuity between slices (i.e., dependency between slices) is allowed. For example, if the value of the dependent_slice_present_flag field is 1, this indicates that continuity between slices is allowed. In this case, reference between slices may be allowed, or reference to a node in another slice may be allowed for a starting node of a slice as described above. In this case, a root node of a current predictive tree may be predicted based on a specific point (referred to as a reference point) of another predictive tree (referred to as a reference tree or a reference predictive tree). As another example, if the value of the dependent_slice_present_flag field is 0, this indicates that continuity between slices is not allowed. That is, this indicates that a plurality of slices is configured independently of each other and, in this case, this may indicate that parallel processing may be performed on a plurality of slices.

According to embodiments, dependency between slices may be allowed for compression efficiency depending on application fields, whereas parallel processing may also be simultaneously applied by independently defining some slices. For example, if N independent slices are defined and the number of dependent slices associated with each independent slice is similarly defined, the reception device supporting N or more multiple processors may simultaneously process the N independent slices and related dependent slices. If necessary, the number of independent slices and the number of dependent slices associated with each independent slice may be signaled.

The dependent_tree_present_flag field indicates whether continuity between trees (i.e., dependency between trees) is allowed. For example, if the value of the dependent_tree_present_flag field is 1, this indicates that continuity between trees (i.e., dependency between trees) is allowed. In this case, reference between trees may be allowed, or reference to a node in another tree may be allowed for a starting node of a tree as described above. As another example, if the value of the dependent_tree_present_flag field is 0, this indicates that continuity between trees is not allowed. That is, this indicates that a plurality of trees is configured independently of each other and, in this case, this may indicate that parallel processing may be performed on a plurality of trees.

According to embodiments, information related to root node prediction of FIG. 22 may be included in any position of the GPS of FIG. 21.

FIG. 23 is a diagram illustrating an example of a syntax structure of a tile parameter set (TPS) (tile_parameter_set( )) according to embodiments. According to embodiments, the TPS may also be referred to as a tile inventory. The TPS according to the embodiments includes information related to each tile for each tile.

The TPS according to the embodiments includes a num_tiles field.

The num_tiles field indicates the number of tiles signaled for a corresponding bitstream. If tiles are not present, the value of the num_tiles field is inferred to be 0.

The TPS according to the embodiments includes an iteration statement repeated as many times as the value of the num_tiles field. In this case, i is initialized to 0 and is incremented by 1 each time the repetitive statement is executed. In an embodiment, the repetitive statement is repeated until the value of i becomes the value of the num_tiles field. This repetitive statement may include a tile_bounding_box_offset_x[i] field, a tile_bounding_box_offset_y[i] field, a tile_bounding_box_offset_z[i] field, a tile_bounding_box_size_width[i] field, a tile_bounding_box_size_height[i] field, a tile_bounding_box_ size_depth[i] field, and an attribute_pred_residual_separate_encoding_flag[i] field.

The tile_bounding_box_offset_x[i] field indicates the x offset of the i-th tile in cartesian coordinates.

The tile_bounding_box_offset_y[i] field represents the y offset of the i-th tile in cartesian coordinates.

The tile_bounding_box_offset_z[i] field represents the z offset of the i-th tile in cartesian coordinates.

The tile_bounding_box_size_width[i] field indicates the width of the i-th tile in cartesian coordinates.

The tile_bounding_box_size_height[i] field indicates the height of the i-th tile in cartesian coordinates.

The tile_bounding_box_size_depth[i] field indicates the depth of the i-th tile in the cartesian coordinates.

FIG. 24 is a diagram illustrating an embodiment of a syntax structure of a tile parameter set (TPS) (tile_parameter_set( )) including information related to root node prediction according to embodiments.

In FIG. 24, if the value of a geom_octree_flag field is false, that is, if the tree structure for geometry compression is a predictive tree, the TPS may further include a root_slice_present_flag field, a dependent_slice_present_flag field, and a dependent_tree_present_flag field.

Since the fields included in the TPS of FIG. 24 have the same meaning of the fields of FIG. 22, a description thereof is omitted herein to avoid redundancy.

According to embodiments, the information related to root node prediction of FIG. 24 may be included in an arbitrary position (e.g., within a repetitive statement) of the TPS of FIG. 23. The information related to root node prediction of FIG. 24 may be applied when a compression unit of the point cloud data (i.e., geometry information) is in units of a tile or in units of a tile group.

FIG. 25 shows an embodiment of a syntax structure of the attribute parameter set (APS) (attribute_parameter_set( )) according to the present disclosure. The APS according to the embodiments may contain information on a method of encoding attribute information about point cloud data contained in one or more slices.

The APS according to the embodiments may include an aps_attr_parameter_set_id field, an aps_seq_parameter_set_id field, an attr_coding_type field, an aps_attr_initial_qp field, an aps_attr_chroma_qp_offset field, an aps_slice_qp_delta_present_flag field, and an aps_extension_flag field.

The aps_attr_parameter_set_id field provides an identifier for the APS for reference by other syntax elements.

The aps_seq_parameter_set_id field specifies the value of sps_seq_parameter_set_id for the active SPS.

The attr_coding_type field indicates the coding type for the attribute.

According to embodiments, the attr_coding_type field equal to 0 may indicate predicting weight lifting as the coding type. The attr_coding_type field equal to 1 may indicate RAHT as the coding type. The attr_coding_type field equal to 2 may indicate fix weight lifting.

The aps_attr_initial_qp field specifies the initial value of the variable SliceQp for each slice referring to the APS.

The aps_attr_chroma_qp_offset field specifies the offsets to the initial quantization parameter signaled by the syntax aps_attr_initial_qp.

The aps_slice_qp_delta_present_flag field specifies whether the ash_attr_qp_delta_luma and ash_attr_qp_delta_chroma syntax elements are present in the attribute slice header (ASH). For example, the aps_slice_qp_delta_present_flag field equal to 1 specifies that the ash_attr_qp_delta_luma and ash_attr_qp_delta_chroma syntax elements are present in the ASH. For example, the aps_slice_qp_delta_present_flag field specifies that the ash_attr_qp_delta_luma and ash_attr_qp_delta_chroma syntax elements are not present in the ASH.

When the value of the attr_coding_type field is 0 or 2, that is, the coding type is predicting weight lifting or fix weight lifting, the APS according to the embodiments may further include a lifting_num_pred_nearest_neighbours_minus1 field, a lifting_search_range_minus1 field, and a lifting_neighbour_bias[k] field.

lifting_num_pred_nearest_neighbours plus 1 specifies the maximum number of nearest neighbors to be used for prediction. According to embodiments, the value of NumPredNearestNeighbours is set equal to lifting_num_pred_nearest_neighbours.

lifting_search_range_minus1 plus 1 specifies the search range used to determine nearest neighbours to be used for prediction and to build distance-based levels of detail (LODs). The variable LiftingSearchRange for specifying the search range may be obtained by adding 1 to the value of the lifting_search_range_minus1 field (LiftingSearchRange=lifting_search_range_minus1+1).

The lifting_neighbour_bias[k] field specifies a bias used to weight the k-th components in the calculation of the Euclidean distance between two points as part of the nearest neighbor derivation process.

When the value of the attr_coding_type field is 2, that is, when the coding type indicates fix weight lifting, the APS according to the embodiments may further include a lifting_scalability_enabled_flag field.

The lifting_scalability_enabled_flag field specifies whether the attribute decoding process allows the pruned octree decode result for the input geometry points. For example, the lifting_scalability_enabled_flag field equal to 1 specifies that the attribute decoding process allows the pruned octree decode result for the input geometry points. The lifting_scalability_enabled_flag field equal to 0 specifies that that the attribute decoding process requires the complete octree decode result for the input geometry points.

According to embodiments, when the value of the lifting_scalability_enabled_flag field is FALSE, the APS may further include a lifting_num_detail_levels_minus1 field.

The lifting_num_detail_levels_minus1 field specifies the number of levels of detail for the attribute coding. The variable LevelDetailCount for specifying the number of LODs may be obtained by adding 1 to the value of the lifting_num_detail_levels_minus1 field. (LevelDetailCount=lifting_num_detail_levels_minus1+1).

According to embodiments, when the value of the lifting_num_detail_levels_minus1 field is greater than 1, the APS may further include a lifting_lod_regular_sampling_enabled_flag field.

The lifting_lod_regular_sampling_enabled_flag field specifies whether levels of detail (LODs) are built by a regular sampling strategy. For example, the lifting_lod_regular_sampling_enabled_flag equal to 1 specifies that levels of detail (LOD) are built by using a regular sampling strategy. The lifting_lod_regular_sampling_enabled_flag equal to 0 specifies that a distance-based sampling strategy is used instead.

According to embodiments, when the value of the lifting_scalability_enabled_flag field is FALSE, the APS may further include an iteration statement iterated as many times as the value of the lifting_num_detail_levels_minus1 field. In an embodiment, the index (idx) is initialized to 0 and incremented by 1 every time the iteration statement is executed, and the iteration statement is iterated until the index (idx) is greater than the value of the lifting_num_detail_levels_minus1 field. This iteration statement may include a lifting_sampling_period_minus2[idx] field when the value of the lifting_lod_decimation_enabled_flag field is TRUE (e.g., 1), and may include a lifting_sampling_distance_squared_scale_minus1[idx] field when the value of the lifting_lod_regular_sampling_enabled_flag field is FALSE (e.g., 0). Also, when the value of idx is not 0 (idx!=0), a lifting_sampling_distance_squared_offset[idx] field may be further included.

lifting_sampling_period_minus2[idx] plus 2 specifies the sampling period for the level of detail idx.

lifting_sampling_distance_squared_scale_minu1[idx] plus 1 specifies the scale factor for the derivation of the square of the sampling distance for the level of detail idx.

The lifting_sampling_distance_squared_offset[idx] field specifies the offset of the derivation of the square of the sampling distance for the level of detail idx.

When the value of the attr_coding_type field is 0, that is, when the coding type is predicting weight lifting, the APS according to the embodiments may further include a lifting_adaptive_prediction_threshold field, a lifting_intra_lod_prediction_num_layers field, a lifting_max_num_direct_predictors field, and an inter_component_prediction_enabled_flag field.

The lifting_adaptive_prediction_threshold field specifies the threshold to enable adaptive prediction. According to embodiments, a variable AdaptivePredictionThreshold for specifying a threshold for switching an adaptive predictor selection mode is set equal to the value of the lifting_adaptive_prediction_threshold field (AdaptivePredictionThreshold=lifting_adaptive_prediction_threshold).

The lifting_intra_lod_prediction_num_layers field specifies the number of LOD layers where decoded points in the same LOD layer could be referred to generate a prediction value of a target point. For example, the lifting_intra_lod_prediction_num_layers field equal to LevelDetailCount indicates that target point could refer to decoded points in the same LOD layer for LOD layers. all For example, the lifting_intra_lod_prediction_num_layers field equal to 0 indicates that target point could not refer to decoded points in the same LoD layer for any LoD layers. The lifting_max_num_direct_predictors field specifies the maximum number of predictors to be used for direct prediction. The value of the lifting_max_num_direct_predictors field shall be in the range of 0 to LevelDetailCount.

The inter_component_prediction_enabled_flag field specifies whether the primary component of a multi component attribute is used to predict the reconstructed value of non-primary components. For example, if the inter_component_prediction_enabled_flag field equal to 1 specifies that the primary component of a multi component attribute is used to predict the reconstructed value of non-primary components. The inter_component_prediction_enabled_flag field equal to 0 specifies that all attribute components are reconstructed independently.

According to the embodiments, when the value of the attr_coding_type field is 1, that is, when the attribute coding type is RAHT, the APS may further include a raht_prediction_enabled_flag field.

The raht_prediction_enabled_flag field specifies whether the transform weight prediction from the neighbor points is enabled in the RAHT decoding process. For example, the raht_prediction_enabled_flag field equal to 1 specifies the transform weight prediction from the neighbor points is enabled in the RAHT decoding process. raht_prediction_enabled_flag equal to 0 specifies that the transform weight prediction is disabled in the RAHT decoding process.

According to embodiments, when the value of the raht_prediction_enabled_flag field is TRUE, the APS may further include a raht_prediction_threshold0 field and a raht_prediction_threshold1 field.

The raht_prediction_threshold0 field specifies a threshold to terminate the transform weight prediction from neighbour points.

The raht_prediction_threshold1 field specifies a threshold to skip the transform weight prediction from neighbour points.

The aps_extension_flag field specifies whether the aps_extension_data_flag syntax structure is present in the APS syntax structure. For example, aps_extension_flag equal to 1 indicates that the aps_extension_data syntax structure is present in the APS syntax structure. For example, aps_extension_flag equal to 0 indicates that the aps_extension_data syntax structure is not present in the APS syntax structure.

When the value of the aps_extension_flag field is 1, the APS according to the embodiments may further include an aps_extension_data_flag field.

The aps_extension_data_flag field may have any value. Its presence and value do not affect decoder conformance to profiles.

The APS according to the embodiments may further include information related to LoD-based attribute compression.

FIG. 26 is a diagram illustrating an embodiment of a syntax structure of a geometry slice bitstream( ) according to the present disclosure.

A geometry slice bitstream (geometry_slice_bitstream( )) according to embodiments may include a geometry slice header (geometry_slice_header( )) and geometry slice data (geometry_slice_data( )). According to embodiments, the geometry slice bitstream is also referred to as a geometry data unit, the geometry slice header is also referred to as a geometry data unit header, and the geometry slice data is also referred to as geometry data unit data.

FIG. 27 shows an embodiment of a syntax structure of a geometry slice header (geometry_slice_header( )) according to the present disclosure.

A bitstream transmitted by the transmission device (or a bitstream received by the reception device) according to the embodiments may contain one or more slices. Each slice may include a geometry slice and an attribute slice. The geometry slice includes a geometry slice header (GSH). The attribute slice includes an attribute slice header (ASH).

The geometry slice header (geometry_slice_header( )) according to the embodiments may include a gsh_geometry_parameter_set_id field, a gsh_tile_id field, gsh_slice_id field, a frame_idx field, a gsh_num_points field, and a byte_alignment( ) field.

When the value of the gps_box_present_flag field included in the GPS is TRUE (e.g., 1), and the value of the gps_gsh_box_log2_scale_present_flag field is TRUE (e.g., 1), the geometry slice header (geometry_slice_header( )) according to the embodiments may further include a gsh_box_log2_scale field, a gsh_box_origin_x field, a gsh_box_origin_y field, and a gsh_box_origin_z field.

gsh_geometry_parameter_set_id specifies the value of the gps_geom_parameter_set_id of the active GPS.

The gsh_tile_id field specifies the value of the tile id that is referenced by the GSH.

The gsh_slice_id field specifies ID of the slice for reference by other syntax elements.

The frame_idx field indicates log2_max_frame_idx+1 least significant bits of a conceptual frame number counter. Consecutive slices with differing values of frame_idx form parts of different output point cloud frames. Consecutive slices with identical values of frame_idx without an intervening frame boundary marker data unit form parts of the same output point cloud frame.

The gsh_num_points field indicates the maximum number of coded points in a slice. According to embodiments, it is a requirement of bitstream conformance that gsh_num_points is greater than or equal to the number of decoded points in the slice.

The gsh_box_log2_scale field specifies the scaling factor of the bounding box origin for the slice.

The gsh_box_origin_x field specifies the x value of the bounding box origin scaled by the value of the gsh_box_log2_scale field.

The gsh_box_origin_y field specifies the y value of the bounding box origin scaled by the value of the gsh_box_log2_scale field.

The gsh_box_origin_z field specifies the z value of the bounding box origin scaled by the value of the gsh_box_log2_scale field.

Here, the variables slice_origin_x, slice_origin_y, and slice_origin_z may be derived as follows.

When gps_gsh_box_log2_scale_present_flag is equal to 0, originScale is set to gsh_box_log2_scale.

When gps_gsh_box_log2_scale_present_flag is equal to 1, originScale is set to gps_gsh_box_log2_scale.

When gps_box_present_flag is equal to 0, the values of the variables slice_origin_x, slice_origin_y, and slice_origin_z are inferred to be 0.

When gps_box_present_flag is equal to 1, the following equations will be applied to the variables slice_origin_x, slice_origin_y, and slice_origin_z.

$$\text{slice\_origin\_}x = gsh\_\text{box\_origin\_}x \ll \text{originScale}$$

$$\text{slice\_origin\_}y = gsh\_\text{box\_origin\_}y \ll \text{originScale}$$

$$\text{slice\_origin\_}z = gsh\_\text{box\_origin\_}z \ll \text{originScale}$$

When the value of the gps_implicit_geom_partition_flag field is TRUE (i.e., 0), the geometry slice header ((geometry_slice_header( ))) may further include a gsh_log2_max_nodesize_x field, a gsh_log2_max_nodesize_y_minus_x field, and a gsh_log2_max_nodesize_z_minus_y field. When the value of the gps_implicit_geom_partition_flag field is FALSE (i.e., 1), the geometry slice header may further include a gsh_log2_max_nodesize field.

The gsh_log2_max_nodesize_x field specifies the bounding box size in the x dimension, i.e., MaxNodesizeXLog2 that is used in the decoding process as follows.

$$\text{MaxNodeSizeXLog2} = gsh\_\text{log2\_max\_nodesize\_}x$$

$$\text{MaxNodeSizeX} = 1 \ll \text{MaxNodeSizeXLog2}$$

The gsh_log2_max_nodesize_y_minus_x field specifies the bounding box size in the y dimension, i.e., MaxNodesizeYLog2 that is used in the decoding process as follows.

$$\text{MaxNodeSizeYLog2} = gsh\_\text{log2\_max\_nodesize\_}y\_\text{minus\_}x + \text{MaxNodeSizeXLog2}.$$

$$\text{MaxNodeSizeY} = 1 \ll \text{MaxNodeSizeYLog2}.$$

The gsh_log2_max_nodesize_z_minus_y field specifies the bounding box size in the z dimension, i.e., MaxNodesizeZLog2 that is used in the decoding process as follows.

$$\text{MaxNodeSizeZLog2} = gsh\_\text{log2\_max\_nodesize\_}z\_\text{minus\_}y + \text{MaxNodeSizeYLog2}$$

$$\text{MaxNodeSizeZ} = 1 \ll \text{MaxNodeSizeZLog2}$$

When the value of the gps_implicit_geom_partition_flag field is 1, gsh_log2_max_nodesize is obtained as follows.

$$gsh\_\text{log2\_max\_nodesize} = \max\{\text{MaxNodeSizeXLog2}, \text{MaxNodeSizeYLog2}, \text{MaxNodeSizeZLog2}\}$$

The gsh_log2_max_nodesize field specifies the size of the root geometry octree node when gps_implicit_geom_partition_flag is equal to 0.

Here, the variables MaxNodeSize and MaxGeometryOctreeDepth are derived as follows.

$$\text{MaxNodeSize} = 1 \ll gsh\_\text{log2\_max\_nodesize}$$

$$\text{MaxGeometryOctreeDepth} = gsh\_\text{log2\_max\_nodesize} - \text{log2\_trisoup\_node\_size}$$

When the value of the geom_scaling_enabled_flag field is TRUE, the geometry slice header (geometry_slice_header( )) according to the embodiments may further include a geom_slice_qp_offset field and a geom_octree_qp_offsets_enabled_flag field.

The geom_slice_qp_offset field specifies an offset to the base geometry quantization parameter geom_base_qp.

The geom_octree_qp_offsets_enabled_flag field specifies whether the geom_octree_qp_ofsets_depth field is present in the geometry slice header. For example, geom_octree_qp_offsets_enabled_flag equal to 1 specifies that the geom_octree_qp_offsets_depth field is present in the geometry slice header. geom_octree_qp_offsets_enabled_flag equal to 0 specifies that the geom_octree_qp_ofsets_depth field is not present.

The geom_octree_qp_offsets_depth field specifies the depth of the geometry octree.

FIG. 28 is a diagram illustrating an embodiment of a syntax structure of a geometry slice header (geometry_slice_header( )) including information related to root node prediction according to embodiments.

In FIG. 28, if the value of a geom_octree_flag field is False, that is, if the tree structure for geometry compression is a predictive tree, the geometry slice header may further include a num_tree field.

The num_tree field may indicate the number of predictive trees included in a corresponding slice. According to embodiments, if the value of the num_tree field is 0, this may indicate that the corresponding slice is a root slice. That is, this is because the root slice is a slice configured by collecting root nodes of other slices. In this case, nodes of the root slice may construct a predictive tree or other trees (e.g., an octree, a quadtree, or a binary tree), for prediction. In other words, prediction of nodes in the root slice and prediction of nodes in other slices may be performed in the same way (e.g., predictive tree-based prediction) or may be performed in different ways (e.g., the root slice is based on an octree, and the other slices are based on a predictive tree).

The geometry slice header may further include as many tree_id[i] fields as the value of the num_tree field.

The tree_id[i] field represents an identifier for identifying an i-th predictive tree in a corresponding slice.

The geometry slice header may further include a root_slice_flag field when the value of the root_slice_present_flag field is True. Since the root_slice_present_flag field is included in the GPS and/or the TPS and has been described in detail above, a description thereof is omitted herein to avoid redundancy.

The root_slice_flag field indicates whether a corresponding slice is a slice in which only root nodes of other slices are collected. For example, if the value of the root_slice_flag field is 1, this may indicate that the corresponding slice is a slice in which only root nodes are collected. That is, if the value of the root_slice_flag field is 1, this indicates that the corresponding slice is a root slice (or slice 0). As another example, if the value of the root_slice_flag field is 0, this may indicate that the corresponding slice is not a slice in which only root nodes are collected.

According to embodiments, the root slice may be used to represent a thumbnail or low-resolution information according to application fields and may be extended as a type of scalable coding.

If the value of the root_slice_flag field is True (i.e., 1), the geometry slice header may further include a root_point_ascending_order_flag field.

The root_point_ascending_order_flag field may indicate whether points in the root slice follow an order of matching slices. For example, if the value of the root_point_ascending_order_flag field is 1, this may indicate that points in the root slice follow an order of matching slices. That is, this may indicate that the order of slices and the order of nodes are matched one-to-one. Referring to FIG. 18 as an example, the root node 50021 of slice 1 is the starting node in the root slice, the root node 50022 of slice 2 is the second node in the root slice, and the root node 50023 of slice 3 is the third node in the root slice. As another example, if the value of the root_point_ascending_order_flag field is 0, this may indicate that points in the root slice are listed in an arbitrary order. In this case, information about the order of nodes in the root slice may be delivered through geometry predictive tree data (geometry_predtree_data( )). A description of geometry_predtree_data( ) will be given later.

The geometry slice header may further include a dependency_slice_flag field when the value of the dependent_slice_present_flag field is True. Since the dependent_slice_present_flag field is included in the GPS and/or the TPS and has been described hereinabove in detail, a description thereof is omitted herein to avoid redundancy.

The dependency_slice_flag field may indicate whether a corresponding slice (or a current slice) has dependency on other slices. For example, if the value of the dependency_slice_flag field is 1, this may indicate that a corresponding slice (or a current slice) has dependency on other slices. In this case, reference between slices may be allowed and a parent of a starting node of the corresponding slice is defined as a node of another slice. In FIG. 17, as an example, a parent of the starting node 50022 of slice 2 (i.e., the corresponding slice) becomes the leaf node 50031 of slice 1. Alternatively, if the value of the dependency_slice_flag field is 1, this may indicate that information about other slices is required for decoding of the corresponding slice (or current slice). As another example, if the value of the dependency_slice_flag field is 0, this may indicate that the corresponding slice (or current slice) does not have dependency on other slices and that the corresponding slice (or current slice) may be independently decoded.

In another embodiment, whether each slice is used in a decoding process of another slice may be indicated through the dependency_slice_flag field, if necessary.

If the value of the dependent_slice_flag field is True (i.e., 1), the geometry slice header may further include a reference_gsh_slice_id field, a reference_tree_id field, and a reference_node_idx field.

The reference_gsh_slice_id field may indicate slice indicator information about another slice that a corresponding slice (or a current slice) refers to. That is, the reference_gsh_slice_id field may provide the slice indicator information for identifying another slice (i.e., a reference slice) that the corresponding slice (or current slice) refers to. Referring to FIG. 17, as an example, when the corresponding slice (or current slice) is slice 2, the reference_gsh_slice_id field provides the slice indicator information for identifying slice 1. According to embodiments, the reference_gsh_slice_id field may have one value among indicator information (e.g., gsh_slice_ids) of a previously decoded slice.

The reference_tree_id field may indicate tree indicator information for a tree that the corresponding slice refers to. That is, the reference_tree_id field may provide tree indicator information for identifying another tree (i.e., a reference tree) that the corresponding slice (or corresponding tree) refers to. According to embodiments, the reference_tree_id field may have one value among indicator information (e.g., tree_ids) of a previously decoded tree.

The reference_node_idx field may indicate node index information for identifying a node that a root node of the corresponding slice refers to among nodes in a slice that the corresponding slice refers to. That is, the reference_node_idx field may provide node indicator information for identifying a node that the root node of the corresponding slice refers to among nodes in a slice (i.e., a reference slice) that the corresponding slice refers to. As described above, the reference_node_idx field may have a value for identifying a node in the reference slice used to predict a starting node of the corresponding slice. In this case, the reference_node_idx field may serve to indicate the position of a parent node of the root node of the corresponding slice. Therethrough, it may be implicitly informed that a parent of the reference node becomes a grandparent of the starting node of the corresponding slice.

Referring to FIG. 17 as an example, when the corresponding slice is slice 2, the reference_node_idx field is node index information for identifying the leaf node 50031 of slice 1. That is, the leaf node 50031 of slice 1 becomes a parent node of the root node 50022 of slice 2, and a parent node of the leaf node 50031 of slice 1 becomes a grandparent node of slice 2.

According to embodiments, when a plurality of root nodes is defined in the corresponding slice and nodes that the root nodes refer to are different, a plurality of reference_gsh_slice_id fields and reference_node_idx fields may be signaled in the geometry slice header.

For example, when each of the value of the root_slice_present_flag field and the value of the root_point_ascending_order_flag field is 1 and the positions of points in the root slice may be inferred (e.g., when constraint conditions that sorting is performed in order of slices, excluding the root slice, and in order of root nodes in the root slice and slices are sequentially delivered to the decoder of the reception device are specified), the reference_gsh_slice_id field and the reference_node_idx field may not be transmitted to the reception device.

As another example, when the value of the root_slice_present_flag field is 1 and the value of the root_point_ascending_order_flag field is 0, the value of the reference_gsh_slice_id field may be used to indicate the root slice, and the value of the reference_node_idx field may be used to indicate a node related to a current slice within the root slice. In this case, the reference_node_idx field may be used to directly indicate the position of a related node within the root slice rather than indicating a node (i.e., parent node) that the root node refers to.

As another example, when the value of the root_slice_present_flag field is 1 and one root slice is uniquely present within a frame (i.e., when it is obvious), the reference_gsh_slice_id field may be omitted.

The geometry slice header may further include a dependent_tree_flag field when the value of the dependent_tree_present_flag field is True. Since the dependent_tree_present_flag field is included in the GPS and/or the TPS and has been described in detail above, a description thereof is omitted herein to avoid redundancy.

The dependent_tree_flag field may indicate whether a corresponding predictive tree has dependency on other predictive trees. For example, if the value of the dependency_tree_flag field is 1, this may indicate that a corresponding predictive tree has a dependency on other predictive trees. In this case, reference between predictive trees may be allowed and a parent of a starting node may be defined as a node of another predictive tree as described above. Alternatively, if the value of the dependency_tree_flag field is 1, this may indicate that information about other predictive trees is required for decoding of the corresponding predictive tree. As another example, if the value of the dependency_tree_flag field is 0, this may indicate that the corresponding predictive tree has no dependency on other predictive trees and that the corresponding predictive tree may be independently decoded.

As another embodiment, if necessary, whether each predictive tree is used for a decoding process of another predictive tree may be indicated through the dependency_tree_flag field.

If the value of the dependent_tree_flag field is True (i.e., 1), the geometry slice header may further include a reference_tree_id field and a reference_node_idx field.

The reference_tree_id field may indicate tree indicator information about a predictive tree that a corresponding predictive tree refers to. That is, the reference_tree_id field may provide tree indicator information for identifying a predictive tree (i.e., a reference predictive tree) that the corresponding predictive tree refers to. According to embodiments, the reference_tree_id field may have one value among indicator information (e.g., tree_id) of a previously decoded tree.

The reference_node_idx field may indicate node index information for identifying a node that a root node of a corresponding predictive tree refers to among nodes in a predictive tree (i.e., a reference predictive tree) that the corresponding predictive tree refers to. As described above, the reference_node_idx field may have a value for identifying a node in the reference predictive tree used to predict a starting node of the corresponding predictive tree. In this case, the reference_node_idx field may serve to indicate the position of a parent node of the root node of the corresponding predictive tree. Therethrough, it may be implicitly informed that a parent of the reference node becomes a grandparent of a starting node of the corresponding slice.

FIG. 29 is a diagram illustrating an example of a syntax structure of geometry predictive tree data (geometry_predtree_data( )) according to embodiments.

According to embodiments, the geometry predictive tree data (geometry_predtree_data( )) of FIG. 29 may be included in the geometry slice bitstream(or geometry bitstream). The geometry predictive tree data (geometry_predtree_data( )) may be referred to as geometry slice data or geometry data unit data.

The geometry predictive tree data (geometry_predtree_data( )) may include geometry_predtree_node_root_slice (root_slice_flag) if the value of the root_slice_flag field included in the geometry slice header is True (i.e., 1), that is, if a corresponding slice is a root slice in which only root nodes of other slices are collected. A detailed description of the geometry_predtree_node_root_slice (root_slice_flag) will be given in FIG. 30.

The geometry predictive tree data (geometry_predtree_data( )) may further include an iteration statement.

In an embodiment, the iteration statement is repeated as many times as the number of nodes in a corresponding slice to indicate information about the order of nodes in the corresponding slice. In this case, the iteration statement may indicate the position of a corresponding node from a starting node under the assumption that the position of the starting node in the corresponding slice is 0.

For this purpose, a parameter PtnNodeIdx is initialized to 0 and incremented by 1 each time the repetition is executed. The iteration statement includes a geometry_predtree_node (PtnNodeIdx) field. When the value of NodeIdx is less than or equal to the value of a geom_num_points_minus1 field, the geometry_predtree_node (PtnNodeIdx) field indicates an index of a current node (PtnNodeIdx) in the corresponding slice.

The corresponding slice may be a root slice or a slice in which points of point cloud data are divided (e.g., one of slice 1 to slice 3).

For example, if the corresponding slice is the root slice, the iteration statement may provide index values of nodes in the root slice.

The number of nodes (i.e., points) in the corresponding slice may be indicated by adding 1 to the value of the geom_num_points_minus1 field. Alternatively, the number of coded points in a corresponding geometry data unit may be indicated by adding 1 to the value of the geom_num_points_minus1 field. The geom_num_points_minus1 field may be included in the geometry slice bitstream(also referred to as the geometry data unit).

According to embodiments, the geometry predictive tree data (geometry_predtree_data( )) may include prediction mode information and residual information of each node (i.e., each point) in a corresponding slice. For example, if the corresponding slice is the root slice, the geometry predictive tree data (geometry_predtree_data( )) may include the prediction mode information and the residual information of each node in the root slice (i.e., a root node of another slice).

FIG. 30 is a diagram illustrating an example of a syntax structure of geometry_predtree_node_root_slice (root_slice_flag) according to embodiments.

That is, in an embodiment, geometry_predtree_node_root_slice (root_slice_flag) of FIG. 30 indicates original information of nodes in a root slice.

To this purpose, the geometry_predtree_node_root_slice (root_slice_flag) may include a num_root_points field and an iteration statement repeated as many times as the value of the num_root_points field when the value of the root_point_ascending_order_flag field is False.

The num_root_points field may indicate the number of points in the root slice.

The iteration statement may include an original_gsh_slice_id field, an original_tree_id field, and an original_node_idx field.

The original_gsh_slice_id field provides slice indicator information for identifying an original slice to which an i-th point in the root slice belongs. For example, if the i-th point in the root slice is a root node of slice 2, the original_gsh_slice_id field provides slice indicator information for identifying slice 2. According to embodiments, the original_gsh_slice_id field may have one value among slice indicators (slice_id) for identifying geometry slices included in a bitstream.

The original_tree_id field provides tree indicator information for identifying an original predictive tree to which the i-th point in the root slice belongs. According to embodiments, the original_tree_id field may have a value of one of tree identifiers (tree_id) for identifying predictive trees included in the bitstream.

The original_node_idx field may indicate the position of a node in the original predictive tree to which the i-th point in the root slice belongs. In an embodiment, since the root slice is configured by collecting root nodes within slices, the original_node_idx field may indicate a position value of a root node of the original predictive tree to which the i-th point in the root slice belongs. In another embodiment, the position of a corresponding node from a starting node may be indicated under the assumption that the position of the starting node in the original predictive tree is 0.

FIG. 31 is a diagram illustrating another embodiment of a syntax structure of geometry slice data (geometry_slice_data( )) according to the present disclosure. The geometry slice data (geometry_slice_data( )) according to embodiments may transmit a geometry bitstream belonging to a corresponding slice. FIG. 31 may be applied when geometry prediction is performed based on an octree or a trisoup.

The geometry_slice_data( )) according to the embodiments may include a first iteration statement repeated as many times as by the value of MaxGeometryOctreeDepth. In an embodiment, the depth is initialized to 0 and is incremented by 1 each time the iteration statement is executed, and the first iteration statement is repeated until the depth becomes equal to MaxGeometryOctreeDepth. The first iteration statement may include a second loop statement repeated as many times as the value of NumNodesAtDepth. In an embodiment, nodeidx is initialized to 0 and is incremented by 1 each time the iteration statement is executed. The second iteration statement is repeated until nodeidx becomes equal to NumNodesAtDepth. The second iteration statement may include xN=NodeX[depth][nodeIdx], yN=NodeY[depth][nodeIdx], zN=NodeZ[depth][nodeIdx], and geometry_node(depth, nodeIdx, xN, yN, zN). MaxGeometryOctreeDepth indicates the maximum value of the geometry octree depth, and NumNodesAtDepth[depth] indicates the number of nodes to be decoded at the corresponding depth. The variables NodeX[depth][nodeIdx], NodeY[depth][nodeIdx], and NodeZ[depth][nodeIdx] indicate the x, y, z coordinates of the idx-th node in decoding order at a given depth. The geometry bitstream of the node of the depth is transmitted through geometry_node(depth, nodeIdx, xN, yN, zN).

The geometry slice data (geometry_slice_data( )) according to the embodiments may further include geometry_trisoup_data( ) when the value of the log2_trisoup_node_size field is greater than 0. That is, when the size of the triangle nodes is greater than 0, a geometry bitstream subjected to trisoup geometry encoding is transmitted through geometry_trisoup_data( ).

FIG. 32 shows an embodiment of a syntax structure of attribute_slice_bitstream( ) according to the present disclosure.

The attribute slice bitstream (attribute_slice_bitstream( )) according to the embodiments may include an attribute slice header (attribute_slice_header( )) and attribute slice data (attribute_slice_data( )). According to the embodiments, the attribute slice bitstream may be referred to as an attribute data unit, the attribute slice header may be referred to as an attribute data unit header, and the attribute slice data may be referred to as an attribute data unit data.

FIG. 33 shows an embodiment of a syntax structure of an attribute slice header (attribute_slice_header( )) according to the present disclosure.

The attribute slice header (attribute_slice_header( )) according to the embodiments may include an ash_attr_parameter_set_id field, an ash_attr_sps_attr_idx field, an ash_attr_geom_slice_id field, an ash_attr_layer_qp_delta_present_flag field, and an ash_attr_region_qp_delta_present_flag field.

When the value of the aps_slice_qp_delta_present_flag field of the APS is TRUE (e.g., 1), the attribute slice header (attribute_slice_header( )) according to the embodiments may further include a ash_attr_qp_delta_luma field. When the value of the attribute_dimension_minus1 [ash_attr_sps_attr_idx] field is greater than 0, the attribute slice header may further include an ash_attr_qp_delta_chroma field.

The ash_attr_parameter_set_id field specifies the value of the aps_attr_parameter_set_id field of the current active APS.

The ash_attr_sps_attr_idx field specifies an attribute set in the current active SPS.

The ash_attr_geom_slice_id field specifies the value of the gsh_slice_id field of the current geometry slice header.

The ash_attr_qp_delta_luma field specifies a luma delta quantization parameter qp derived from the initial slice qp in the active attribute parameter set.

The ash_attr_qp_delta_chroma field specifies the chroma delta qp derived from the initial slice qp in the active attribute parameter set.

The variables InitialSliceQpY and InitialSliceQpC are derived as follows.

InitialSliceQpY=aps_attrattr_initial_qp+ash_attr_qp_delta_luma

InitialSliceQpC=aps_attrattr_initial_qp+aps_attr_chroma_qp_offset+ash_attr_qp_delta_chroma The ash_attr_layer_qp_delta_present_flag field specifies whether the ash_attr_layer_qp_delta_luma field and the ash_attr_layer_qp_delta_chroma field are present in the ASH for each layer. For example, when the value of the ash_attr_layer_qp_delta_present_flag field is 1, it indicates that the ash_attr_layer_qp_delta_luma field and the ash_attr_layer_qp_delta_chroma field are present in the ASH. When the value is 0, it indicates that the fields are not present.

When the value of the ash_attr_layer_qp_delta_present_flag field is TRUE, the ASH may further include an ash_attr_num_layer_qp_minus1 field.

ash_attr_num_layer_qp_minus1 plus 1 indicates the number of layers through which the ash_attr_qp_delta_luma field and the ash_attr_qp_delta_chroma field are signaled. When the ash_attr_num_layer_qp field is not signaled, the value of the ash_attr_num_layer_qp field will be 0. According to embodiments, NumLayerQp specifying the number of layers may be obtained by adding 1 to the value of the ash_attr_num_layer_qp_minus1 field (NumLayerQp=ash_attr_num_layer_qp_minus1+1).

According to embodiments, when the value of the ash_attr_layer_qp_delta_present_flag field is TRUE, the geometry slice header may include a loop iterated as many times as the value of NumLayerQp. In this case, in an embodiment, i may be initialized to 0 and incremented by 1 every time the loop is executed, and the loop is iterated until the value of i reaches the value of NumLayerQp. This loop contains an ash_attr_layer_qp_delta_luma [i] field. Also, when the value of the attribute_dimension_minus1 [ash_attr_sps_attr_idx] field is greater than 0, the loop may further include an ash_attr_layer_qp_delta_chroma [i] field.

The ash_attr_layer_qp_delta_luma field indicates a luma delta quantization parameter qp from InitialSliceQpY in each layer.

The ash_attr_layer_qp_delta_chroma field indicates a chroma delta quantization parameter qp from InitialSliceQpC in each layer.

The variables SliceQpY[i] and SliceQpC[i] with i=0, . . . , NumLayerQPNumQPLayer−1 are derived as follows.
for (i=0; i<NumLayerQPNumQPLayer: i++) {

SliceQpY[i]=InitialSliceQpY+ash_attr_layer_qp_delta_luma[i]

SliceQpC[i]=InitialSliceQpC+ash_attr_layer_qp_delta_chroma[i]

}
ash_attr_region_qp_delta_present_flag equal to 1 indicates that ash_attr_region_qp_delta, region bounding box origin, and size are present in the current the attribute slice header (attribute_slice_header( )) according to the embodiments. ash_attr_region_qp_delta_present_flag equal to 0 indicates that the ash_attr_region_qp_delta, region bounding box origin, and size are not present in the current attribute slice header.

That is, when the value of the ash_attr_layer_qp_delta_present_flag field is 1, the attribute slice header may further include an ash_attr_qp_region_box_origin_x field, an ash_attr_qp_region_box_origin_y field, an ash_attr_qp_region_box_origin_z field, an ash_attr_qp_region_box_width field, an ash_attr_qp_region_box_height field, an ash_attr_qp_region_box_depth field, and an ash_attr_region_qp_delta field.

The ash_attr_qp_region_box_origin_x field indicates the x offset of the region bounding box relative to slice_origin_x.

The ash_attr_qp_region_box_origin_y field indicates the y offset of the region bounding box relative to slice_origin_y.

The ash_attr_qp_region_box_origin_z field indicates the z offset of the region bounding box relative to slice_origin_z.

The ash_attr_qp_region_box_size_width field indicates the width of the region bounding box.

The ash_attr_qp_region_box_size_height field indicates the height of the region bounding box.

The ash_attr_qp_region_box_size_depth field indicates the depth of the region bounding box.

The ash_attr_region_qp_delta field indicates delta qp from SliceQpY[i] and SliceQpC[i] of a region specified by the ash_attr_qp_region_box field.

According to embodiments, the variable RegionboxDeltaQp specifying a region box delta quantization parameter is set equal to the value of the ash_attr_region_qp_delta field (RegionboxDeltaQp=ash_attr_region_qp_delta).

The attribute slice header according to embodiments may further include information related to LoD-based attribute compression.

FIG. 34 is a diagram illustrating an embodiment of a syntax structure of attribute slice data (attribute_slice_data( )) according to the present disclosure. The attribute slice data (attribute_slice_data( )) according to the embodiments may transmit an attribute bitstream belonging to a corresponding slice. The attribute slice data according to the embodiments may include an attribute or attribute-related data in relation to some or all point clouds.

In FIG. 34, a zerorun field indicates the number of zeros prior to predIndex or residual.

A predIndex[i] field indicates a predictor index for decoding an i-th point value of the attribute. The value of the predIndex[i] field has a range from 0 to the value of a max_num_predictors field.

The operations of the above-described embodiments may be performed through elements of a point cloud transmission/reception device/method including a memory and/or a processor. The memory may store programs for processing/controlling the operations according to the embodiments. Each element of the point cloud transmission/reception device/method according to the embodiments may correspond to hardware, software, a processor, and/or a combination thereof. The processor may control the various operations described in the present disclosure. The processor may be referred to as a controller or the like. The operations of the embodiments may be performed by firmware, software, and/or a combination thereof, and the firmware, software, and/or combination thereof may be stored in the processor or stored in the memory. In this embodiment, while the method for compressing the geometry information of the point cloud data is described, the method described in the present disclosure may be applied to attribute information compression and other compression methods.

FIG. 35 is a diagram illustrating another example of a point cloud transmission device according to embodiments. Elements of the point cloud transmission device illustrated in FIG. 35 may be implemented by hardware, software, a processor, and/or a combination thereof.

According to embodiments, the point cloud transmission device may include a signaling processor 51002, a geometry encoder 51003, an attribute encoder 51004, and a transmission processor 51005.

The geometry encoder 51003 and the attribute encoder 51004 may perform some or all of the operations described in the point cloud video encoder 10002 of FIG. 1, the encoding 20001 of FIG. 2, the point cloud video encoder of FIG. 4, and the point cloud video encoder of FIG. 12.

The geometry encoder 51003 may allow dependency between slices/trees as in the above-described first embodiment and perform prediction of root nodes of slices based on dependency between slices/trees. In this case, a root node of a current predictive tree may be predicted based on a specific point (referred to as a reference point) of another predictive tree (referred to as a reference tree or a reference predictive tree).

As in the above-described second embodiment, the geometry encoder 51003 may configure root nodes of a plurality of predictive trees using a separate slice and perform prediction between root nodes in the separately configured slice. In this case, a current root node in the separately configured slice may be predicted based on at least one root node in the corresponding slice.

The geometry encoder 51003 may perform prediction on starting nodes of slices (e.g., root nodes of predictive trees) by independently applying the first embodiment or the second embodiment or simultaneously applying the first embodiment and the second embodiment.

In the present disclosure, for the contents of predicting root nodes based on the first embodiment and/or the second embodiment, refer to the description of FIGS. 15 to 34, and a description thereof will be omitted herein. Residual information of each root node obtained by performing prediction on the root nodes based on the above-described first embodiment and/or second embodiment is entropy-encoded through transformation and quantization, and prediction mode information applied to each root node may be entropy-encoded and then output to the transmission processor 51005 in the form of a geometry bitstream. In an embodiment, the entropy-encoded residual information and prediction mode information are included in geometry slice data or geometry predictive tree data of the geometry bitstream.

As illustrated in FIG. 18, when the second embodiment is applied and prediction is performed on root nodes of original slices in the root slice, the root nodes in the original slices are used only as information for prediction of other points (i.e., child nodes of a root node) of a corresponding original slice.

In addition, residual information of each point obtained by performing prediction even on other points (i.e., child nodes of a root node) of each slice (excluding a root slice in the second embodiment) may be entropy-encoded through transformation and quantization, and prediction mode information applied to each point may be entropy-encoded and then output to the transmission processor 51005 in the form of a geometry bitstream. In an embodiment, the entropy-encoded residual information and prediction mode information are included in the geometry slice data or the geometry predictive tree data of the geometry bitstream.

According to embodiments, when compression is performed on the positions of points as described above, the positions of the points may be changed.

The geometry encoder 51003 reconstructs geometry information based on the positions changed through compression and outputs the reconstructed (or decoded) geometry information to the attribute encoder 51004.

The attribute encoder 51004 compresses attribute information based on positions on which geometry encoding is not performed and/or on the reconstructed geometry information. In an embodiment, the attribute information may be coded using any one of RAHT coding, LOD-based predictive transform coding, and lifting transform coding or a combination of one or more thereof. As another embodiment, the attribute information may be subjected to predictive tree-based encoding by applying the first embodiment and/or the second embodiment similarly to geometry information encoding described above. For the predictive tree-based attribute encoding, refer to the above-described geometry information encoding. The attribute encoder 51004 performs entropy encoding on the compressed geometry information and outputs the entropy-encoded geometry information to the transmission processor 51005 in the form of an attribute bitstream.

The signaling processor 51002 may generate and/or processes signaling information necessary for encoding/decoding/rendering of the geometry information and attribute information and provide the generated and/or processed signaling information to the geometry encoder 51003, the attribute encoder 51004, and/or the transmission processor 51005. Alternatively, the signaling processor 51002 may be provided with the signaling information generated by the geometry encoder 51003, the attribute encoder 51004, and/or the transmission processor 51005. The signaling processor 51002 may provide information fed back from the reception device (e.g., head orientation information and/or viewport information) to the geometry encoder 51003, the attribute encoder 51004, and/or the transmission processor 51005.

In the present disclosure, the signaling information may be signaled and transmitted in units of a parameter set (an SPS, a GPS, an APS, and a TPS (also referred to as a tile inventory)). In addition, the signaling information may be signaled and transmitted in units of a coding unit (or a compression unit or a prediction unit) of each image, such as a slice or a tile.

The methods/devices according to the embodiments may signal related information to add/perform the operations of the embodiments. The signaling information according to the embodiments may be used in the transmission device and/or the reception device.

The transmission processor 51005 may perform the same or similar operation and/or transmission method as or to the operation and/or transmission method of the transmission processor 12012 of FIG. 12 and perform the same or similar operation and/or transmission method as or to the transmitter 1003 of FIG. 1. For a detailed description, refer to the description of FIG. 1 or FIG. 12 and the detailed description will be omitted herein.

The transmission processor 51005 may multiplex the geometry bitstream output from the geometry encoder 51003, the attribute bitstream output from the attribute encoder 51004, and the signaling bitstream output from the signaling processor 51002 into one bitstream. The multiplexed bitstream may be transmitted without change or transmitted by being encapsulated in a file or a segment. In an embodiment of the present disclosure, the file is in an ISOBMFF file format.

According to embodiments, the file or the segment may be transmitted to the reception device or stored in a digital storage medium (e.g., a USB drive, SD, CD, DVD, Blu-ray disc, HDD, SSD, etc.). The transmission processor 51005 according to the embodiments may communicate with the reception device through wired/wireless communication through a network such as 4G, 5G, or 6G. In addition, the transmission processor 51005 may perform a necessary data processing operation depending on a network system (e.g., a 4G, 5G, or 6G communication network system). The transmission processor 51005 may transmit encapsulated data according to an on-demand scheme.

According to embodiments, the above-described information related to root node prediction may be transmitted in a GPS, a TPS, and/or a geometry data unit (also referred to as a geometry slice bitstream) by at least one of the signaling processor 51002, the geometry encoder 51003, and the transmission processor 51005.

Figure 36:
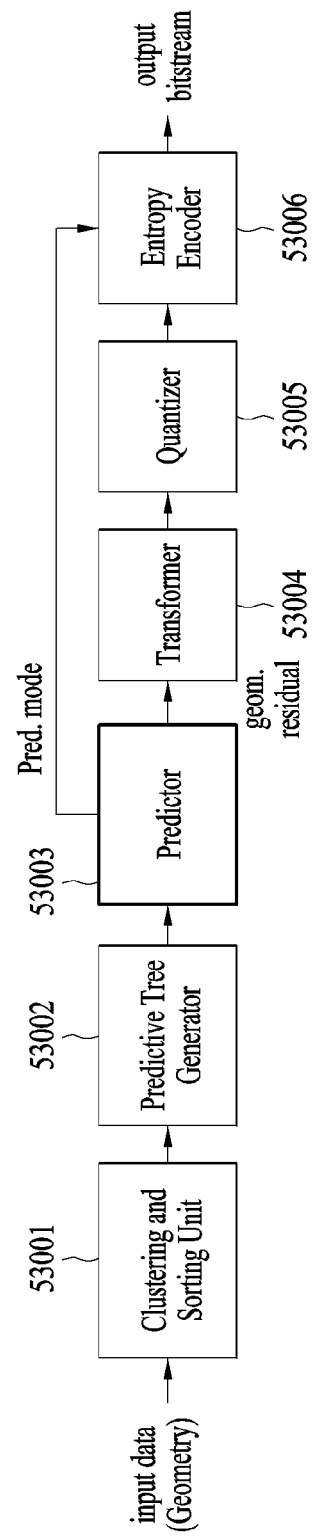
FIG. 36 is a diagram illustrating an example of a detailed block of a geometry encoder according to embodiments.

FIG. 36 is a diagram illustrating an example of a detailed block of the geometry encoder 51003 according to embodiments. Elements of the geometry encoder illustrated in FIG. 36 may be implemented by hardware, software, a processor, and/or a combination thereof.

According to embodiments, the geometry encoder 51003 may include a clustering and sorting unit 53001, a predictive tree generator 53002, a predictor 53003, a transformer 53004, a quantizer 53005, and an entropy encoder 53006.

The clustering and sorting unit 53001 may be divided into a clusterer and a sorter. The clusterer may be referred to as a divider. The order in which blocks are executed may be changed, some blocks may be omitted, and other blocks may be newly added.

The clustering and sorting unit 53001 divides points of point cloud data input through clustering based on geometry information of the points of the input point cloud data into a plurality of slices (e.g., referred to as compression units or clusters). FIG. 16 illustrates an example in which the points of the point cloud data are divided into three slices. Then, the points of the point cloud data are sorted for each slide in consideration of geometry information of each point within a slice.

In this case, points in each slice may be sorted such that compression efficiency may be increased. For example, when data is acquired radially from a rotational axis as in LiDAR, the coordinate system may be transformed into a vertical position of a laser, a rotational angle of the laser, and a distance of the laser from a central axis and then be sorted. In this case, association between the points may be raised by forming directionality of sorting as zigzag.

The predictive tree generator 53002 may construct a predictive tree within each slice after the clustering and sorting unit 53001 has sorted the points of the point cloud data within each slice.

When the predictive tree generator 53002 generates the predictive tree in units of slices, the predictor 53003 determines a prediction mode of each point by establishing a parent-child relationship for points within each slice on a slice basis, obtains residual information of each point based on the determined prediction mode, outputs prediction mode information to the entropy encoder 53006, and outputs the residual information to the transformer 53004. In an embodiment, the predictor 53003 determines the predication mode that provides an optimal compression ratio by applying Equations 5 and 6 to each point. In an embodiment, the prediction mode of each point may be one of mode 1 to mode 7.

In addition, information for prediction and compression of root nodes of slices (e.g., information related to root node prediction) may be transmitted in a GPS, a TPS, and/or a geometry slice bitstream(also referred to as a geometry data unit) to the reception device.

Since the information related to root node prediction has been described in detail with reference to FIGS. 21 to 34, a description thereof is omitted herein.

The residual information (also referred to as a prediction error) of points acquired by the predictor 53003 is transformed into a compression domain by the transformer 53004 and then quantized by the quantizer 53005. When quantization is performed, an error that may occur in the reception device may be reduced by updating a quantized value during prediction. In addition, the quantized residual information, and the prediction mode information of the points output from the predictor 53003 are entropy-encoded by the entropy encoder 53006 and output in the form of a geometry bitstream.

Figure 37:
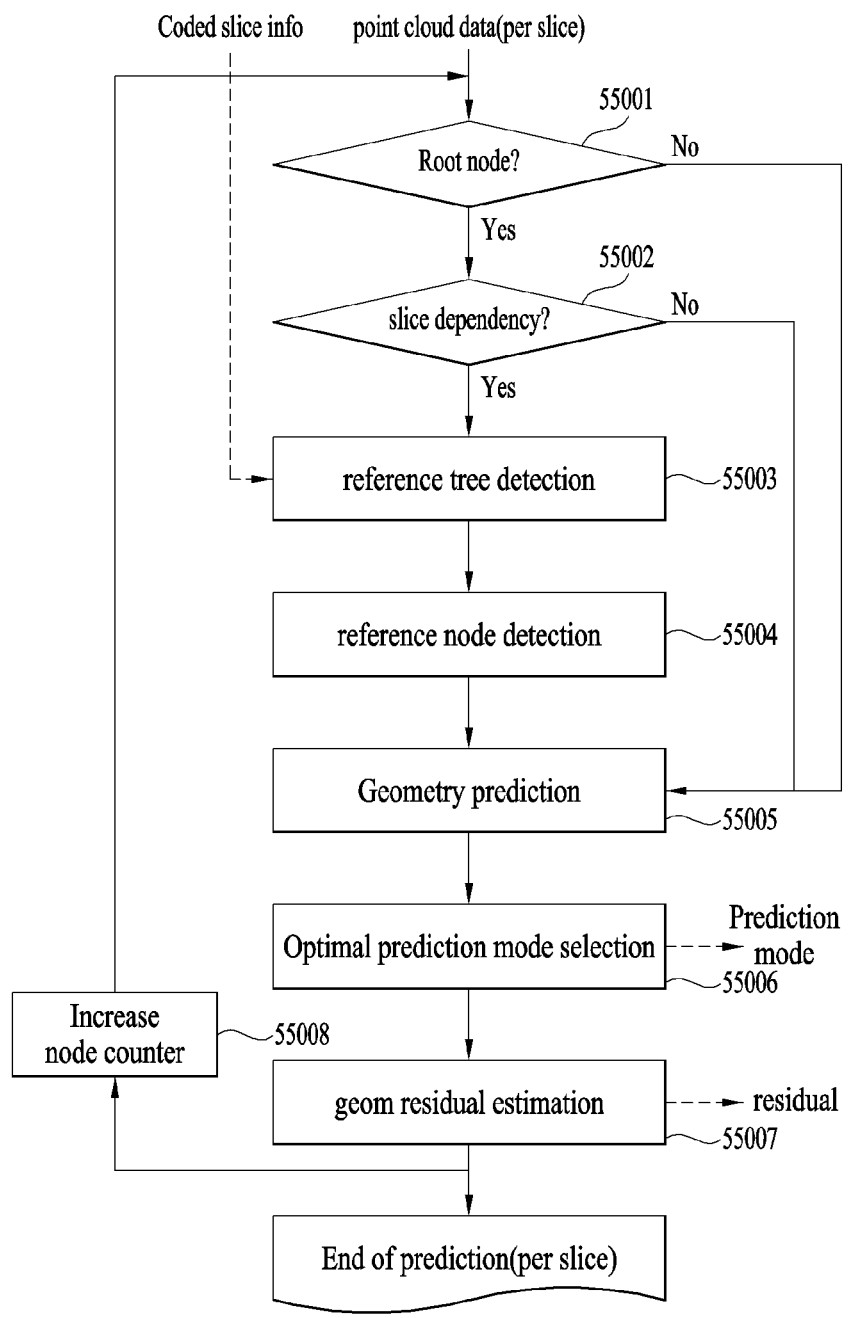
FIG. 37 is a flowchart illustrating an example of a root node prediction method according to a first embodiment.

FIG. 37 is a flowchart illustrating an example of a root node prediction method according to the first embodiment. In particular, FIG. 37 is a flowchart of a method of predicting and compressing each node after sorting and grouping points of point cloud data in units of slices or trees.

That is, when points (i.e., nodes) of point cloud data of a slice to be predicted are input, it is determined whether a current point (i.e., node) is a root node of the corresponding slice (step 55001).

If it is determined in step 55001 that the current point is the root node, the procedure proceeds to step 55002. If it is determined that the current point is not the root node, the procedure proceeds to step 55005 to predict a corresponding node.

In step 55002, it is determined whether a current slice is a slice for which dependency between slices is allowed. That is, in compressing the current slice, it is determined whether the current slice uses information about other slices. If reference to other slices is allowed, each of values of the dependent_slice_present_flag field and the dependent_slice_flag field are signaled as 1.

If it is determined in step 55002 that the current slice is a slice for which dependency between slices is allowed, the procedure proceeds to step 55003 to detect a reference tree. If it is determined in step 55002 that dependency between slices is not allowed, the procedure proceeds to step 55005 to independently predict and compress the corresponding slice.

In step 55003, k (k>0) reference slices (i.e., reference trees) adjacent to the current slice are searched for (or detected) and, in step 55004, a reference point to be a parent of a root node of the current slice among points of the k reference trees is searched for (or detected). The reference point may be a point nearest to the root node of the current slice or may be a point at a specific position (e.g., a leaf node of a reference tree). Since the search process of the k reference trees in step 55003 and the search process of the reference point in step 55004 have been described in detail above, a description thereof is omitted herein. In this case, the value of the reference_gsh_slice_id field signals slice indicator information for identifying the searched reference tree, and the value of the reference_node_idx field signals node index information for identifying the searched reference point.

In step 55006, prediction and compression are performed on points of the current slice. According to embodiments, when the reference tree and the reference point are determined in steps 55003 and 55004, the root node of the current slice is predicted and compressed based on the reference point of the reference tree, and residual information of the root node is estimated. That is, a difference value between the position of the root node (i.e., the starting node) of the current slice and the position of the reference point of the reference tree is the estimated residual information of the root node.

In addition, when it is determined that the current point is not the root node in step 55001, prediction candidates are obtained through geometry prediction even for the remaining nodes (i.e., points) of the current slice and then a prediction mode having optimal compression efficiency is selected by applying Equation 5 and Equation 6 (step 55006). A process of estimating residual information of a corresponding point is performed based on the selected prediction mode (step 55007). Further, prediction mode information for each point of the current slice is output for entropy encoding, and residual information for each point is output for transformation/quantization/entropy encoding. The prediction mode information and the residual information for each entropy-encoded point are transmitted in a geometry slice bitstream (or geometry data unit) to the reception device.

If it is determined in step 55002 that the current slice is a slice for which dependency between slices is not allowed, prediction is not performed on the root node of the current slice. That is, a position value (x, y, z coordinate value) of the root node of the current slice is transmitted to the reception device without compression. Then, prediction candidates are obtained through geometry prediction with respect to the remaining points (i.e., nodes) of the current slice, a prediction mode with optimal compression efficiency is selected by applying Equation 5 and Equation 6, and residual information of a corresponding point is estimated based on the selected prediction mode (step 55006 to step 55008). Further, prediction mode information for each point of the current slice is output for entropy encoding, and residual information for each point is output for transformation/quantization/entropy encoding. The prediction mode information and the residual information for each entropy-encoded point are transmitted in the geometry slice bitstream (or geometry data unit) to the reception device.

On the other hand, in the case of configuring a separate slice (i.e., a root slice) by gathering root nodes of slices as in the second embodiment, if reordering is required within the root slice, nodes (i.e., points) within the root slice are reordered and then a parent-child relationship may be detected. In this case, the original_gsh_slice_id field represents slice indicator information for identifying an original slice to which a corresponding node of the root slice belongs, and the original_node_idx field represents node index information for identifying the position of a node within the original slice to which the corresponding node of the root slice belongs. That is, the original_gsh_slice_id field and the original_node_idx field may indicate the original slice to which each node in the root slice belongs and the position of the original node, respectively.

According to embodiments, a predication method for a root slice and a prediction method for the remaining slices may be the same or different. For example, compression may be performed on both the root slice and the remaining slices based on prediction, or compression may be performed on the root slice based on an octree and performed on the remaining slices based on a predictive tree.

For parts not described or omitted in FIG. 37, refer to the descriptions of FIGS. 15 to 36.

Figure 38:
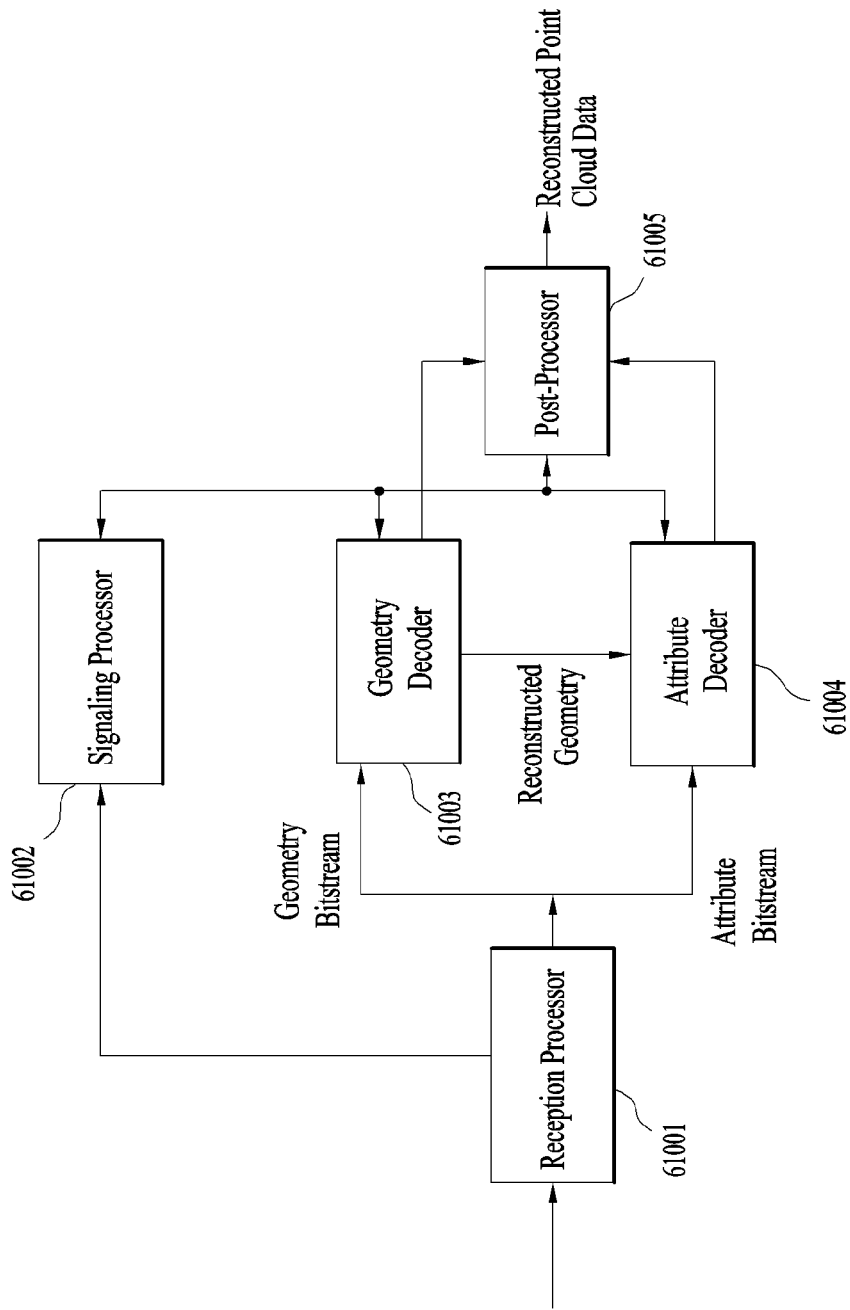
FIG. 38 illustrates another example of a point cloud reception device according to embodiments.

FIG. 38 illustrates another example of a point cloud reception device according to embodiments. The elements of the point cloud reception device shown in FIG. 38 may be implemented as hardware, software, a processor and/or a combination thereof.

According to embodiments, the point cloud reception device may include a reception processor 61001, a signaling processor 61002, a geometry decoder 61003, an attribute decoder 61004, and a post-processor 61005.

The reception processor 61001 according to the embodiments may receive one bitstream, or may receive a geometry bitstream, an attribute bitstream, and a signaling bitstream, respectively. When a file and/or segment is received, the reception processor 61001 may decapsulate the received file and/or segment and output a bitstream.

When one bitstream is received (or decapsulated), the reception processor 61001 according to the embodiments may demultiplex a geometry bitstream, an attribute bitstream, and/or a signaling bitstream from one bitstream, and output the demultiplexed signaling bitstream to the signaling processor 61002, output the demultiplexed geometry bitstream to the geometry decoder 61003, and output the demultiplexed attribute bitstream to the attribute decoder 61004.

When a geometry bitstream, an attribute bitstream, and/or a signaling bitstream are received (or decapsulated), respectively, the reception processor 61001 according to the embodiments may transmit the signaling bitstream to the signaling processor 61002, transmit the geometry bitstream to the geometry decoder 61003, and transmit the attribute bitstream to the attribute decoder 61004.

The signaling processor 61002 may parse and process information included in the signaling information, for example, SPS, GPS, APS, TPS, metadata, etc., from the input signaling bitstream and provide the same to the geometry decoder 61003, the attribute decoder 61004, and the post-processor 61005. In another embodiment, the signaling information included in the geometry slice header and/or the attribute slice header may also be parsed by the signaling processor 61002 before decoding of the corresponding slice data.

According to embodiments, the signaling processor 61002 may also parse and process information related to root node compression signaled in a GPS and/or a TPS and provide the parsed and processed information to the geometry decoder 61003.

According to embodiments, the signaling processor 61002 may also parse and process information related to root node compression signaled in a geometry slice bitstream (or geometry data unit) and provide the parsed and processed information to the geometry decoder 61003.

According to embodiments, the geometry decoder 61003 may reconstruct the geometry by performing the reverse process of the operation of the geometry encoder 51003 of FIG. 35 for the compressed geometry bitstream based on the signaling information. The geometry information reconstructed (or restored) by the geometry decoder 61003 is provided to the attribute decoder 61004. The attribute decoder 61004 may reconstruct the attributes by performing the reverse process of the operation of the attribute encoder 51004 of FIG. 35 for the compressed attribute bitstream based on the signaling information and the reconstructed geometry information.

According to embodiments, the post-processor 61005 may match the geometry information (i.e., positions) reconstructed and output by the geometry decoder 61003 with the attribute information reconstructed and output by the attribute decoder 61004 to reconstruct and display/render the point cloud data.

Figure 39:
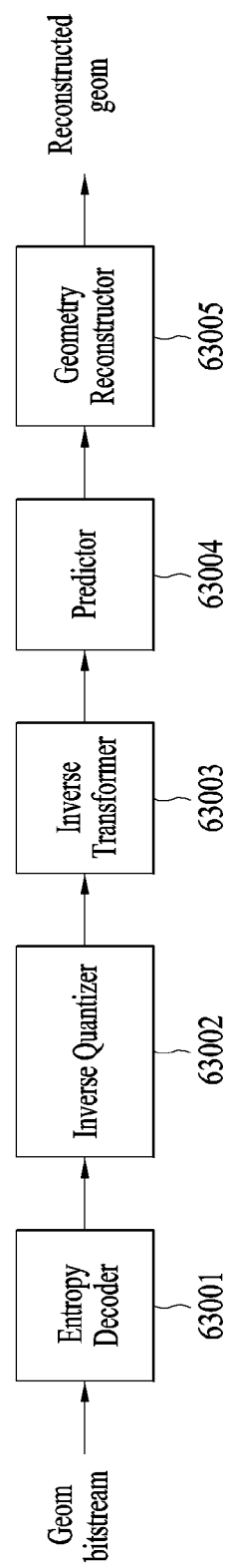
FIG. 39 is a diagram illustrating an example of a detailed block of a geometry decoder according to embodiments.

FIG. 39 is a diagram illustrating an example of a detailed block of the geometry decoder 61003 according to embodiments. Elements of the geometry decoder illustrated in FIG. 39 may be implemented by hardware, software, a processor, and/or a combination thereof.

According to embodiments, the geometry decoder 61003 may include an entropy decoder 63001, an inverse quantizer 63002, an inverse transformer 63003, a predictor 63004, and a geometry reconstructor 63005. The order in which blocks are executed may be changed, some blocks may be omitted, and other blocks may be newly added.

According to embodiments, the geometry decoder 61003 reconstructs geometry information by performing a reverse process of the geometry encoder of the transmission device. That is, the entropy decoder 63001 entropy-decodes residual information (i.e., prediction errors) and prediction mode information for points of each slice included in a bitstream input through the reception processor 61001. The entropy-decoded residual information is output to the inverse quantizer 63002, and the entropy-decoded prediction mode information is output to the predictor 63004. The inverse quantizer 63002 inversely quantizes the entropy-decoded residual information based on signaling information, and the inverse transformer 63003 inversely transforms the inverse quantized residual information into an inverse process of the attribute transformer 53004 and output the inverse transformed residual information to the predictor 63004.

The predictor 63004 outputs predicted information by performing prediction on nodes (i.e., points) including a root node of a corresponding slice through a reverse process of the first embodiment and/or a reverse process of the second embodiment, based on signaling information included in a parameter set and/or in a corresponding slice and on prediction mode information of each entropy-decoded node (i.e., point).

That is, the predictor 63004 may predict a current node based on the entropy-decoded prediction mode information of each node and on a parent-child relationship with the decoded node. In this case, when the value of a dependent_slice_present_flag field included in information related to root node prediction is 1, prediction of the current node may be performed with reference to nodes in a neighbor slice as well as adjacent nodes in the current slice (i.e., reverse process of the first embodiment). In addition, a reference slice that a current node refers to and the position of a reference node (i.e., point) within the reference slice may be determined using a reference_gsh_slice_id field and a reference_node_idx field included in the information related to root node prediction. If the value of a root_slice_present_flag field included in the information related to root node prediction is 1, prediction may be performed with reference to nodes in the root slice as well as adjacent nodes in the slice (i.e., the reverse process of the second embodiment). In this case, an original slice in which each node in the root slide should be originally located and a node position may be determined using an original_gsh_slice_id field and an original_node_idx field included in the information related to root node prediction.

The reconstructor 63005 reconstructs (or restores) geometry information (i.e., the position of a final point) using the predicted information and the inversely transformed residual information.

Figure 40:
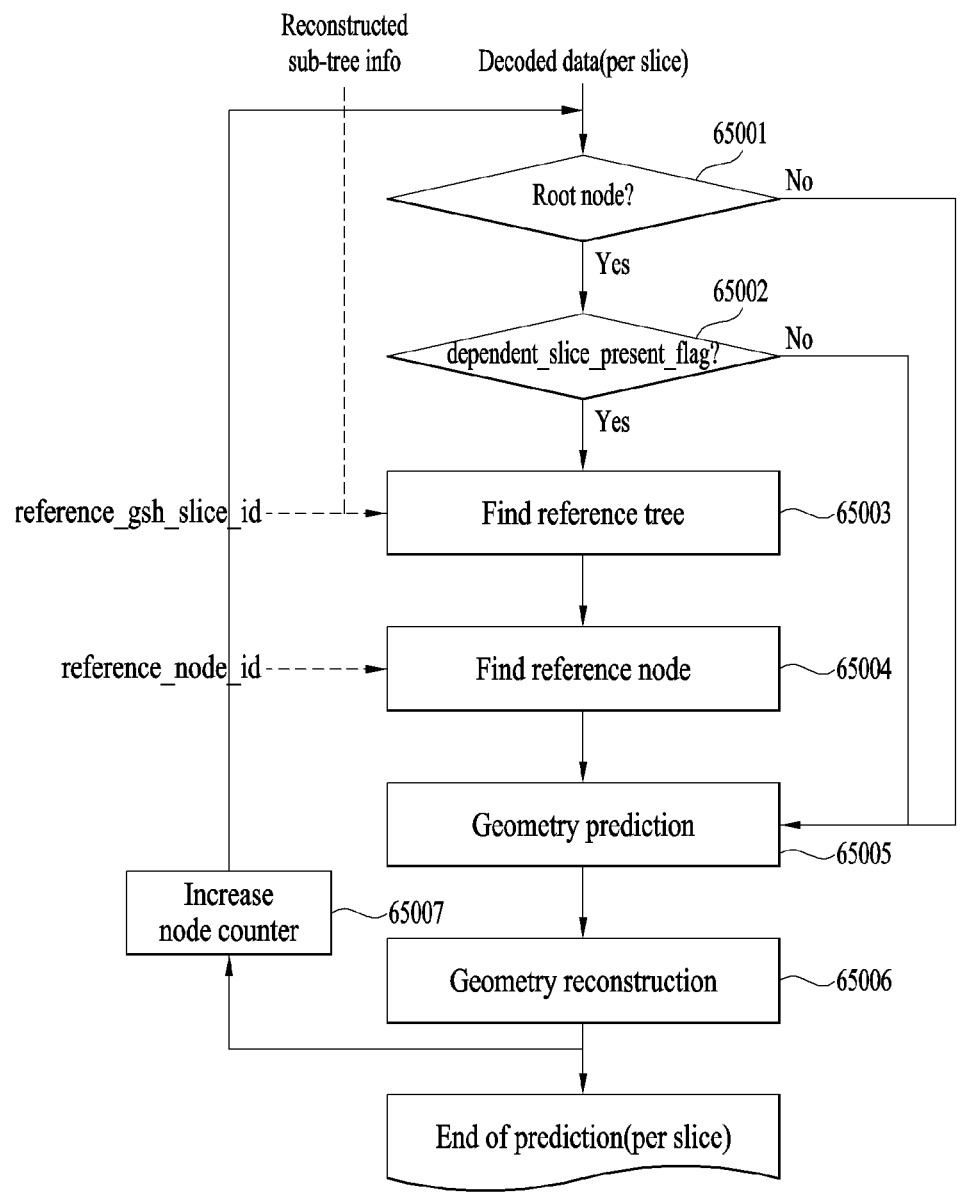
FIG. 40 is a flowchart illustrating an example of a geometry decoding method according to embodiments.

FIG. 40 is a flowchart illustrating an example of a geometry decoding method according to embodiments. In particular, FIG. 40 is a flowchart of a method of reconstructing geometry information by predicting a root node using a reverse process of the first embodiment of the transmission device.

According to embodiments, it is determined whether a current node of a slice to be decoded is a root node (step 65001).

If it is determined that the current node is the root node in the above step, the procedure proceeds to step 65002, and if it is determined that the current node is not the root node, the procedure proceeds to step 65005.

In step 65002, it is determined whether a current slice is a slice for which dependency between slices is allowed using a dependent_slice_present_flag field. For example, if the value of the dependent_slice_present_flag field is 1, it is determined that the current slice is a slice for which dependency (i.e., reference) between slices is allowed. In this case, a reference slice/tree that the root node of the current slice refers to may be detected through a reference_gsh_slice_id field (step 65003), and the position of the reference node within the reference slice/tree may be detected through a reference_node_idx field (step 65004).

In step 65003 and step 65004, if a reference point within the reference slice that the root node of the current slice is to refer to is detected, prediction information is output by performing prediction on the position of the root node of the current slice based on the reference point (parent), the root node (a grandparent) of the current slice, and entropy-decoded prediction mode information (step 65005). Then, position information (i.e., geometry information) of the root node of the current slice is reconstructed using the prediction information and the inversely transformed residual information of step 65005 (step 65006).

In addition, if it is determined in step 65001 that the current node is not the root node, prediction information of each node is obtained by performing position prediction even for the remaining nodes (i.e., points) of the current slice based on the prediction mode information of each node by steps 65005 to 65007 and position information (i.e., geometry information) of each node is reconstructed based on the prediction information of each node and the residual information of each node.

If it is determined in step 65002 that the current slice is a slice for which dependency between slices is not allowed, prediction is not performed since the position value of the root node of the current slice is received without compression. In this case, position prediction is performed on the remaining nodes (i.e., points) of the current slice, based on the prediction mode information of each node by steps 65005 to 65007 to obtain the prediction information of each node, and the position information (i.e., geometry information) of each node is reconstructed based on the prediction information of each node and the residual information of each node.

On the other hand, if the value of a root_slice_present_flag field included in information related to root node prediction is 1 (i.e., the reverse process of the second embodiment of the transmission device), the position of a root slice is detected using a reference_gsh_slice_id field, and the position of a predicted node is detected using a reference_node_idx field. In this case, prediction information is obtained by performing prediction on each node in the root slice based on a predication mode and the relationship between adjacent nodes in the root slice (i.e., root nodes of each slice), similar to normal slices (e.g., slice 1 to slice 3). The position information (i.e., geometry information) of each node is previously reconstructed based on the prediction information and the received residual information, and this reconstructed geometry information may be used to reconstruct a subsequent normal slice (i.e., a slice containing trees).

Figure 41:
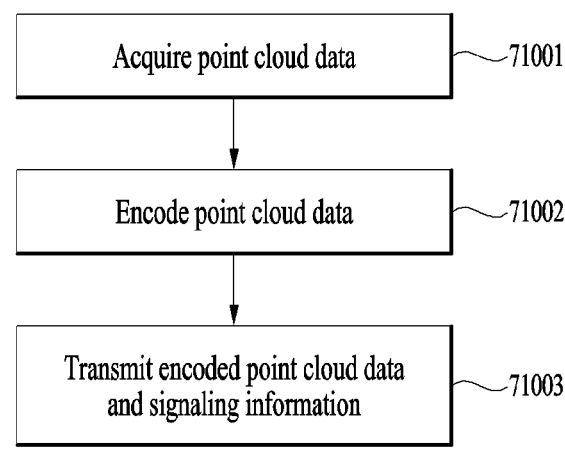
FIG. 41 illustrates a flowchart of a point cloud data transmission method according to embodiments.

FIG. 41 illustrates a flowchart of a point cloud data transmission method according to embodiments.

The point cloud data transmission method according to the embodiments may include acquiring point cloud data (71001), encoding the point cloud data (71002), and transmitting the encoded point cloud data and signaling information (71003). In this case, a bitstream including the encoded point cloud data and the signaling information may be encapsulated in a file and transmitted.

Step 71001 of acquiring the point cloud data may include some or all of the operations of the point cloud video acquisition unit 10001 of FIG. 1 or some or all of the operations of the data input unit 12000 of FIG. 12.

Step 71002 of encoding the point cloud data may include some or all of the operations of the point cloud video encoder 10002 of FIG. 1, the encoding 20001 of FIG. 2, the point cloud video encoder of FIG. 4, the point cloud video encoder of FIG. 12, the geometry encoder of FIG. 35, and the geometry encoder of FIG. 36.

Step 71002 of encoding the point cloud data according to the embodiments may include performing prediction on starting nodes of slices (root nodes of prediction trees) and perform compression by independently applying the first embodiment and the second embodiment or simultaneously applying the first embodiment and the second embodiment.

In the present disclosure, for the contents of predicting root nodes based on the first embodiment and/or the second embodiment, refer to the description of FIGS. 15 to 34, and a description thereof will be omitted herein. Residual information of each root node obtained by performing prediction on the root nodes based on the above-described first embodiment and/or second embodiment is entropy-encoded through transformation and quantization, and prediction mode information applied to each root node may be entropy-encoded and then output in the form of a geometry bitstream.

According to embodiments, step 71002 of encoding the point cloud data includes compressing attribute information based on positions on which geometry encoding is not performed and/or on reconstructed geometry information. In an embodiment, the attribute information may be coded using any one of RAHT coding, LOD-based predictive transform coding, and lifting transform coding or a combination of one or more thereof. As another embodiment, the attribute information may be subjected to predictive tree-based encoding by applying the first embodiment and/or the second embodiment similarly to geometry information encoding described above. For the predictive tree-based attribute encoding, refer to the above-described geometry information encoding.

In the present disclosure, the signaling information may be an SPS, a GPS, an APS, a TPS, or metadata, and a geometry slice header (also referred to as a geometry data unit header) may also be referred to as the signaling information. The information related to root node prediction may be signaled in at least one of the GPS, the TPS, or the geometry slice. Since the information related to root node compression has been described in detail above, a description thereof will be omitted herein.

Figure 42:
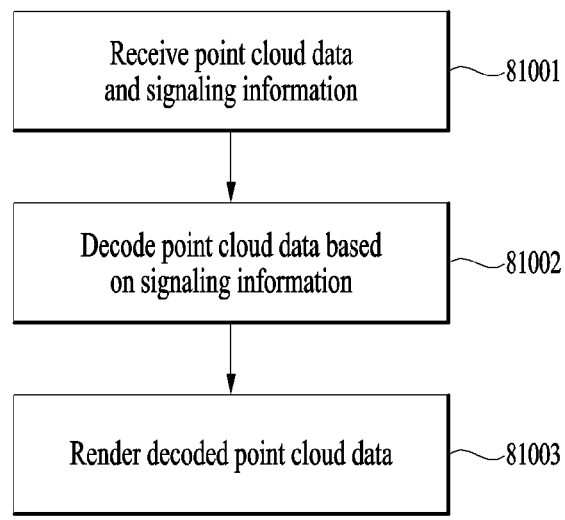
FIG. 42 is a flowchart of a point cloud data reception method according to embodiments.

FIG. 42 is a flowchart of a point cloud data reception method according to embodiments.

The point cloud data reception method according to the embodiments may include receiving encoded point cloud data and signaling information (81001), decoding the point cloud data based on the signaling information (81002), and rendering the decoded point cloud data (81003).

Step 81001 of receiving the point cloud data and the signaling information according to the embodiments may be performed by the receiver 10005 of FIG. 1, transmission 20002 or decoding 20003 of FIG. 2, or the receiver 13000 or the reception processor 13001 of FIG. 13.

The signaling information may be an SPS, a GPS, an APS, a TPS, or metadata, and a geometry slice header (also referred to as a geometry data unit header) may also be referred to as the signaling information. At least one of the GPS, the TPS, and/or the geometry slice may include information related to root node prediction. Since the information related to root node predication has been described in detail above, a description thereof will be omitted herein.

Step 81002 of decoding point cloud data according to embodiments may include some or all of the operations of the point cloud video decoder 10006 of FIG. 1, the decoding 20003 of FIG. 2, the point cloud video decoder of FIG. 11, the point cloud video decoder of FIG. 13, and the point cloud video decoder 61005 of FIG. 38.

In step 81002 of decoding the point cloud data according to the embodiments may include reconstructing a root node through a reverse process of the first embodiment and/or the second embodiment, as described with reference to FIGS. 15 to 40, to reconstruct position information (i.e., geometry information) of points in each slide. For details of reconstructing the position, refer to a description of FIGS. 15 to 40.

Step 81002 of decoding the point cloud data includes decoding (i.e., decompressing) attribute information based on the reconstructed geometry information. In an embodiment, the attribute information may be decoded using any one of RAHT coding, LOD-based predictive transform coding, and lifting transform coding or a combination of one or more thereof. As another embodiment, the attribute information may be subjected to predictive tree-based decoding by applying a reverse process of the first embodiment and/or a reverse process of the second embodiment similarly to geometry information decoding described above. For the predictive tree-based attribute decoding, refer to the above-described geometry information decoding.

In step 81003 of performing rendering according to the embodiments, the point cloud data may be reconstructed based on the restored (or reconstructed) geometry information and the attribute information and rendered according to various rendering methods. For example, points of the point cloud content may be rendered to a vertex having a certain thickness, a cube having a specific minimum size centered at a vertex position, or a circle centered at the vertex position. All or some regions of the rendered point cloud content are provided to a user through a display (e.g., a VR/AR display or a general display). Step 81003 of rendering the point cloud data according to the embodiments may be performed by the renderer 10007 of FIG. 1, the rendering 20004 of FIG. 2, or the renderer 13011 of FIG. 13.

As described above, the present disclosure may obtain an effect of increasing compression efficiency while reducing a bitstream size by enabling prediction and compression of root nodes in slices.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion. In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C."

Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

The operations according to the embodiments described in this document may be performed by a transmission/reception device including one or more memories and/or one or more processors according to the embodiments. The one or more memories may store programs for processing/controlling the operations according to the embodiments, and the one or more processors may control the various operations described in this document. The one or more processors may be referred to as a controller or the like. The operations according to the embodiments may be performed by firmware, software, and/or a combination thereof. The firmware, software, and/or combination thereof may be stored in the processors or the memories.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR INVENTION

As described above, related contents have been described in the best mode for carrying out the embodiments.

INDUSTRIAL APPLICABILITY

As described above, the embodiments may be fully or partially applied to the point cloud data transmission/reception device and system. It will be apparent to those skilled in the art that variously changes or modifications may be made to the embodiments within the scope of the embodiments. Thus, it is intended that the embodiments cover the modifications and variations of this disclosure provided they come within the scope of the appended claims and their equivalents.

The invention claimed is:

1. A point cloud data transmission method by a device, comprising:
  encoding geometry data of point cloud data;
  encoding attribute data of the point cloud data based on the geometry data; and
  transmitting the encoded geometry data, the encoded attribute data, and signaling data,
  wherein the encoding the geometry data includes:
  dividing the geometry data into a plurality of compression units,
  generating, for each compression unit, a predictive tree based on the geometry data within each compression unit, and
  compressing the geometry data within the compression unit by performing prediction based on the prediction tree,
  wherein the compressing the geometry data includes:
  detecting one or more reference compression units referenced by a root node within a current compression unit from other compression units,
  detecting a reference node referenced by the root node within the current compression unit from the detected one or more reference compression units, and
  compressing the root node by performing prediction on the root node within the current compression unit based on the detected reference node.

2. The point cloud data transmission method of claim 1, wherein the signaling data includes information related to the one or more reference compression units and to the reference node.

3. The point cloud data transmission method of claim 1, wherein the compressing the geometry data includes:
  constructing a new compression unit by gathering root nodes of the compression units;
  generating a geometry tree based on root nodes within the constructed compression unit; and
  compressing the root nodes by performing prediction based on the generated geometry tree.

4. The point cloud data transmission method of claim 3, wherein the signaling data includes information related to the new compression unit and information related to an original compression unit of each root node.

5. A point cloud data transmission device, comprising:
  a geometry encoder configured to encode geometry data of point cloud data;
  an attribute encoder configured to encode attribute data of the point cloud data based on the geometry data; and
  a transmitter configured to transmit the encoded geometry data, the encoded attribute data, and signaling data,
  wherein the geometry encoder:
  divides the geometry data into a plurality of compression units,
  generates, for each compression unit, a predictive tree based on the geometry data within each compression unit, and
  compresses the geometry data within the compression unit by performing prediction based on the prediction tree,
  wherein the geometry encoder further:
  detects one or more reference compression units referenced by a root node within a current compression unit from other compression units, detects a reference node referenced by the root node within the current compression unit from the detected one or more reference compression units, and compresses the root node by performing prediction on the root node within the current compression unit based on the detected reference node.

6. The point cloud data transmission device of claim 5, wherein the signaling data includes information related to the one or more reference compression units and to the reference node.

7. The point cloud data transmission device of claim 5, wherein the geometry encoder constructs a new compression unit by gathering root nodes of the compression units, generates a geometry tree based on root nodes within the constructed compression unit, and compresses the root nodes by performing prediction based on the generated geometry tree.

8. The point cloud data transmission device of claim 7, wherein the signaling data includes information related to the new compression unit and information related to an original compression unit of each root node.

9. A point cloud data reception method, comprising:
  receiving geometry data, attribute data, and signaling data;
  decoding the geometry data based on the signaling data;
  decoding the attribute data based on the signaling data and the decoded geometry data; and
  rendering point cloud data that is restored based on the signaling data, the decoded geometry data, and the decoded attribute data,
  wherein the decoding the geometry data includes:
  generating a predictive tree within a compression unit based on the signaling data, and
  reconstructing the geometry data within the compression unit by performing prediction based on the predictive tree,
  wherein the reconstructing the geometry data includes:
  identifying a reference compression unit for a root node of a current compression unit and identifying a reference node, based on the signaling data,
  acquiring prediction information of the root node by performing prediction for the root node of the current compression unit, based on the signaling data and the reference node, and
  reconstructing a position of the root node, based on prediction information of the root node and residual information of the root node.

10. The point cloud data reception method of claim 9, wherein the signaling data includes information related to one or more reference compression units referenced by the root node of the current compression unit and to a reference node referenced by the root node of the current compression unit from the one or more reference compression units.

11. The point cloud data reception method of claim 9, wherein the reconstructing the geometry data includes:

acquiring prediction information of root nodes of compression units by performing prediction on the root nodes based on the signaling data; and reconstructing a position of the root nodes based on prediction information of the root nodes and residual information of received root nodes.

12. The point cloud data reception method of claim 11, wherein the signaling data includes information related to a new compression unit and information related to an original compression unit of each root node.

* * * * *